United States Patent
Kojima

(10) Patent No.: US 7,733,060 B2
(45) Date of Patent: Jun. 8, 2010

(54) CHARGING IC, CHARGING APPARATUS AND ELECTRONIC DEVICE

(75) Inventor: Masakazu Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 11/260,258

(22) Filed: Oct. 28, 2005

(65) Prior Publication Data
US 2007/0001646 A1    Jan. 4, 2007

(30) Foreign Application Priority Data
Jul. 1, 2005    (JP) .............................. 2005-193872

(51) Int. Cl.
*H02J 7/00* (2006.01)
(52) U.S. Cl. .................. 320/125; 320/114; 320/134; 324/427
(58) Field of Classification Search ................ 320/125, 320/128, 134, 138, 114; 324/427, 432–434; 307/43, 52
See application file for complete search history.

(56) References Cited

U.S. PATENT DOCUMENTS

| | | | | | |
|---|---|---|---|---|---|
| 3,767,889 | A | * | 10/1973 | Sano et al. | 219/137 R |
| 5,734,254 | A | * | 3/1998 | Stephens | 320/106 |
| 5,808,444 | A | * | 9/1998 | Saeki et al. | 320/117 |
| 6,127,804 | A | * | 10/2000 | Oglesbee et al. | 320/125 |
| 6,191,552 | B1 | * | 2/2001 | Kates et al. | 320/112 |
| 6,204,633 | B1 | * | 3/2001 | Kitagawa | 320/128 |
| 6,211,649 | B1 | * | 4/2001 | Matsuda | 320/115 |
| 6,373,224 | B1 | * | 4/2002 | Goto et al. | 320/119 |
| 6,657,416 | B2 | * | 12/2003 | Kern et al. | 322/29 |
| 6,737,830 | B2 | * | 5/2004 | Bean et al. | 320/125 |
| 7,391,183 | B2 | * | 6/2008 | Ariga et al. | 320/125 |
| 2001/0050547 | A1 | * | 12/2001 | Takimoto et al. | 323/284 |
| 2002/0171398 | A1 | * | 11/2002 | Odaohhara | 320/128 |

FOREIGN PATENT DOCUMENTS

| | | |
|---|---|---|
| JP | 11-327671 | 11/1999 |
| JP | 2003-274570 | 9/2003 |
| JP | 2005-86933 | 3/2005 |
| JP | 2005-341769 | 12/2005 |

OTHER PUBLICATIONS

Communication from the Japanese Patent Office dispatched Jul. 14, 2009 in the related Japanese patent application No. 2005-193872.

* cited by examiner

*Primary Examiner*—Edward Tso
*Assistant Examiner*—Arun Williams
(74) *Attorney, Agent, or Firm*—Staas & Halsey LLP

(57) ABSTRACT

The present invention relates to charging of rechargeable batteries built into electronic devices and is configured to constrain heat generation during the charging. A charging IC used for charging a rechargeable battery built into an electronic device is disclosed that comprises a power source unit which can be fed with power from an external power source with a drooping characteristic to pick up a constant current; and a control unit which applies a first constant current from the external power source to the rechargeable battery through a circuit element installed on a charging path of the rechargeable battery, the control unit applying a second constant current smaller than the first constant current from the power source unit to the rechargeable battery after the rechargeable battery is charged with the first constant current to a predetermined voltage.

12 Claims, 40 Drawing Sheets

CHARGING IC, CHARGING APPARATUS AND ELECTRONIC DEVICE

CROSS-REFERENCE TO RELATED APPLICATIONS

This application is based upon and claims the benefit of priority from the prior Japanese Patent Application No. 2005-193872, filed on Jul. 1, 2005, the entire contents of which are incorporated herein by reference.

BACKGROUND OF THE INVENTION

1. Field of the Invention

The present invention relates generally to a charging apparatus of rechargeable batteries built into electronic devices such as mobile terminals, and, more particularly, to a charging IC (Integrated Circuit), charging apparatus and an electronic device using as a charging source of the rechargeable batteries an external power source such as an AC (Alternating Current) adaptor or a USB (Universal Serial Bus) host such as a personal computer connected with a USB cable.

2. Description of the Related Art

In charging of a rechargeable battery built into an electronic device such as a mobile terminal, which uses an AC adaptor or a personal computer as a charging source, preliminary charging, constant-current charging or constant-voltage charging is selected depending on a voltage level of the rechargeable battery, and even in the constant-current charging, a current value may be gradually switched.

In regard to such charging of a rechargeable battery, known propositions are a charging circuit having a drooping characteristic depending on a output current (For example, Japanese Patent Application Laid-Open Publication No. 1999-327671 (paragraph number 0020, FIG. 1, FIG. 2 and the like)), a method and apparatus used for constant-voltage charging after constant-current charging for charging a battery of a cellular phone (For example, Japanese Patent Application Laid-Open Publication No. 2003-274570 (paragraph number 0016, FIG. 4, FIG. 5 and the like))

By the way, a description is made for the charging which switches to constant-voltage charging after constant-current charging with an external power source having a drooping characteristic. FIG. 1 is a circuit diagram of a charging apparatus using a PMOS (P-channel Metal Oxide Semiconductor) transistor for charging control; FIG. 2 is a flowchart of the charging control; and FIG. 3 is a diagram showing a charging operation.

This charging apparatus 2 is configured to use an AC adaptor 8 as a charging source to charge a rechargeable battery 6 built into an electronic device 3 along with an apparatus load 4. The charging apparatus 2 is provided with a charging IC 10, and the charging IC 10 integrates circuit units such as a charging control unit which can be integrated into an IC. As an external circuit of the charging IC 10, a charging path 11 is formed for passing a charging current between the AC adaptor 8 and the rechargeable battery 6; the charging path 11 is equipped with a PMOS transistor (Tr) 12 as a charging control element; and the PMOSTr 12 is connected serially with a backflow prevention diode 14 and a sense resistor 16. The sense resistor 16 converts the charging current flowing through the charging path 11 to a voltage to be detected and the detected current is applied to the charging IC 10 as control information. Control output obtained in the charging IC 10 is applied to a gate of the PMOSTr 12 to execute charging-current control or constant-voltage control.

In the charging of the rechargeable battery 6 with the charging apparatus 2, as shown in FIG. 2, when the AC adaptor 8 is detected as the charging source, the output voltage of the AC adaptor 8 is detected, and then, a battery status check is performed for a battery temperature and a battery voltage which indicate a battery status (step S1). If the result of the battery status check is normal, a charging operation is started. At the start of the charging operation, first constant-current charging CC1 is performed as fast charging (step S2), except the case that a battery voltage is too low (an over-discharge state), and the battery voltage is raised by the first constant-current charging CC1 to a start voltage of constant-voltage charging (step S3). After the battery voltage is raised, second constant-current charging CC2 is performed (step S4), and when full charging is achieved through constant-voltage charging (step S5), the charging is completed. To a constant current Icc1 of CC1, a constant current Icc2 of CC2 is in a relationship of Icc2<Icc1.

In this charging process, as shown in FIG. 3, after the rechargeable battery 6 is raised to a predetermined voltage (e.g., 3 [V]) through preliminary charging (PR) with a preliminary current Ipre, a charging current Ic is increased to a constant current Icc1 to utilize the drooping characteristic of the AC adaptor 8 to perform the first constant-current charging CC1 and second constant-current charging CC2, and after constant charging CV, the charging of the rechargeable battery 6 is reaches to, for example, 4.2 [V] and completed. FIG. 3 is a diagram showing transitions of charging forms, charging currents and charging voltages. In this case, the output voltage of the AC adaptor 8 is set higher than the charging completion voltage, and maximum heat generation happens at the point of time when the second constant-current charging is switched to the constant-voltage charging.

The heat generation amount due to the charging operation is described with reference to FIG. 4. FIG. 4 is a diagram showing transitions of the heat generation amount in each portion during the charging operation.

In the charging operation, for the heat generation in the PMOSTr 12, diode 14 and sense resistor 16 in the first constant-current charging CC1 region (t1 to t2), the heat generation of the diode 14 is largest and accounts for one-half of the total heat generation amount. In the second constant-current charging CC2 region (t2 to t3), the total heat generation amount is larger than the constant-current charging CC1 region (t1 to t2), and the heat generation amounts of the diode 14 and sense resistor 16 is smaller than the CC1 region (t1 to t2), while the heat generation amounts of the PMOSTr 12 accounts for two third of the total heat generation amount. In the constant-voltage charging CV region (t3 to t4), the heat generation amount is reduced dependently on reduction of the charging current. In the total heat generation amount of the region (t1 to t4), the heat generation amount of the PMOSTr 12 is largest. In this heat generation, when making the shift to the constant-current charging CC2, PMOSTr 12 generates heat depending on electric power applying a voltage. Such heat generation leads to energy loss.

By the way, a start voltage of the constant-current charging CC1 is set to, for example, about 3 [V], and the charging current Ic is dependent on the output of the AC adaptor 8 because the drooping characteristic of the AC adaptor 8 is used. Therefore, in the CC1 region, the charging current Ic is on the order of 670 [mA]. Assuming that an output voltage of the AC adaptor 8 is Voa and a battery voltage is Vb, the output voltage Voa is as follows:

$$Voa = Vb + (\text{external part resistance } [\Omega] \times Ic) \qquad (1)$$

The external part generates heat depending on this acceptable loss.

In this case, assuming that a voltage drop of the diode 14 is 0.3 [V], the heat generation amount Pd is as follows:

$$Pd=0.3\ [V] \times Ic \tag{2}$$

When a constant current Icc2 in the CC2 region is set to, for example, 350 [mA], if the output voltage Voa is about 5.4 [V], a large portion of a difference voltage ΔV (=Voa−Vb) between the battery voltage Vb and the output voltage Voa of the AC adaptor 8 is concentrated on the PMOStr 12, and the heat generation amount of the PMOStr 12 accounts for a large portion of the total heat generation amount. Assuming that the loss due to the external part is about 456 [mW], about 318 [mW] is lost by the heat generation of the PMOSTr 12. Since the charging current Ic comes down below CC1 at the time of the shift to CC2, the battery voltage Vb comes down to on the order of 3.9 [V] and then, the battery voltage Vb is raised by the constant-current charging CC2 to make the shift to the constant-voltage charging CV at the battery voltage Vb=4.2 [V].

In the constant-voltage charging CV, constant-voltage control is performed such that the battery voltage Vb will be 4.2 [V], and as the rechargeable battery 6 approaches full charge, the charging current Ic is reduced. In the CV region, since the charging current is small, the heat generation is lower than the CC2. The charging is completed and the charging operation is terminated if the charging current Ic reduced to on the order of 50 [mA].

A charging apparatus 2 in FIG. 5 is a case that a PMOSTr 18 is used as a backflow prevention element, instead of the diode 14 described above. In FIG. 5, the same symbols are added to the same portions as FIG. 1. In the charging apparatus 2, the PMOSTr 18 is operated by a control signal applied from the charging IC 10 to a gate to regulate the direction of the charging current Ic passing through the charging path 11.

In regard to the heat generation amount of the charging apparatus 2 shown in FIG. 5, as shown in FIG. 6, in the first constant-current charging CC1 region (t1 to t2) the heat generation of the sense resistor 16 is largest and accounts for one-half of the total heat generation amount. The total heat generation amount in the second constant-current charging CC2 region (t2 to t3) is about twice larger than the constant-current charging CC1 region (t1 to t2), and the heat generation amounts of the PMOSTr 18 and the sense resistor 16 are dropped to on the order of one-fifth of the total heat generation amount, while the heat generation amount of the PMOSTr 12 accounts for four-fifth of the total heat generation amount. In the constant-voltage charging CV region (t3 to t4), the heat generation amount is reduced dependently on reduction of the charging current. In this heat generation, when making the shift to the constant-current charging CC2, PMOSTr 12 generates heat depending on electric power applying a voltage. As described above, such heat generation leads to energy loss.

In a charging apparatus 2 shown in FIG. 7, a switching power source 20 is disposed with in the charging IC 10, and the output of the switching power source 20 is picked up after passing though a filter circuit 26 consisting of an inductor 22 and capacitor 24 and is supplied to the rechargeable battery 6 through the charging path 11. In this case, although the PMOSTr 18 for backflow prevention is disposed in the charging path 11, the PMOSTr 18 may be omitted.

In the charging apparatus 2, the AC adaptor 8 is used as a charging source, and the output of the AC adaptor 8 is applied to the switching power source 20 to generate constant currents Icc1, Icc2 and a constant voltage Vc which achieve a first constant-current charging CC1, second constant-current charging CC2 and constant-voltage charging CV. Therefore, in regard to the heat generation amount of the charging apparatus 2 (FIG. 7), as shown in FIG. 8, in the first constant-current charging CC1 region (t1 to t2) the heat generation of the switching power source 20 is largest and accounts for one-half of the total heat generation amount. The total heat generation amount in the constant-current charging CC2 region (t2 to t3) is reduced to on the order of one-half of the constant-current charging CC1 region (t1 to t2); the heat generation amount of the switching power source 20 also comes down to on the order of one-half of the total heat generation amount as compared to the region of the constant-current charging CC1 (t1 to t2); and in the constant-voltage charging CV region (t3 to t4), the heat generation amount is reduced dependently on reduction of the charging current.

By using such a switching power source 20, when the charging current Ic of the constant-current charging CC1 is enlarged, the heat generation amount is increased, and although the capacity of the switching power source 20 may be increased in order to constrain the heat generation, the cost is increased. In other words, if a DC-DC conversion efficiency η of the switching power source 20 is η=90 [%], the heat generation amount Ph is Ph=about 347 [mW] and the heat generation amount is increased. By increasing the output current of the switching power source 20 to on the order of 700 [mA] in order to ensure the charging current Ic, the cost is increased.

Therefore, in regard to electronic devices, such as cellular phones, equipped with rechargeable batteries, device chassis are miniaturized and thinned as well as equipped batteries are planned to be large capacity, and it is requested to constrain the heat generation when the devices are operated for phone calls and the like during the charging operation.

Japanese Patent Application Laid-Open Publication Nos. 1999-327671 and 2003-274570 do not disclose such issues and not disclose or indicate any configurations for solving the issues.

SUMMARY OF THE INVENTION

An object of the present invention relates to charging of rechargeable batteries built into electronic devices and is to constrain heat generation during the charging.

Another object of the present invention relates to charging of rechargeable batteries using external devices such as Ac adaptors or USB hosts and is to plan to promote the efficiency of the charging.

The configurations of the present invention for solving the issues are listed and described.

In order to achieve the above objects, according to a first aspect of the present invention there is provided a charging IC used for charging a rechargeable battery built into an electronic device, comprising a power source unit which can be fed with power from an external power source with a drooping characteristic to pick up a constant current; and a control unit which applies a first constant current from the external power source to the rechargeable battery through a circuit element disposed on a charging path of the rechargeable battery, the control unit applying a second constant current smaller than the first constant current from the power source unit to the rechargeable battery after the rechargeable battery is charged with the first constant current to a predetermined voltage.

According to such a configuration, the rechargeable battery is charged by applying the first constant current to the rechargeable battery from the external power source, such as an AC adaptor, with the drooping characteristic, and after the rechargeable battery is charged to the predetermined voltage, the rechargeable battery can be charged by applying the second constant current from the power source unit built into the charging IC to the rechargeable battery. In this charging, a current value is large for the first constant current supplied to the rechargeable battery from the external power source with the drooping characteristic, and the second constant current supplied from the power source unit built into the charging IC is smaller than the first constant current. Therefore, although the cause of the heat generation on the charging IC side exists in the power source unit applying the second constant current, the heat generation amount thereof is small, since the current value of the second constant current is smaller than that of the first constant current. In this case, since the second constant current is directly supplied from the power source unit to the rechargeable battery and the circuit elements are not involved, the circuit elements do not generate heat when the second constant current is supplied. Also, although the first constant current is applied through the circuit elements which generate heat, the heat generation amount thereof is small. As compared to the conventional case of applying the second constant current through a PMOSTr (FIG. 8), the heat generation amount is considerably reduced. Therefore, the heating or heat generation amount is constrained in the electronic device equipped with the charging IC.

Also, when generating the first constant current or when allowing the power supply unit to generate the second constant current, the heat generation of the external power source occurs outside of the electronic device which is the device equipped with the charging IC and, therefore, is irrelevant to the heat generation of the electronic device.

In the charging IC of the present invention, the power source unit is preferably fed with power from an external device connected to the electronic device to output the constant current or a constant voltage, and the control unit is preferably configured to apply a constant voltage from the power source unit to the rechargeable battery to switch over to constant-voltage charging after the charging with the second constant current. According to such a configuration, the rechargeable battery is charged to the predetermined voltage by the constant-voltage charging.

In the charging IC of the present invention, the external power source may be, but not exclusively, an AC adaptor converting an alternate current received from an alternate-current power source into a direct current with a predetermined voltage to be picked up. The power source unit is preferably, but not exclusively, a switching power source converting direct-current input to direct-current output.

In order to achieve the above objects, according to a second aspect of the present invention there is provided a charging IC used for charging a rechargeable battery built into an electronic device, comprising a power source unit which is fed with power from an external device connected to the electronic device to output constant currents; and a control unit which switches constant currents applied from the power source unit to the rechargeable battery based on power-feeding information provided from the external device.

According to such a configuration, although the constant current is obtained in the power source unit due to the power feeding from the external device and the rechargeable battery is charged by this constant current, if the power feeding capacity is high, based on the power feeding information provided from the external device, switch-over to the power source unit is performed, and the rechargeable battery is charged with the switched larger constant-current. In this case, since the rechargeable battery is charged by the low-power power source unit or the power source unit, the heat generation amount of the charging IC is constrained and, in turn, the heating or heat generation amount is constrained in the electronic device equipped with the charging IC.

In this charging IC of the present invention, the power source unit may be fed with power from an external device connected to the electronic device and comprise of a first power source circuit outputting a constant current and a second power source circuit outputting a constant current smaller than the first power source circuit; and the control unit may be configured to apply the constant current from the second power source circuit to the rechargeable battery and switch output from the second power source circuit to the first power source circuit based on power-feeding information provided from the external device to apply the constant current to the rechargeable battery.

In this charging IC, the external device is preferably, but not exclusively, an electronic device connected by a USB cable.

In order to achieve the above objects, according to a third aspect of the present invention there is provided a charging apparatus used for charging a rechargeable battery built into an electronic device, comprising: a power source unit which is fed with power from an external power source having a drooping characteristic or an external device connected to the electronic device; a switch which is disposed between the power source unit and the external power source or the external device to switch connection of the external power source or the external device with the power source unit; a circuit element disposed on a charging path of the rechargeable battery; and a control unit, if the external power source is connected to the power source unit, applying a first constant current from the external power source to the rechargeable battery through the circuit element and applying a second constant current smaller than the first constant current from the power source unit to the rechargeable battery after the rechargeable battery is charged with the first constant current to a predetermined voltage, the control unit, if the external device is connected to the power source unit, switching a constant current in accordance with a power-feeding capability of the external device based on power-feeding information provided from the external device to apply the constant current to the rechargeable battery.

According to such a configuration, power is supplied to the power source unit by either the external power source having a drooping characteristic or the external device for connecting with the electronic device having the rechargeable battery, the switch is used for switching the power supply, charging is controlled responding to the switching. When the external power source is selected, the rechargeable battery is charged by applying the first constant current to the rechargeable battery from the external power source, such as an AC adaptor, with the drooping characteristic, and after the rechargeable battery is charged to the predetermined voltage, the rechargeable battery can be charged by applying the second constant current from the power source unit. In this charging, since a current value is large for the first constant current supplied to the rechargeable battery from the external power source with the drooping characteristic and the second constant current supplied from the power source unit has smaller current value than the first constant current, the heat generation amount is small. In this case, since the second constant current is directly supplied from the power source unit to the rechargeable battery and the circuit elements are not involved, the circuit elements do not generate heat when the second constant current is supplied. Also, although the first constant current is applied through the circuit elements which generate heat, the heat generation amount thereof is small. As compared to the conventional case of applying the second constant current through a PMOSTr (FIG. 8), the heat generation amount is considerably reduced. Therefore, the heating or heat generation amount is suppressed in the electronic device equipped with this charging IC. When the external device is selected, current is switched to a constant current depending on a power-feeding capability of the external device based on power-feeding information provided from the external device thereby recharging the rechargeable battery by this constant current.

In the charging apparatus of the present invention, the switch may be, but not exclusively, configured to select either the external power source or the external device or select the external power source to connect to the power source unit, if both of the external power source and the external device are connected.

In this charging apparatus, the control unit is preferably, but not exclusively, configured to select either the external power source or the external device with the switch to connect to the power source unit, if both of the external power source and the external device are connected.

In the charging apparatus, the power source unit may be fed with power from an external device connected to the electronic device to output a current or voltage in accordance with a power-feeding capability of the electronic device, and the control unit may be configured to switch over to constant-voltage charging after the charging with the second constant current.

The technical features, advantages, etc., of the present invention are listed as follows.

(1) Heat generation is suppressed in the charging IC, and heating and a heat generation amount are suppressed in a charging apparatus or an electronic device installed the charging IC.

(2) Heat generation is suppressed in a charging apparatus, heating and a heat generation amount are suppressed in an electronic device installed the charging apparatus.

(3) According to the electronic device having installed the charging IC or the charging apparatus as described above, heating and a heat generation amount are suppressed and heat radiation measures can be made lighter. For example, when the charging IC and the charging apparatus is used in the electronic device, heat radiation measures can be made lighter resulting from suppressed heating and heat generation amount. As an electronic device, for example, heat radiation measures of a mobile terminal can be made lighter, which facilitates to make the product thinner.

Other objects, features and advantages of the present invention will become more apparent from the following description of the embodiments when taken in conjunction with the accompanying drawings.

DETAILED DESCRIPTION OF THE PREFERRED EMBODIMENTS

First Embodiment

Figure 9:
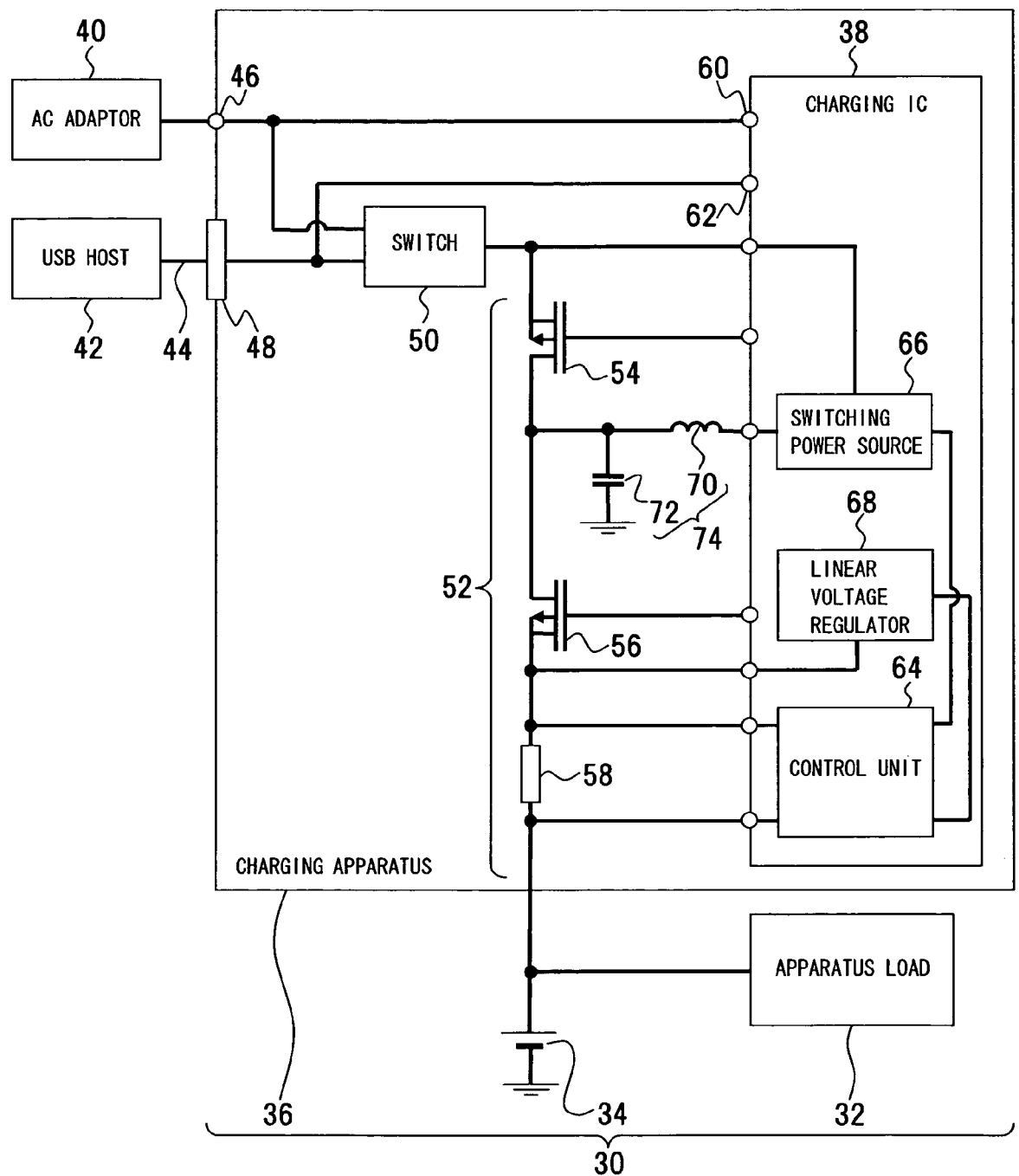
FIG. 9 is a diagram showing an outline of a charging IC, a charging apparatus and an electronic device according to a first embodiment.

A first embodiment of the present invention will be described with reference to FIG. 9. FIG. 9 is a diagram showing an outline of a charging IC, a charging apparatus and an electronic device according to the first embodiment.

An electronic device 30 is equipped with a rechargeable battery 34 feeding power to an apparatus load 32 as well as a charging apparatus 36 charging the rechargeable battery 34, and the charging apparatus 36 is equipped with a charging IC 38. The electronic device 30 is a mobile terminal apparatus such as a cellular phone and a device such as an electronic camera and may be any device, as long as a rechargeable battery is equipped or used. The apparatus load 32 is a load consuming electric energy supplied from the rechargeable battery 34. The rechargeable battery 34 is a secondary battery, such as a lithium-ion battery, which can discharge and can be charged. The charging IC 38 integrates circuit units such as a power source unit and control unit which can be integrated in the charging apparatus, and is used for controlling the charging of the rechargeable battery 34 and switching the charging patterns.

As charging sources of the rechargeable battery 34, for example, an AC adaptor 40 is used as an external power source and, for example, a USB (Universal Serial Bus) host 42 is used as an external device with a power-feeding capability. The AC adaptor 40 is a power supply apparatus constituted by an AC-DC converter connected to, for example, an outlet of a commercial alternating-current power supply AC to convert the commercial alternating current into a direct current (DC) with a desired voltage. The USB host 42 is, for example, an electronic device with a power-feeding capability, such as a personal computer, and feeds power through a USB cable 44. Devices other than the USB host 42 may be used as the external device.

The charging apparatus 36 is connected to the AC adaptor 40 with an adaptor connector 46 which is a connection unit as well as connected to the USB cable 44 of the USB host 42 with a USB connector 48 which is a connection unit. A switch 50 is used for selecting a charging source and, for example, if both of the AC adaptor 40 and the USB host 42 are connected, the switch 50 is used for switch-over to give priority to, for example, the connection of the AC adaptor 40 as one or the other of the devices or as a device with higher power-feeding capability.

A charging path 52 is formed between the switch 50 and the rechargeable battery 34. The charging path 11 is equipped with a PMOSTr 54 as a charging control circuit element, a PMOSTr 56 as a backflow prevention circuit element and a sense resistor 58 as a current detection element, which constitute a series circuit. The PMOSTr 54 is controlled by the charging IC 38 and applies a first constant current Icc1 to the rechargeable battery 34 through the charging path 52. The PMOSTr 56 is controlled by the charging IC 38 and prevents currents from flowing back from the rechargeable battery 34 through the charging path 52 to the AC adaptor 40 or USB host 42. The sense resistor 58 converts the charging current flowing through the charging path 52 to a voltage to be detected and the detected voltage is applied to the charging IC 38 as control information.

The charging IC 38 is provided with an adaptor detection terminal 60 and a USB detection terminal 62 as well as a control unit 64, a switching power source 66 and a linear voltage regulator 68 as a built-in power source unit and others. The switching power source 66 is, for example, a DC-DC converter generating a constant-current output or constant-voltage output and constitutes a first power source circuit built into the charging IC 38. The linear voltage regulator 68 is, for example, an LDO (Low Drop Out) generating a constant current smaller than the constant current output from the switching power source 66, which is used for preliminary charging, and constitutes a second power source circuit built into the charging IC 38. The control unit 64 is constituted by a micro processor, for example. To the charging IC 38, the output voltage of the AC adaptor 40 is applied through the adaptor detection terminal 60 and the output voltage of the USB host 42 is applied through the USB detection terminal 62. The output of the switching power source 66 is smoothed by a smoothing circuit consisting of an inductor 70 and capacitor 72 and is applied to the charging path 52, and the low constant current output of the linear voltage regulator 68 is directly applied to the charging path 52.

The control unit 64 is used for charging control of the charging pattern corresponding to the AC adaptor 40 or USB host 42. The connection of the AC adaptor 40 or USB host 42 can be known by voltage information applied to the adaptor detection terminal 60 or USB detection terminal 62. If the AC adaptor 40 is connected: preliminary charging is performed by the linear voltage regulator 68 when needed; constant-current charging CC1 is performed with a constant current Icc1 under the control of the PMOSTr 54; and constant voltage charging CV is performed with a constant voltage Vc under the control of the switching power source 66. If the USB host 42 is connected, preliminary charging is performed by the linear voltage regulator 68 when needed and constant-current charging CC2 is performed with a constant current Icc2 or constant voltage charging CV is performed with a constant voltage Vc under the control of the switching power source 66. The preliminary charging accommodates the case that the rechargeable battery 34 has seriously discharged and is the charging performed preliminarily for speeding up the charging, which is not always necessary.

According to such a configuration, in this embodiment, if both the AC adaptor 40 and the USB host 42 are connected: the switch 50 selects the connection of the AC adaptor 40; the connection of the USB host 42 is bypassed; the preliminary charging is performed with the output current of the linear voltage regulator 68 by the power feeding of the AC adaptor 40 as needed; after the preliminary charging, the constant-current charging CC1 is performed with the constant current Icc1 by the output of the AC adaptor 40 and the constant current control of the PMOSTr 54; after the charging, the constant-current charging CC2 is performed with the constant current Icc2 which is the output of the switching power source 66; after the charging, the constant-voltage charging CV is performed with the constant voltage Vc which is the output of the switching power source 66; and the rechargeable battery 34 is charged to a predetermined voltage. In this charging, the charging current is detected by the sense resistor 58 and the detected current is applied to the control unit 64 as control information to perform the constant current control of the PMOSTr 54 and the constant current control or constant voltage control of the switching power source 66.

When only the USB host 42 is connected or the USB host 42 is selected: the preliminary charging is performed with the output current of the linear voltage regulator 68 by the power feeding of the USB host 42 as needed; after the preliminary charging, the constant-current charging CC2 is performed with the constant current Icc2 which is the output of the switching power source 66; after the charging, the constant-voltage charging CV is performed with the constant voltage Vc which is the output of the switching power source 66; and the rechargeable battery 34 is charged to a predetermined voltage. Also, in this charging, the charging current is detected by the sense resistor 58 and the detected current is applied to the control unit 64 as control information to perform the constant current control and the constant voltage control of the switching power source 66.

The characteristics of the embodiment are listed as follows.

(1) In the first constant-current charging CC1, the rechargeable battery 34 is charged using the drooping characteristic of the AC adaptor 40 and the heat generation is constrained in the charging IC 38, the charging apparatus 36 and the electronic device 30. In the second constant-current charging CC2 and the constant-voltage charging CV, the switching power source 66 is used and similarly, the heat generation is constrained in the charging IC 38, the charging apparatus 36 and the electronic device 30.

(2) The AC adaptor 40 and the USB host 42 can be switched by the switch 50 and the charging apparatus 36 with low heat generation can be achieved when charging with the AC adaptor 40.

(3) The charging IC 38 is provided with the detection terminals 60, 62 for the AC adaptor 40 and the USB host 42 to determine connected devices from voltages applied to the detection terminals 60, 62, and if the USB host 42 is detected, the second constant-current charging CC2 and the constant-voltage charging CV are performed.

Figure 17:
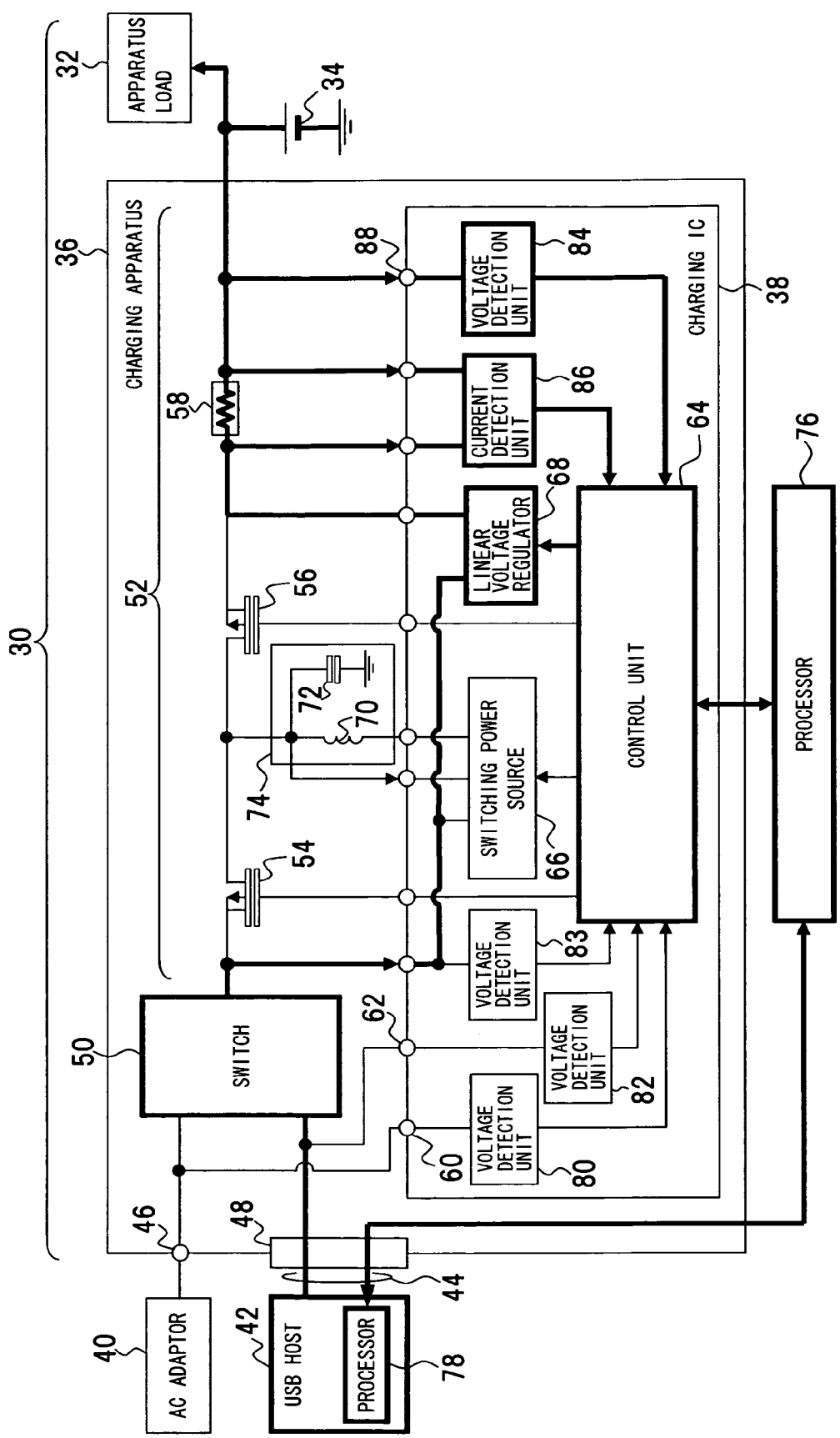
FIG. 17 is a circuit diagram showing a charging operation in the case of using a USB host.

(4) If the USB host 42 is used as the charging source, after the power-feeding capability of the USB host 42 is identified from communication between the USB host 42 and the electronic device 30 or charging apparatus 36, for example, by providing power-feeding information representing the power-feeding capability of the USB host 42 during the preliminary charging PR, the charging can be performed by feeding power from the USB host 42 to the switching power source 66 and by switching from the preliminary current Ipre to the constant current Icc2 (>Ipre) (e.g., FIG. 17). In this way, speed-up of the charging with low heat generation can be planned.

Figure 10:
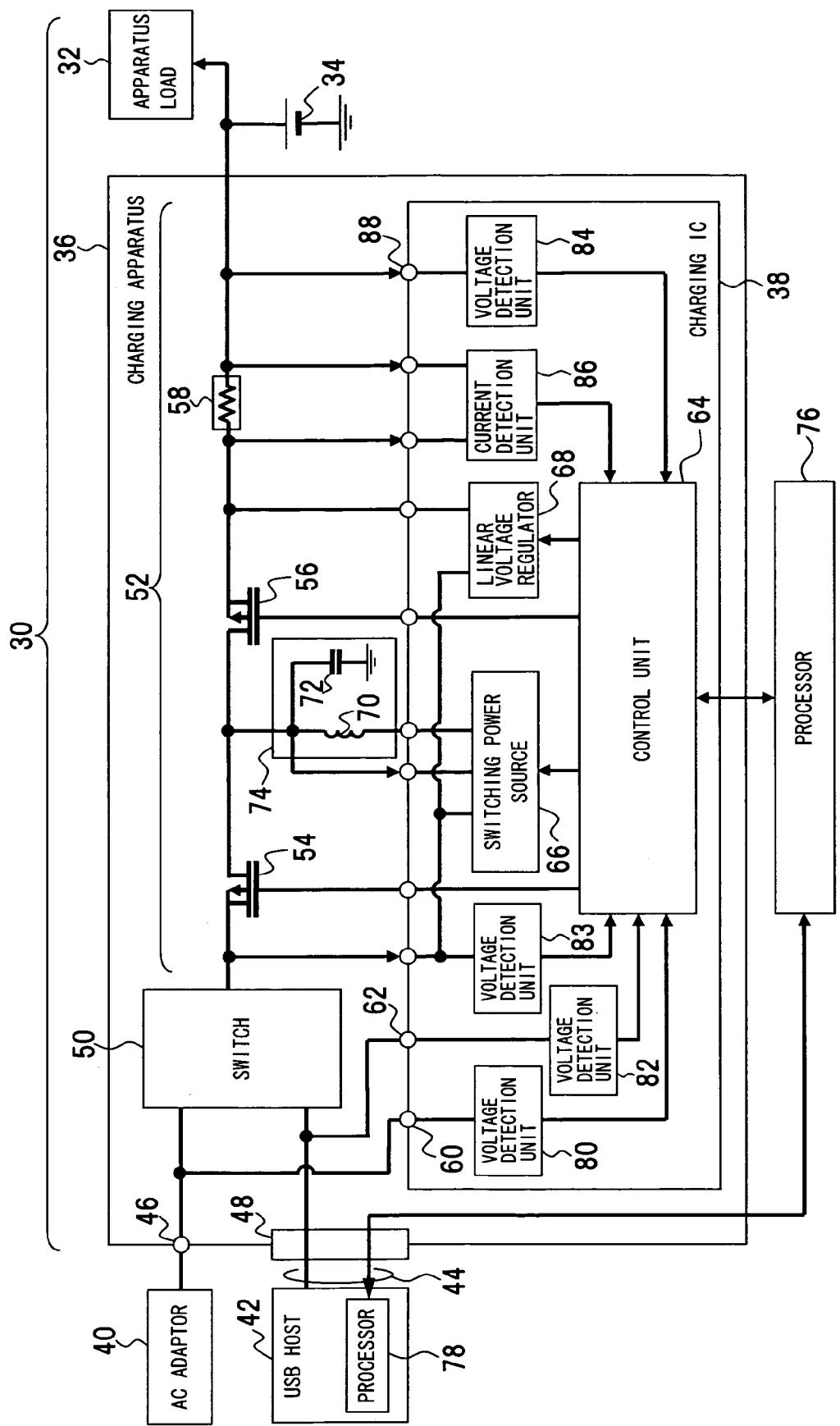
FIG. 10 is a diagram showing a configuration example of the charging IC, charging apparatus and electronic device according to the first embodiment.

Then, a configuration of the electronic device 30, charging apparatus 36, charging IC 38 and USB host 42 are described with reference to FIG. 10. FIG. 10 is a diagram showing a configuration example of the electronic device 30, charging apparatus 36, charging IC 38 and USB host 42. In FIG. 10, the same symbols are added to the same portions as FIG. 9.

In the electronic device 30 equipped with the charging apparatus 36, a processor 76 constituted by a CPU (Central Processing Unit) and the like is disposed, and a processor 78 constituted by a CPU and the like is built into the USB host 42. These processors 76, 78 are connected via the USB cable 44 and USB connector to transmit and receive information between the processors 76, 78. In this embodiment, to a query from the processor 76, the processor 78 transmits information representing the power-feeding capability of the USB host 42 as the control information to the processor 76. The control information obtained by the processor 76 is transmitted to the control unit 64. In this case, if the power-feeding capability of the USB host 42 is high, the operation is switched from the linear voltage regulator 68 to the switching power source 66, and the charging current is supplied from the switching power source 66 to the rechargeable battery 34.

The charging IC 38 is equipped with the control unit 64, switching power source 66 and linear voltage regulator 68 described above as well as with voltage detection units 80, 82, 83, 84 and a current detection unit 86. The control output of the control unit 64 is applied to gates of the PMOSTr 54, 56. The voltage detection unit 80 detects the output voltage of the AC adaptor 40 and the voltage detection unit 82 detects the output voltage of the USB host 42. The voltage detection unit 83 detects input voltage applied to the switching power source 66 and the linear voltage regulator 68 of the charging IC 38 through the switch 50. These detected voltages are used a identification information of the AC adaptor 40 and the USB host 42. This information is used for switching of the switch 50. The voltage detection unit 84 detects the voltage of the rechargeable battery 34 applied through a voltage detection terminal 88, and the detected voltage is used as charging control information. For example, the detected voltage is used for determining whether the preliminary charging is necessary or not, for switching from the preliminary charging PR to the first constant-current charging CC1, for switching from the first constant-current charging CC1 to the second constant-current charging CC2 and for switching from the constant-current charging CC2 to the constant-voltage charging CV in the course of the charging, and for terminating the charging.

Figure 11:
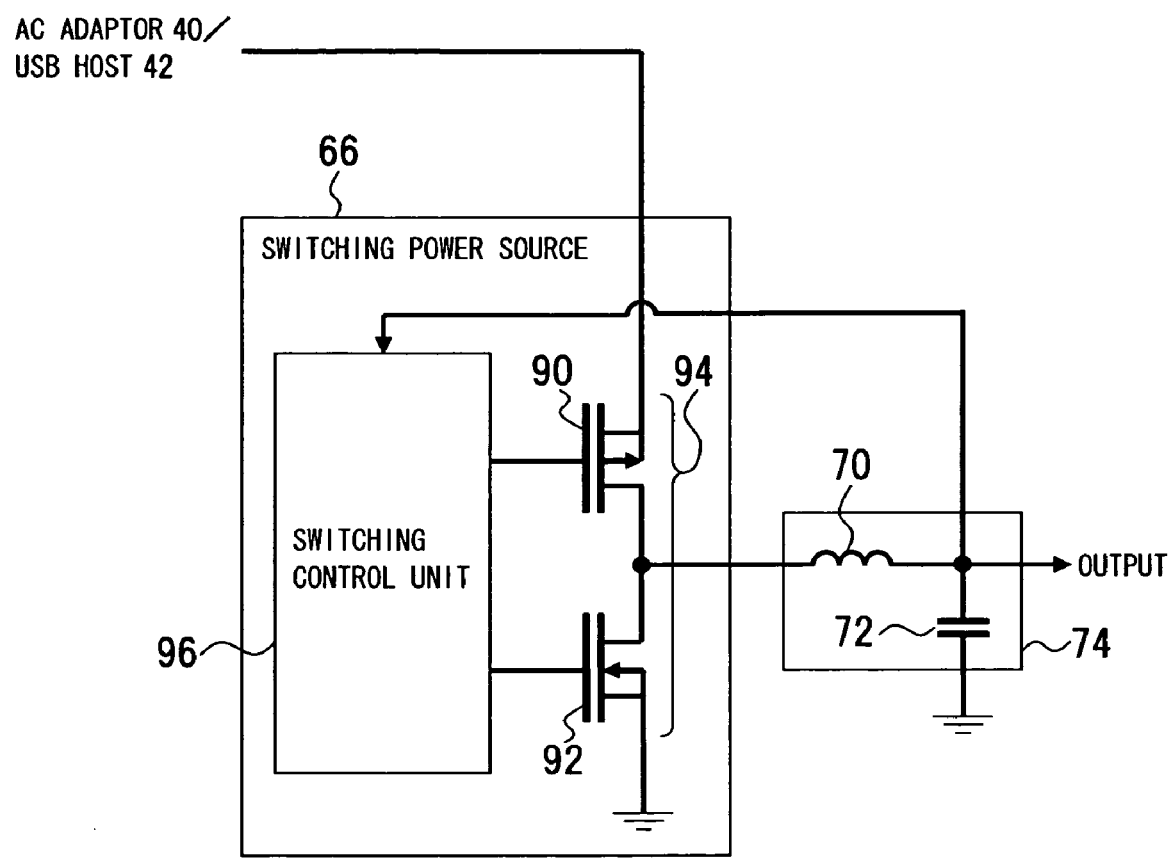
FIG. 11 is a diagram showing a configuration example of a switching power source.

As shown in FIG. 11, the switching power source 66 in the charging IC 38 is, for example, constituted by a DC-DC converter picking up direct-current output by receiving output from the AC adaptor 40 or USB host 42. In this case, a C-MOS circuit 94 constituted by a PMOSTr 90 and NMOSTr 92 is disposed, and it is configured such that switching signals are applied to a gate of each of the PMOSTr 90 and the NMOSTr 92 in this C-MOS circuit 94 and are conducted alternately through the PMOSTr 90 and the NMOSTr 92. The output of the switching power source 66 is applied to the charging path 52 through the smoothing circuit described above and is returned to a switching control unit 96.

Figure 12:
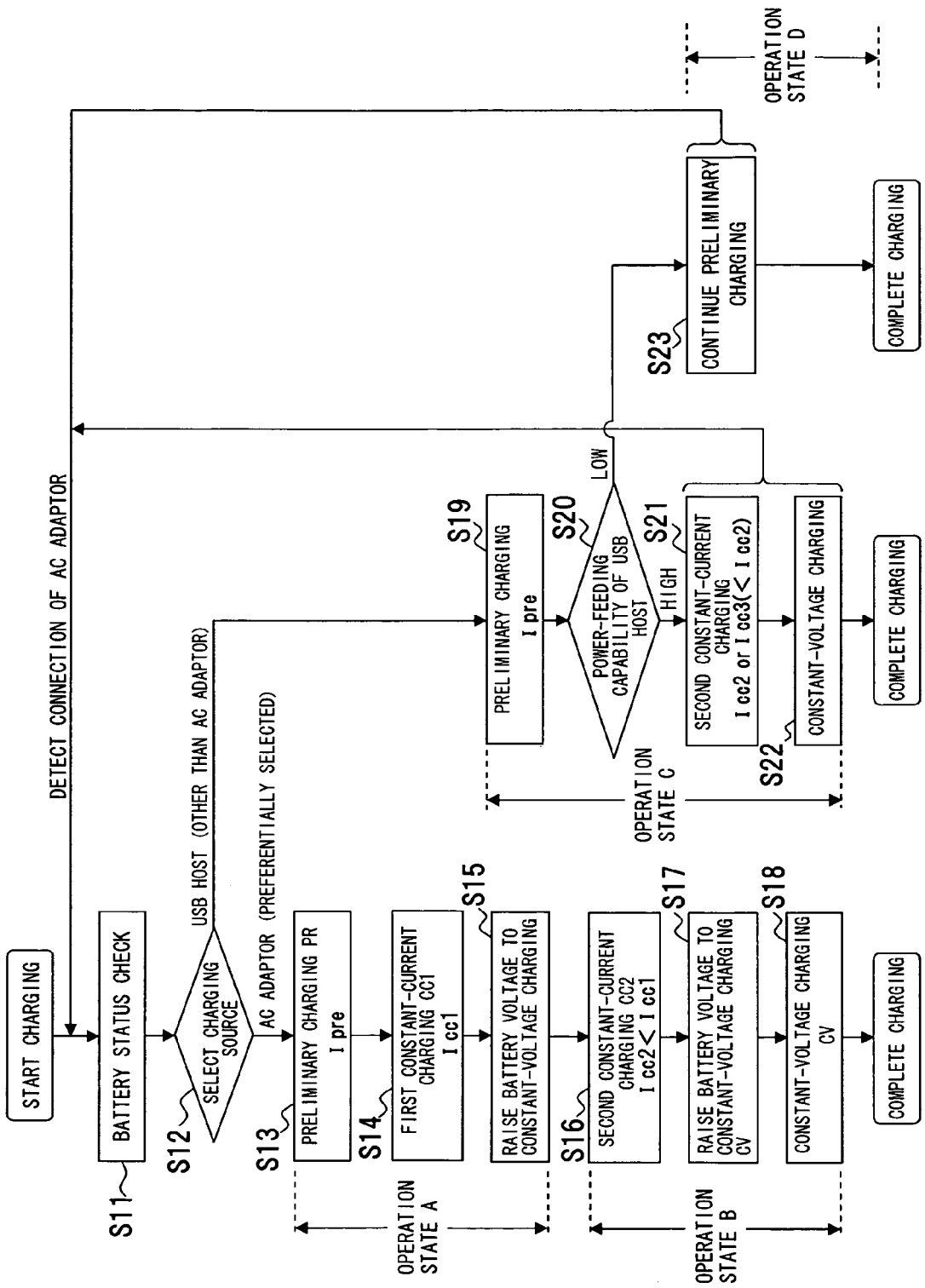
FIG. 12 is a flowchart showing a charging control method according to the first embodiment.

Then, a charging control method according to the first embodiment is described with reference to FIG. 12. FIG. 12 is a flowchart showing an example of the charging control method.

The control method is in the case of connecting both the AC adaptor 40 and the USB host 42 as the charging sources. When charging the rechargeable battery 34, a battery status check is performed for the rechargeable battery 34 (step S11). The battery status check refers to the detected voltage of the voltage detection unit 84 and the like to check statuses such as the presence of the rechargeable battery 34, a battery temperature, a battery voltage and the like. The battery status check provides information about the necessity of the preliminary charging described above and the like.

After the battery status check, if the rechargeable battery 34 is not abnormal, a charging source is selected (step S12), and in the selection of the charging source in this case, the charging source is selected by the switch 50 since both the AC adaptor 40 and the USB host 42 are connected. In this embodiment, as described above, the AC adaptor 40 is preferentially selected and the AC adaptor 40 is connected to the charging IC 38 via the switch 50.

In this case, the rechargeable battery 34 is charged to a predetermined voltage through an operation state A (steps S13, S14, S15) and an operation state B (steps S16, S17, S18). In the operation state A, if the rechargeable battery 34 is in an over-discharge state, the preliminary charging PR is performed based on the detected voltage of the voltage detection unit 84. In this case, the linear voltage regulator 68 is operated by the control unit 64 to perform the preliminary charging PR of the rechargeable battery 34 (step S13). The constant current Ipre is supplied from the charging path 52 to the rechargeable battery 34 as a preliminary current which is output from the linear voltage regulator 68 by the power feeding from the AC adaptor 40. The constant current Ipre is detected by the current detection unit 86 through the sense resistor 58 to be captured by the control unit 64 to enable the control unit 64 to recognize that the preliminary charging is in progress, and is also used for output control of the linear voltage regulator 68.

After the rechargeable battery 34 reaches to the predetermined voltage as a result of this preliminary charging PR, the first constant-current charging CC1 is performed (step S14), and in this constant-current charging CC1, the constant current CC1 is supplied to the rechargeable battery 34 through the charging path 52 by the output from the AC adaptor 40 and the constant-current control of the PMOSTr 54 with the control unit 64. The constant current Icc1 is detected by the current detection unit 86 through the sense resistor 58 to be captured by the control unit 64 and is used by the control unit 64 for the constant-current control of the PMOSTr 54, and the constant current Icc1 flows through the charging path 52 via the PMOSTr 54. In this case, the PMOSTr 54 is operated for preventing a backward current. The constant current Icc1 raises the battery voltage to the constant-voltage charging CV (step S15).

After the battery voltage is raised to the constant-voltage charging CV, a shift to the operation state B is made and the second constant-current charging CC2 is performed (step S16). In this constant-current charging CC2, the output of the AC adaptor 40 is fed to the switching power source 66, and the constant current Icc2 is output from the switching power source 66 and applied to the rechargeable battery 34 through the charging path 52. The current value of the constant current Icc2 has a relationship with the constant current Icc1, which is Icc2<Icc1. The constant current Icc2 is detected by the current detection unit 86 through the sense resistor 58 to be captured by the control unit 64 and is used by the control unit 64 for the constant-current control of the switching power source 66, and the constant current Icc2 flows through the charging path 52 via the switching power source 66. The constant current Icc2 raises the battery voltage to a voltage for starting the constant-voltage charging CV (step S17).

After the second constant-current charging CC2, the constant-voltage charging CV is performed (step S18). In the constant-voltage charging CV, constant-voltage output is generated on the smoothing circuit 74 side of the switching power source 66 by controlling the switching power source 66 with the control unit 64, and the constant-voltage output is applied to the rechargeable battery 34. After the charging voltage of the rechargeable battery 34 reaches to the predetermined voltage as a result of this, the charging is completed.

If the USB host 42 is selected in step S12, a shift to an operation state C (Steps S19, S20, S21, S22) is made. In this case, if the preliminary charging is needed, the linear voltage regulator 68 is operated by the control unit 64 to perform the preliminary charging of the rechargeable battery 34 (step S19). The linear voltage regulator 68 outputs the constant current Ipre for the preliminary charging due to the power feeding from the USB host 42. The constant current Ipre is supplied to the charging path 52 and passed to the rechargeable battery 34. The constant current Ipre is detected by the current detection unit 86 through the sense resistor 58 to be captured by the control unit 64 to enable the control unit 64 to recognize that the preliminary charging is in progress, and is also used for output control of the linear voltage regulator 68 as described above, and the preliminary charging may be performed in two (2) stages by using different current values.

In the operation of the preliminary charging, the processor 76 determines whether the power-feeding capability of the USB host 42 is high or low, with the power-feeding information from the processor 78 (step S20). If the power-feeding capability is high, after the rechargeable battery 34 reaches to the predetermined voltage with the preliminary charging, the second constant-current charging CC2 is performed (step S21). In this case, the operation is switched from the linear voltage regulator 68 to the switching power source 66 to generate the constant current Icc2 from the switching power source 66, and the constant current Icc2 passes through the smoothing circuit 74 and is supplied from the charging path 52 to the rechargeable battery 34. A current value Icc2 or current value Icc3 (<Icc2) is used for the constant current. The constant current Icc2 or Icc3 is detected by the current detection unit 86 through the sense resistor 58 to be captured by the control unit 64 and is used by the control unit 64 for the constant-current control of the switching power source 66. The constant-current Icc2 raises the battery voltage to a voltage for starting the constant-voltage charging CV.

After the battery voltage is raised to a stat voltage of the constant-voltage charging CV, the constant-voltage charging CV is performed (step S22). In the constant-voltage charging CV, constant-voltage output is generated on the smoothing circuit 74 side of the switching power source 66 by controlling the switching power source 66 with the control unit 64, and the constant-voltage output is applied to the rechargeable battery 34. After the charging voltage of the rechargeable battery 34 reaches to the predetermined voltage as a result of this, the charging is completed.

If the power-feeding capability of the USB host 42 is low, an operation state D occurs for continuing the preliminary charging PR (step S23) to allow the rechargeable battery 34 to reach the charging completion voltage, and the charging is terminated.

During the execution of the steps S21 and S22 or the execution of step S23, it is monitored with the detected voltages of the voltage detection units 80, 82, 83 whether the AC adaptor 40 is connected to the charging source, and if the AC adaptor 40 is connected, the procedure returns to step S11, and after the battery status check, the processing of steps S13 to S18 is executed.

Figure 13:
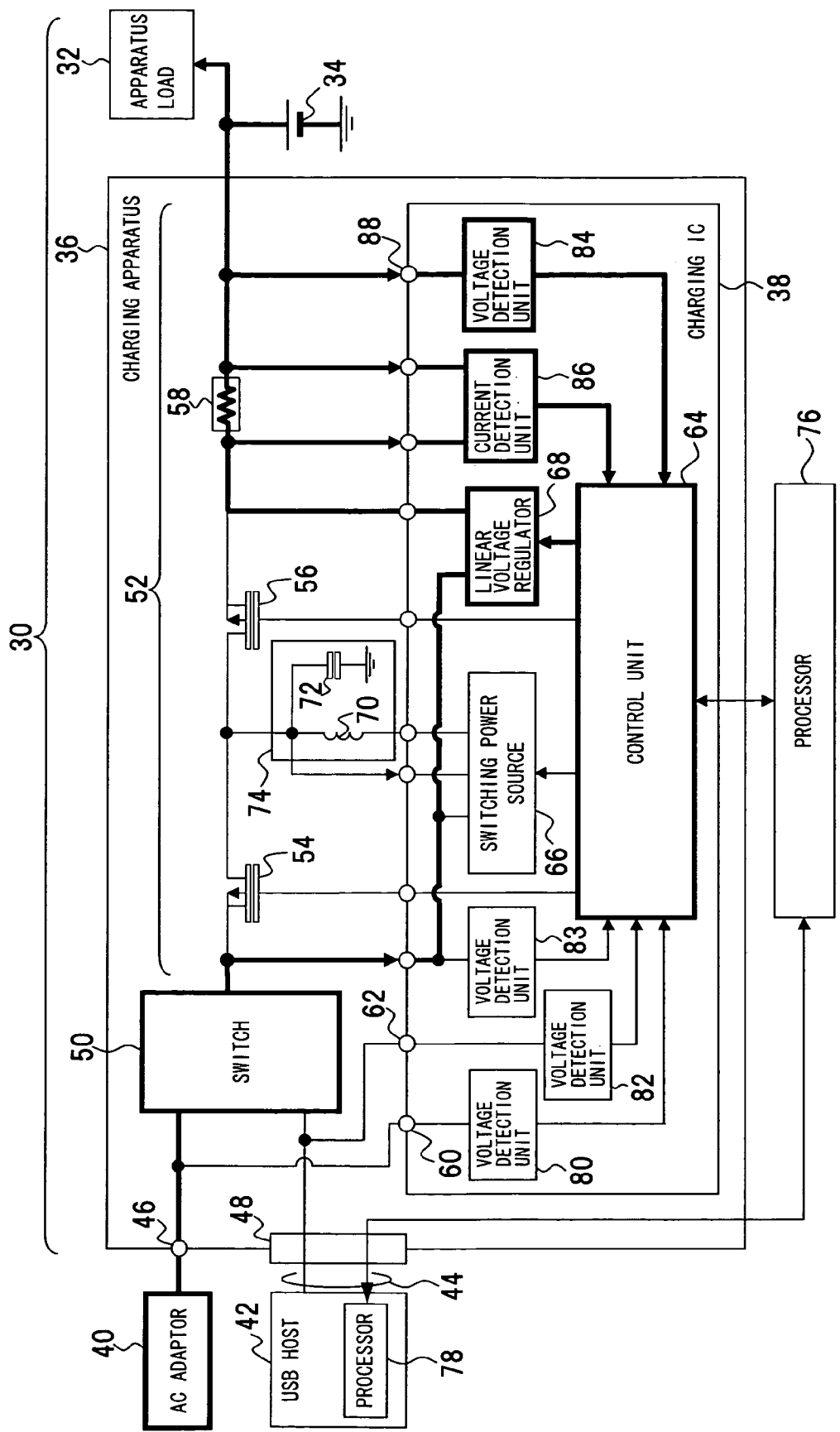
FIG. 13 is a circuit diagram showing a charging operation in the case of using an AC adaptor.
Figure 14:
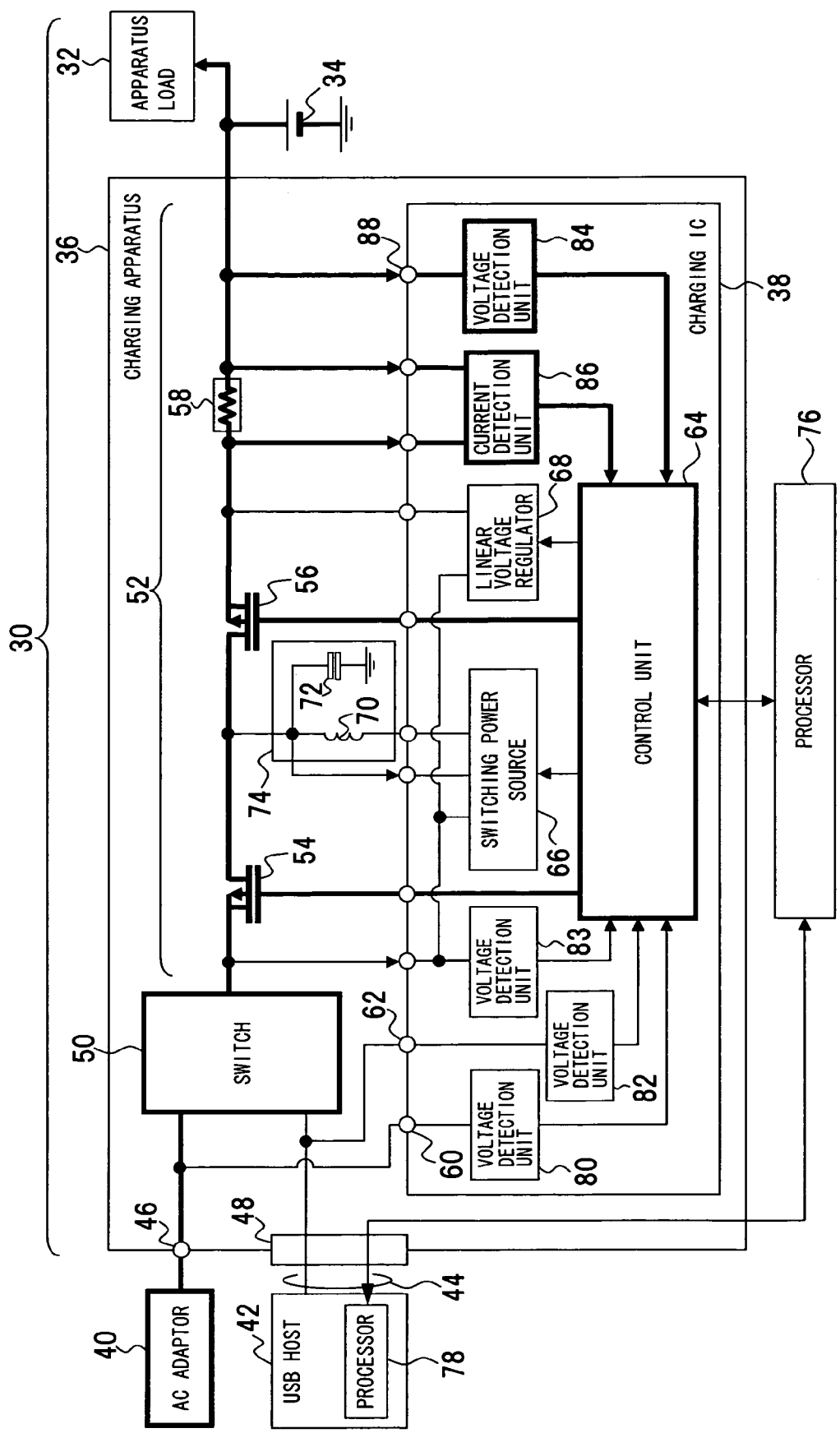
FIG. 14 is a circuit diagram showing a charging operation in the case of using an AC adaptor.
Figure 15:
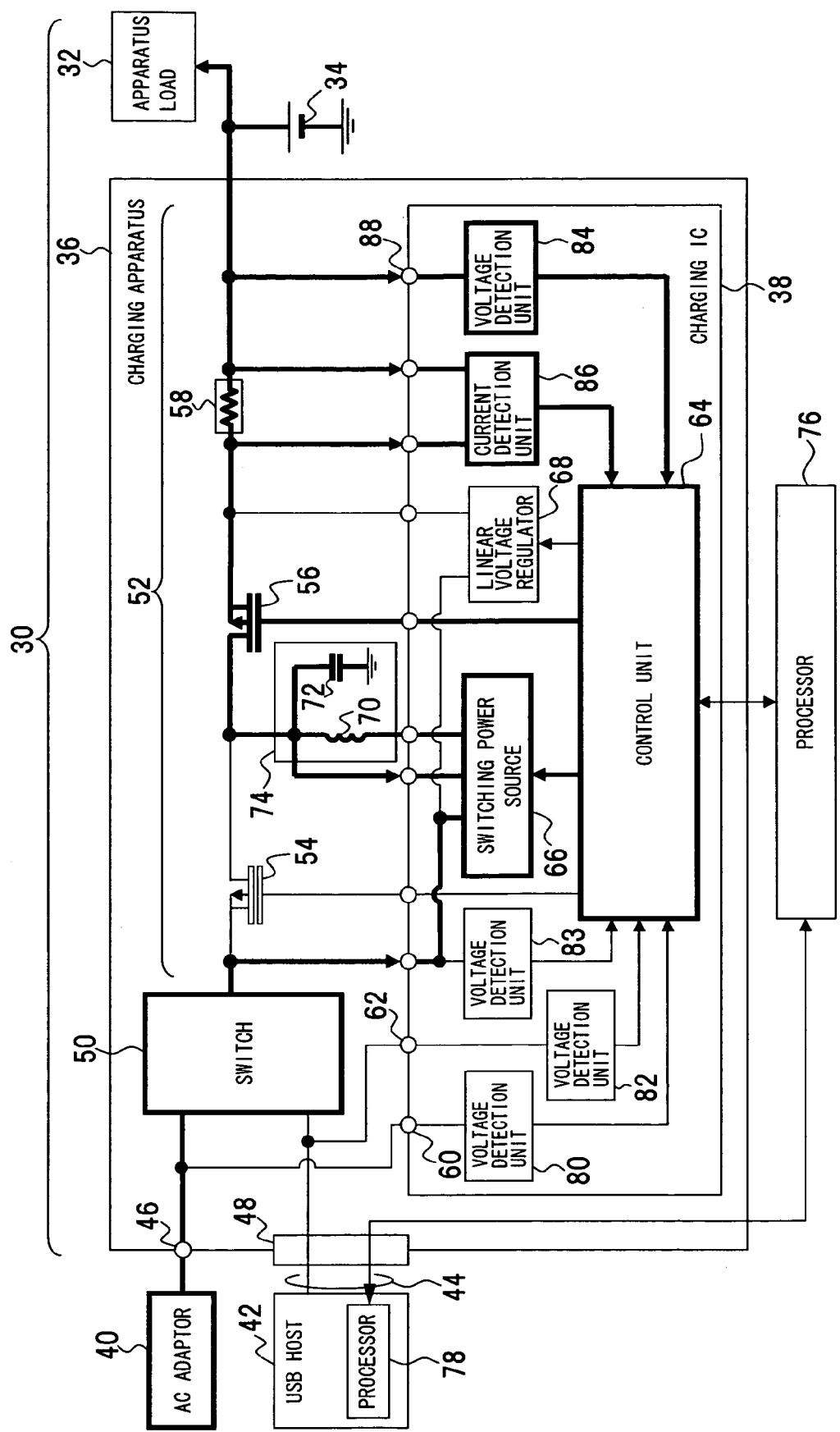
FIG. 15 is a circuit diagram showing a charging operation in the case of using an AC adaptor.
Figure 16:
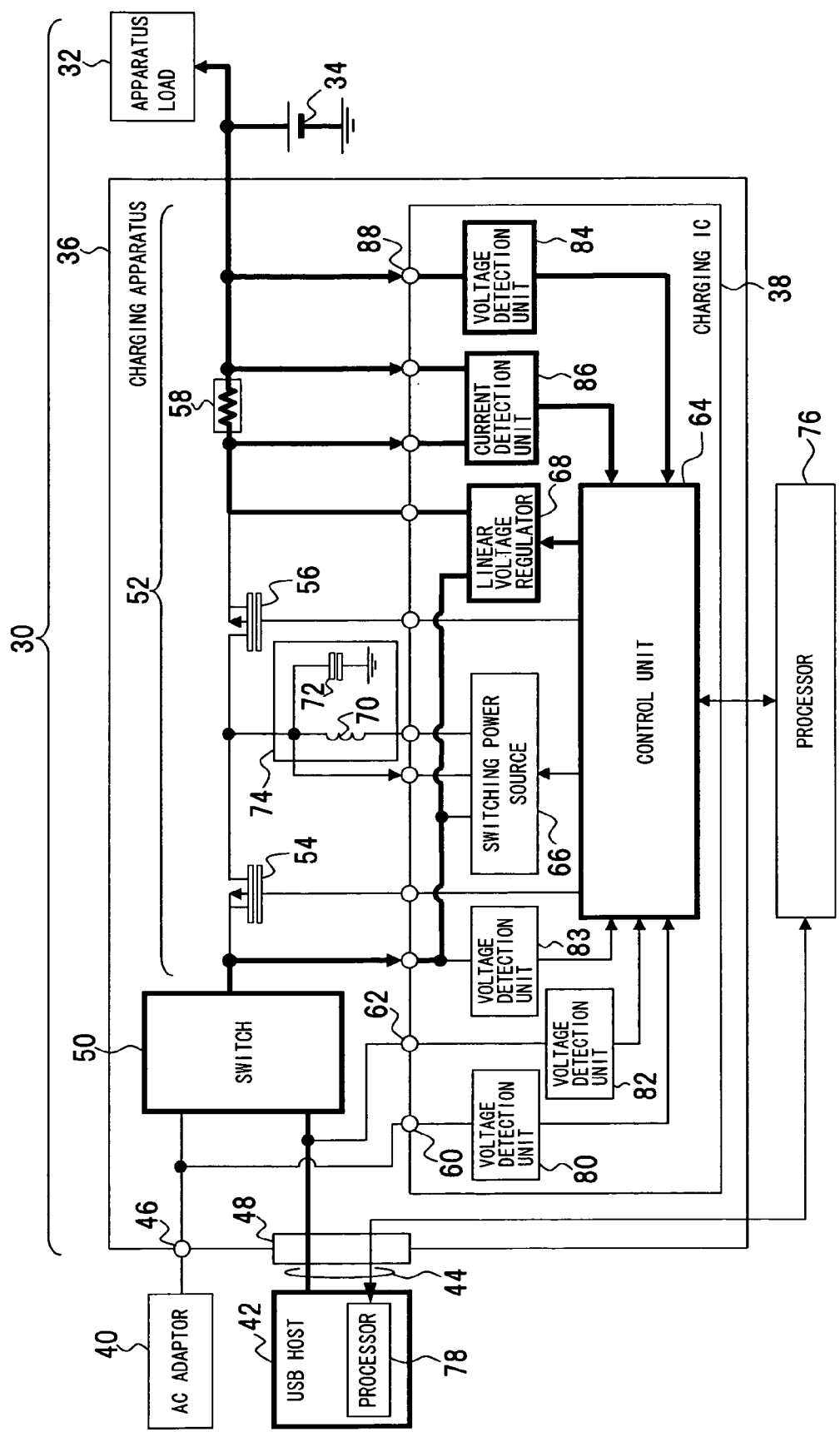
FIG. 16 is a circuit diagram showing a charging operation in the case of using a USB host.
Figure 18:
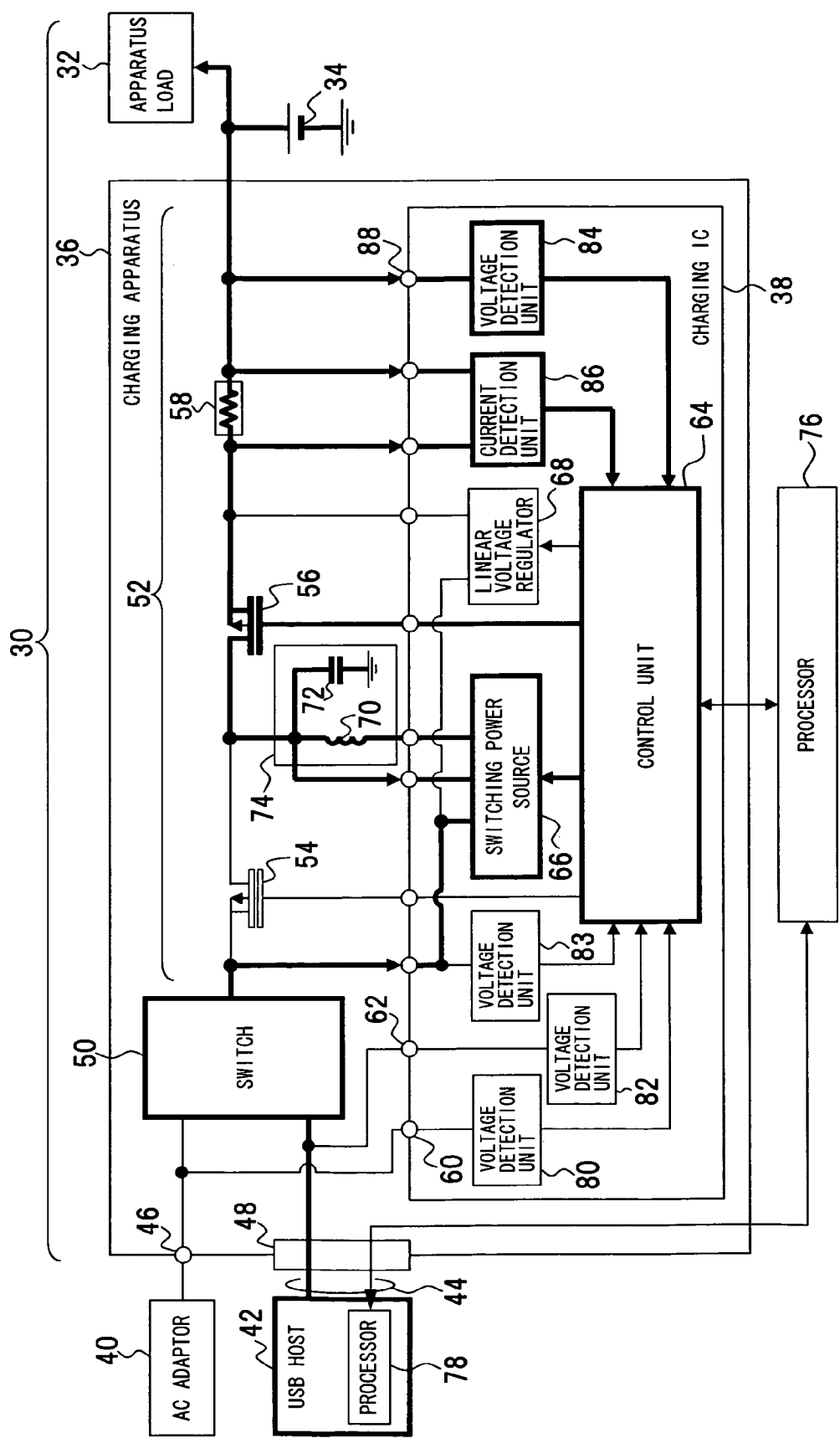
FIG. 18 is a circuit diagram showing a charging operation in the case of using a USB host.

Then, a relationship between the charging operation described above and circuit elements is described with reference to FIG. 13, FIG. 14, FIG. 15, FIG. 16, FIG. 17 and FIG. 18. FIG. 13 to FIG. 18 shows circuit operation corresponding to steps shown in FIG. 12; FIG. 13 is a diagram showing the preliminary charging using the AC adaptor 40 as the charging source; FIG. 14 is a diagram showing the first constant-current charging CC1 using the AC adaptor 40 as the charging source; FIG. 15 is a diagram showing the second constant-current charging CC2 or the constant-voltage charging CV using the AC adaptor 40 as the charging source; FIG. 16 is a diagram showing the preliminary charging using the USB host 42 as the charging source; FIG. 17 is a diagram showing transmission and reception of the power-feeding information using the USB host 42 as the charging source; and FIG. 18 is a diagram showing the constant-current charging or the constant-voltage charging using the USB host 42 as the charging source. In FIG. 13 to FIG. 18, the same symbols are added to the same portions as FIG. 9 and FIG. 10, and circuits, devices and the like in an active status are represented by bold lines.

If the preliminary charging PR is performed using the AC adaptor 40 as the charging source (step S13 of FIG. 12), as shown in FIG. 13, the preliminary charging-PR is performed through the AC adaptor 40—switch 50—linear voltage regulator 68. In this case, the current detection of the sense resistor 58 and current detection unit 86 and the voltage detection of the voltage detection unit 84 are as described above.

If the first constant-current charging CC1 is performed using the AC adaptor 40 as the charging source (steps S14, S15 of FIG. 12), as shown in FIG. 14, the charging is performed with the constant current Icc1 through the AC adaptor 40—switch 50—PMOSTr 54—PMOSTr 56. In this case, the current detection of the sense resistor 58 and current detection unit 86 and the voltage detection of the voltage detection unit 84 are as described above.

If the second constant-current charging CC2 is performed using the AC adaptor 40 as the charging source (steps S16, S17 of FIG. 12), as shown in FIG. 15, the charging is performed with the constant current Icc2 through the AC adaptor 40—switch 50—switching power source 66—PMOSTr 56. Also, if the constant-voltage charging CV is performed using the AC adaptor 40 as the charging source (step S18 of FIG. 12), as shown in FIG. 15, the charging is performed with the constant voltage Vc through the AC adaptor 40—switching power source 66—smoothing circuit 74—PMOSTr 56. The constant-current charging CC2 or the constant-voltage charging CV is determined based on the control of the switching power source 66 by the control unit 64. In these cases, the current detection of the sense resistor 58 and current detection unit 86 and the voltage detection of the voltage detection unit 84 are as described above.

If the preliminary charging PR is performed using the USB host as the charging source (step S19 of FIG. 12) as shown in FIG. 16, the preliminary charging PR is performed with the constant current Ipre through the USB host 42—switch 50—linear voltage regulator 68. The current detection of the sense resistor 58 and current detection unit 86 and the voltage detection of the voltage detection unit 84 are as described above.

In the preliminary charging PR in the case of using the USB host 42 as the charging source, as shown in FIG. 17, power-feeding information Dp representing the power-feeding capability of the USB host 42 is supplied from the processor 78 of the USB host 42 to the processor 76 side. The power-feeding information Dp is triggered by switching the charging to activate the switching power source 66 if the power-feeding capability is high and to continue the preliminary charging PR with the linear voltage regulator 68 if the power-feeding capability is low.

If the power-feeding capability of the USB host 42 is high (steps S20, S21 of FIG. 12), as shown in FIG. 18, the constant-current charging CC2 is performed with the constant current Icc2 through the USB host 42—switch 50—switching power source 66—smoothing circuit 74—PMOSTr 56. The current detection of the sense resistor 58 and current detection unit 86 and the voltage detection of the voltage detection unit 84 are as described above.

In this case, the second constant-current charging CC2 can be performed with the power-feeding capability of the USB host 42 based on the detection of the USB host 42 connected to the USB detection terminal 62, and the power-feeding capability of the USB host 42 can be leveraged.

Also, if the constant-voltage charging CV is performed using the USB host 42 as the charging source (step S22 of FIG. 12), as is the case with the constant-current charging CC2 shown in FIG. 18, the charging is performed with the constant voltage Vc through the USB host 42—switching power source 66—smoothing circuit 74—PMOSTr 56. The constant-current charging CC2 or the constant-voltage charging CV is determined based on the control of the switching power source 66 by the control unit 64, as described above. In this case, the current detection of the sense resistor 58 and current detection unit 86 and the voltage detection of the voltage detection unit 84 are as described above.

Figure 19:
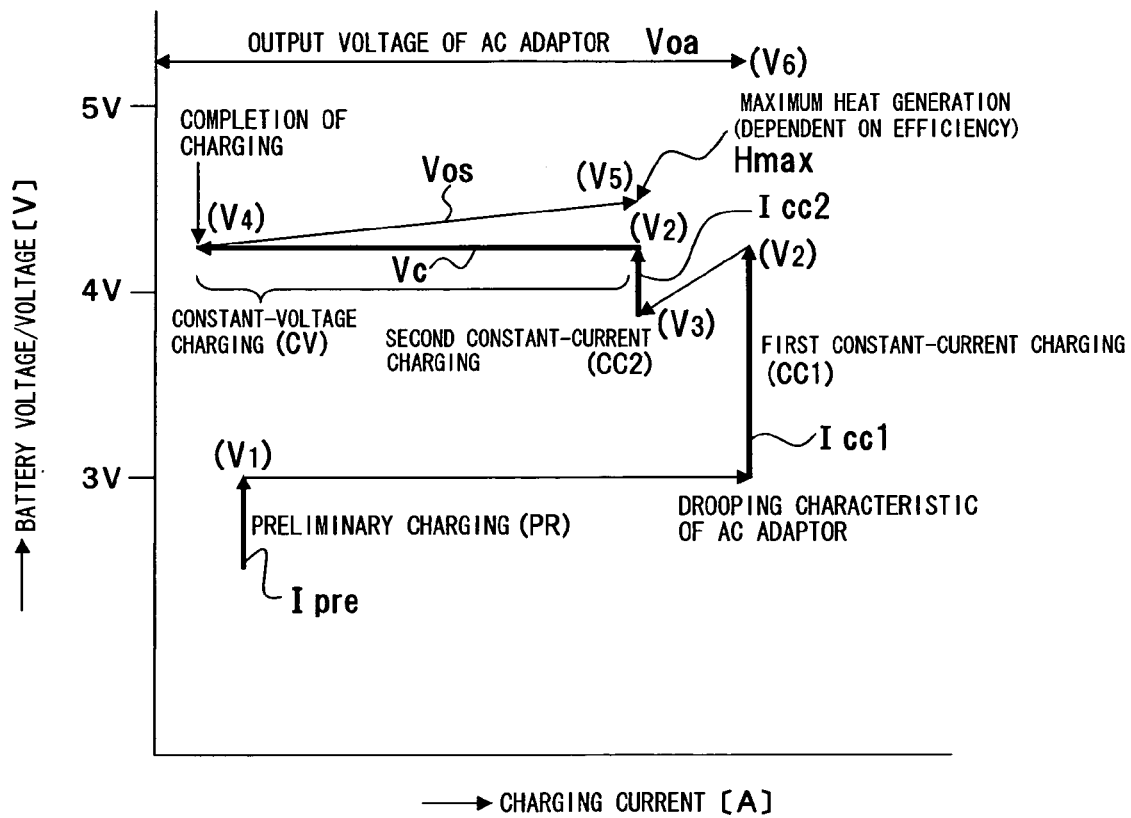
FIG. 19 is a diagram showing a charging operation in the case of using an AC adaptor.

Then, the charging operation using the AC adaptor 40 is described with reference to FIG. 19. FIG. 19 is a diagram showing the preliminary charging PR, the constant-current charging CC1, CC2 and the constant-voltage charging CV by defining the horizontal axis as the charging currents and the vertical axis as the battery voltages and the voltages on the charging source side.

This example is the case of using, for example, a lithium-ion battery with a rated voltage of 4.2 [V] as the rechargeable battery 34, and in this case, since the voltage of the rechargeable battery 34 is low, the preliminary charging PR is needed, and the AC adaptor 40 is used as the charging source. In other words, this operation corresponds to the operation states A and B of FIG. 12.

Since the rechargeable battery 34 has low output voltage and is in the over-discharge state, the preliminary charging PR is performed with the constant current Ipre to raise the voltage of the rechargeable battery 34 to a charging voltage V1 (e.g., 3 [V]), and when the charging voltage V1 is achieved, the preliminary charging PR is terminated. As described above, the constant current Ipre is obtained by the power feeding from the AC adaptor 40 with the control of the linear voltage regulator 68 (FIG. 13). The charging voltage V1 is detected by the voltage detection unit 84.

After the preliminary charging PR, the first constant-current charging CC1 is performed to charge the rechargeable battery 34 from the charging voltage V1 to a charging voltage V2 (e.g., 4.2 [V]) with the constant current Icc1. As described above, the constant current Icc1 is obtained by receiving the output of the AC adaptor 40 and by performing the constant-current control of the PMOSTr 54 with the control unit 64 (FIG. 14).

When the rechargeable battery 34 reaches to the charging voltage V2, the second constant-current charging CC2 is performed. In this case, the constant current Icc1 is switched to the constant current Icc2 (<Icc1). When the current is switched in this way, although the charging voltage V2 of the rechargeable battery 34 comes down to a voltage V3 (<V2), the charging voltage V3 of the rechargeable battery 34 is restored to the voltage V2 with the constant current Icc2. As described above, the constant current Icc2 is obtained by receiving the output of the AC adaptor 40 and by performing the constant-current control of the switching power source 66 with the control unit 64 (FIG. 15).

After the constant-current charging CC2, the charging is switched to the constant-voltage charging CV, and the constant voltage Vc is applied to the rechargeable battery 34 by the constant-voltage control of the switching power source 66 to perform the constant-voltage charging CV. As the constant-voltage charging CV is continued, the charging current is reduced, and when the charging current drops below a predetermined value or less, the charging is completed. In this case, a charging voltage V4 (e.g., 4.2 [V]) is achieved. The charging current is detected by the current detection unit 86, and when the charging current is shifted to, for example, a negligible small value, the charging is competed.

In this example, the output voltage Vos of the switching power source 66 undergoes a transition from the voltage V4 to a voltage V5 (e.g., 4.5 [V]), and the output voltage of the AC adaptor 40 is a voltage V6 (>V5) which is higher than the output voltage Vos of the switching power source 66.

When the charging with the constant current Icc1 is performed using the AC adaptor 40 as the charging source, maximum heat generation occurs in the PMOSTr 54, and Hmax indicates the maximum heat generation.

Figure 20:
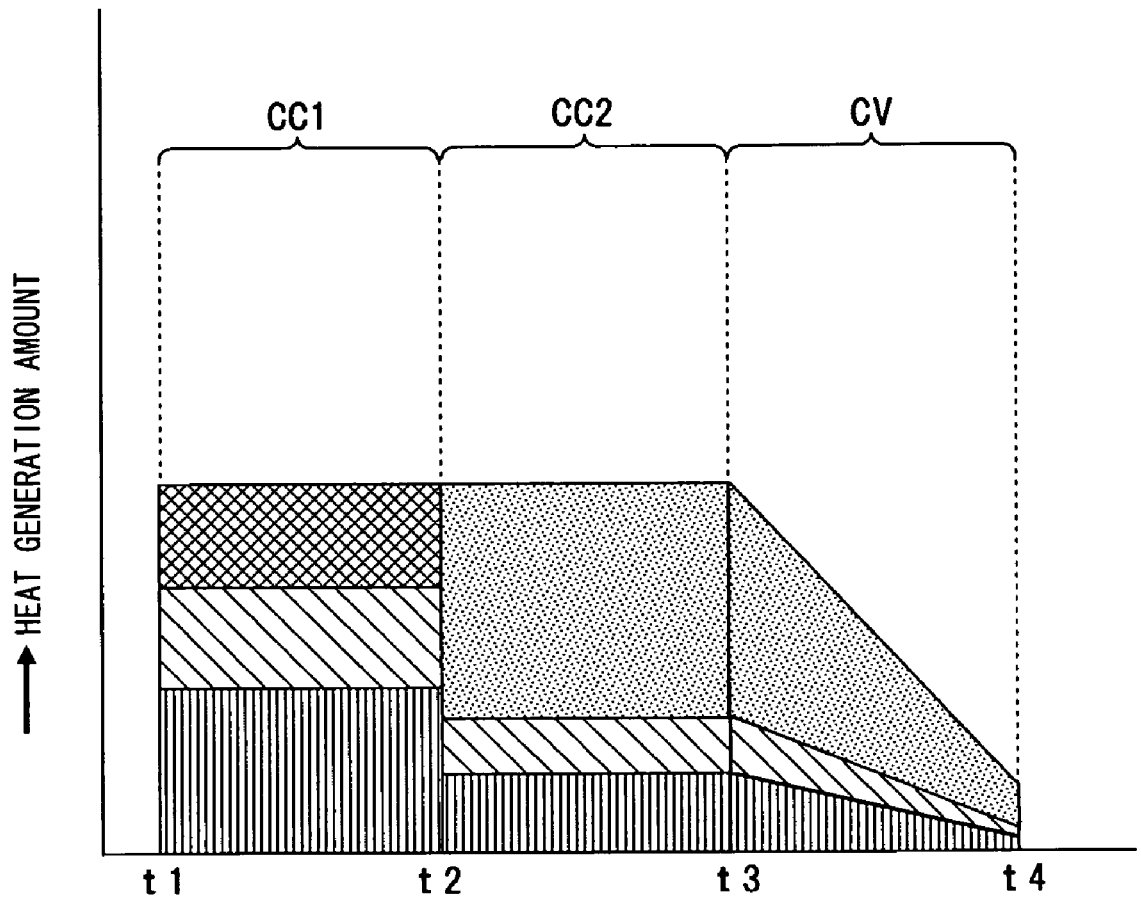
FIG. 20 is a diagram showing a heat generation amount in the case of using an AC adaptor.

Then, the heat generation amount is described for the charging operation using the AC adaptor 40 as the charging source with reference to FIG. 20. FIG. 20 is a diagram showing the heat generation amounts of the first constant-current charging CC1, the second constant-current charging CC2 and the constant-voltage charging CV by defining the horizontal axis as the operation regions and the vertical axis as the heat generation amounts.

In the first constant-current charging CC1 (t1 to t2), heat is generated in the PMOSTrs 54, 56 and the sense resistor 58; the heat generation amounts of the PMOSTrs 54, 56 are similar; and the heat generation amounts of the PMOSTrs 54, 56 is on the order of 50 [%] of the total heat generation amount of CC1 (the heat generation amount of the PMOSTrs 54, 56 and the sense resistor 58). In the second constant-current charging CC2 region (t2 to t3), since the PMOSTr 54 is separated from the charging path 52 and the charging is performed with the constant current Icc2 of the switching power source 66, heat is generated in the switching power source 66, the PMOSTr 56 and the sense resistor 58, and the heat generation amount of the PMOSTr 56 and the sense resistor 58 is reduced. In the constant-voltage charging CV region (t3 to t4), since the constant voltage Vc is obtained by the constant-voltage control of the switching power source 66, the heat generation amount is reduced as the charging current drops.

By the way, the PMOSTr 56 is disposed as a substitute for a conventional diode and the acceptable loss thereof is reduced. For example, as compared to about 200 [mW] in the diode, the acceptable loss can be reduced to about 60 [mW] in the PMOSTr.

Figure 1:
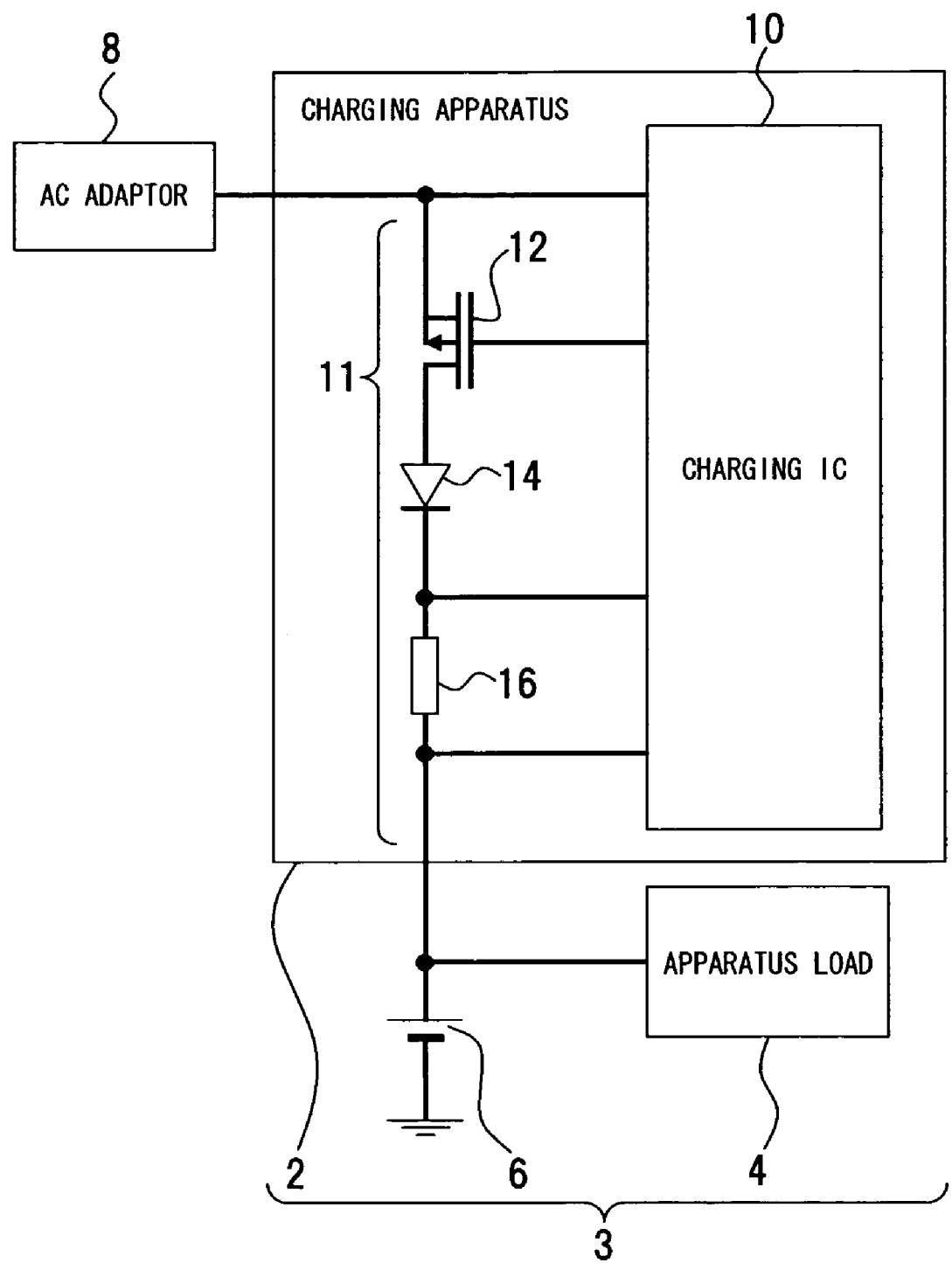
FIG. 1 is a diagram showing a charging apparatus of a rechargeable battery built into an electronic device.
Figure 2:
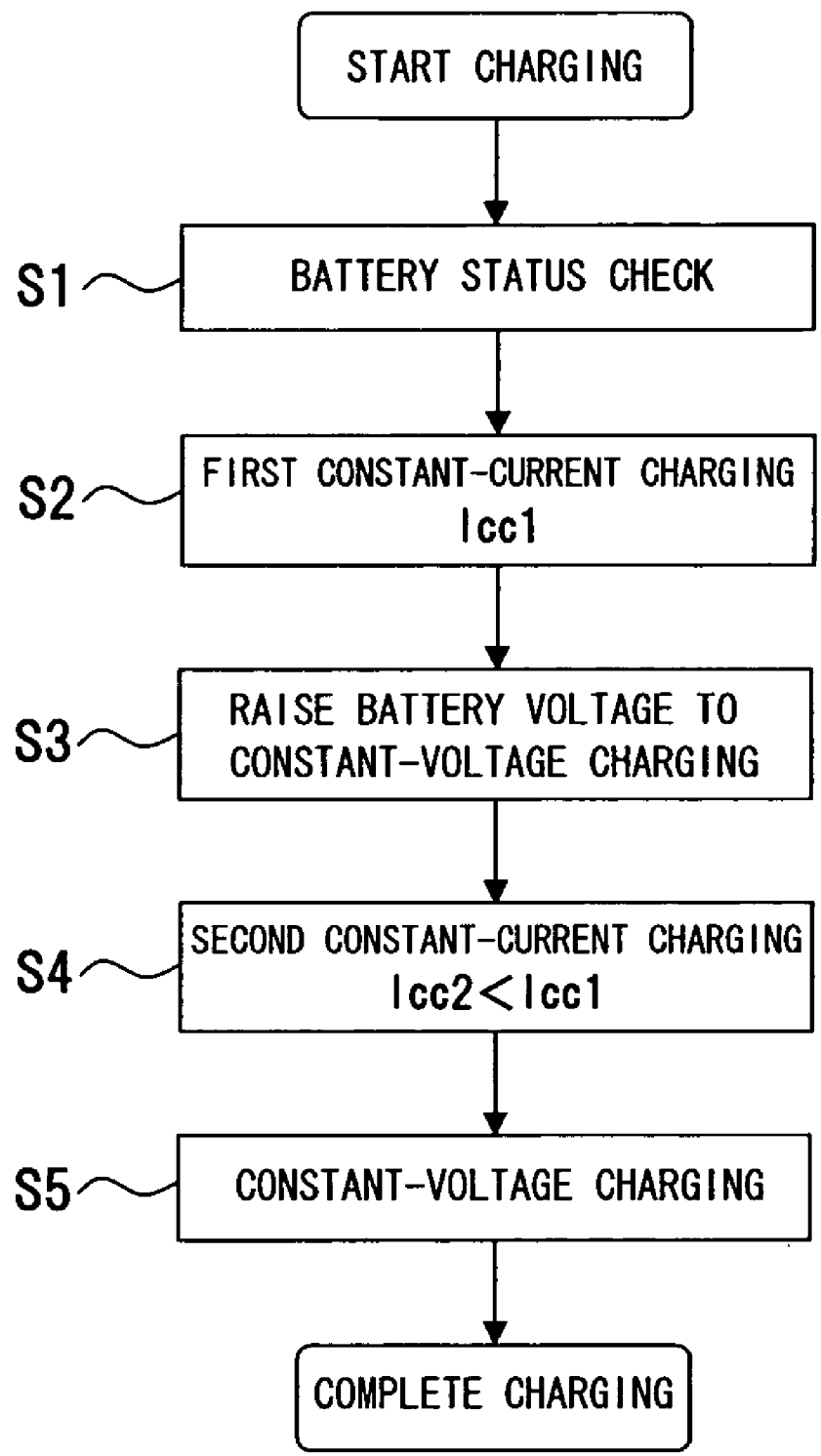
FIG. 2 is a flowchart showing a charging operation.
Figure 3:
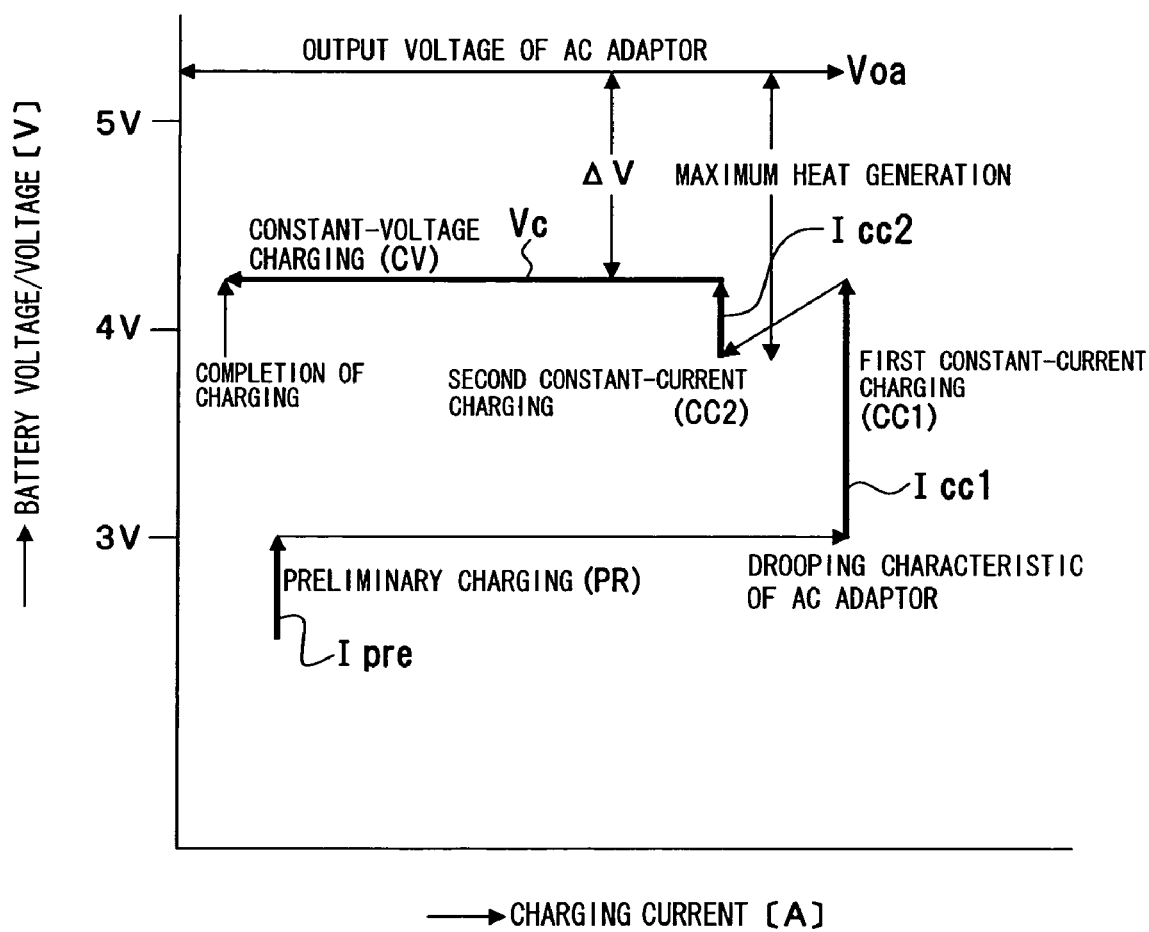
FIG. 3 is a diagram showing a relationship among a battery voltage, a voltage supplied to a battery and a charging current.
Figure 4:
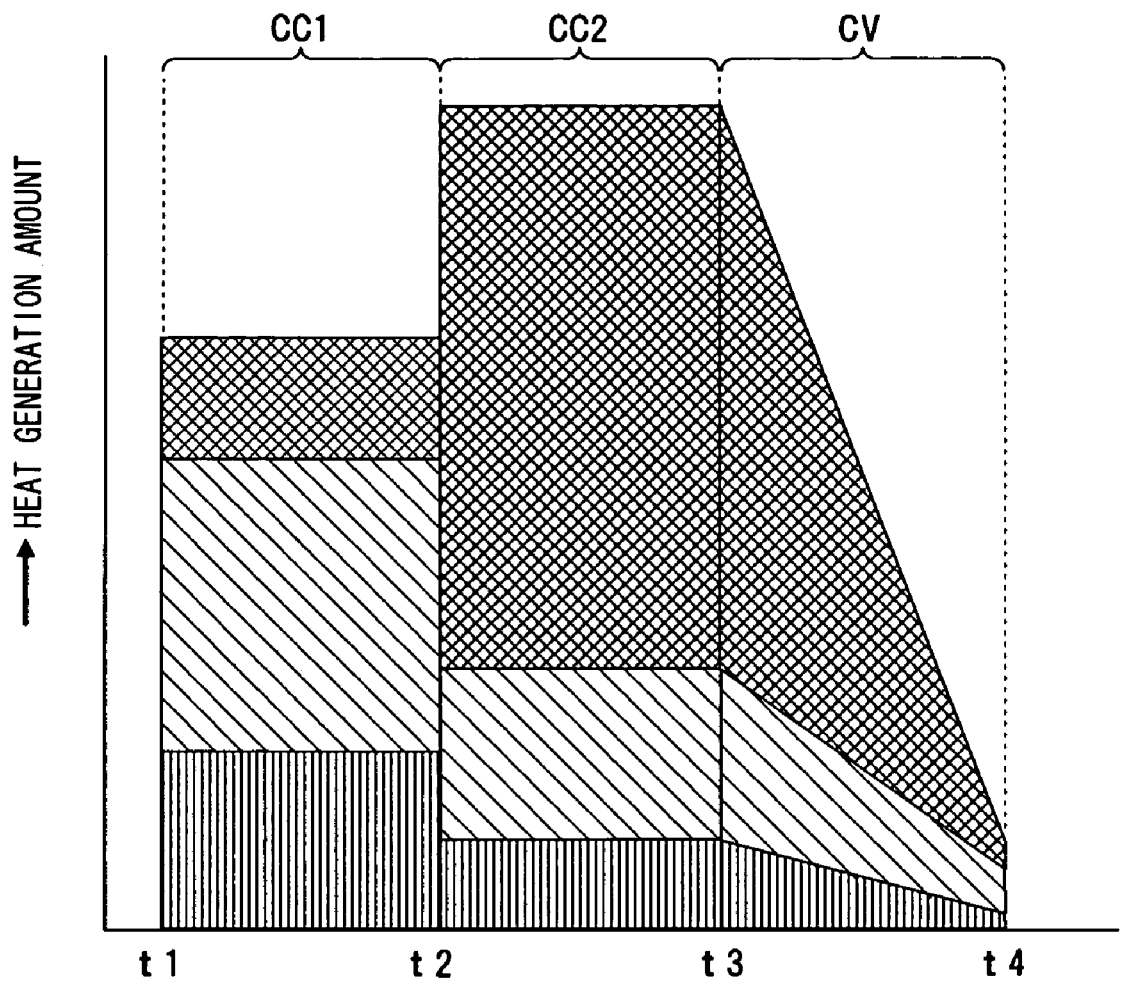
FIG. 4 is a diagram showing a relationship between charging and a heat generation amount.
Figure 5:
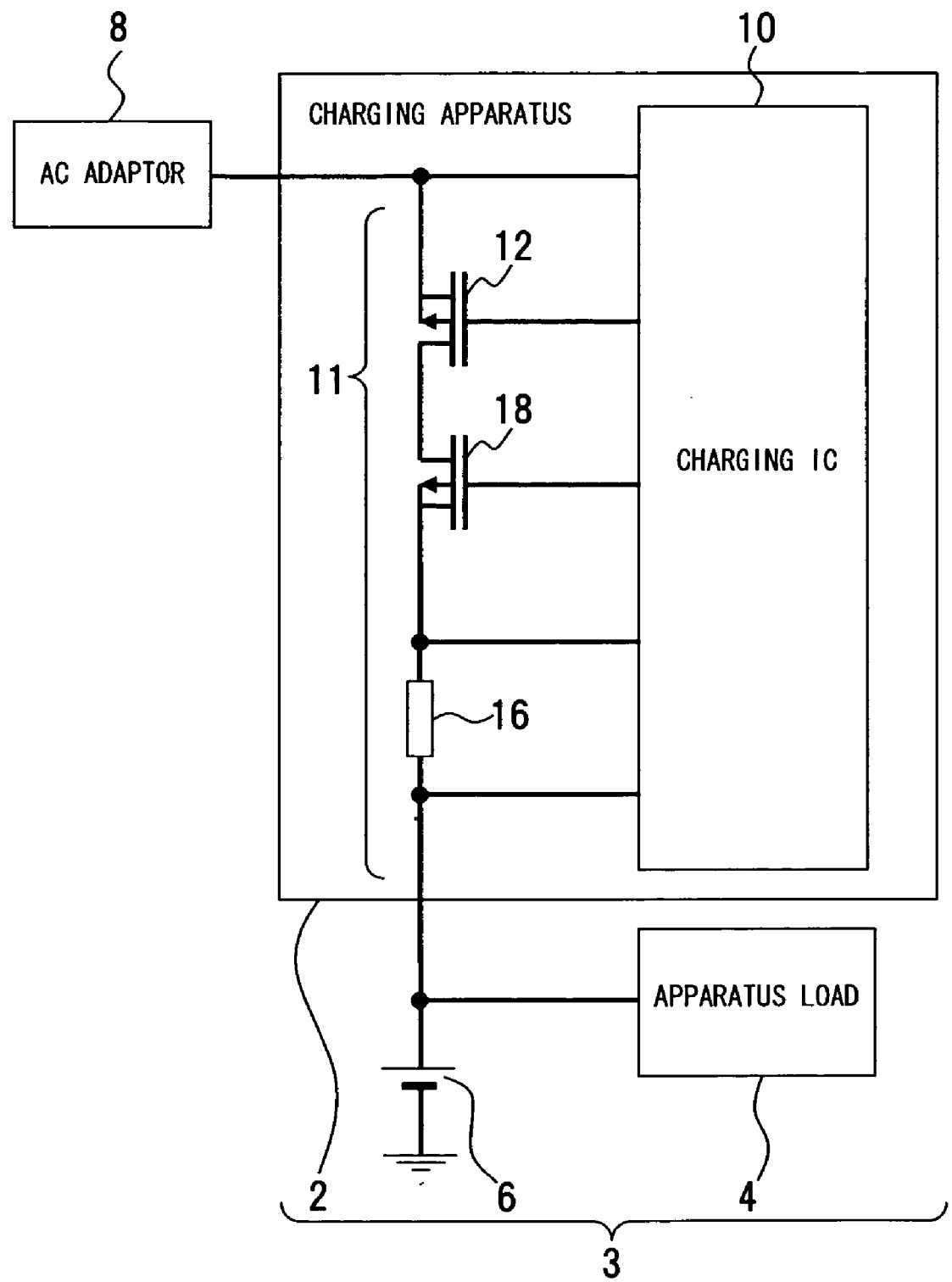
FIG. 5 is a diagram showing another charging apparatus.
Figure 6:
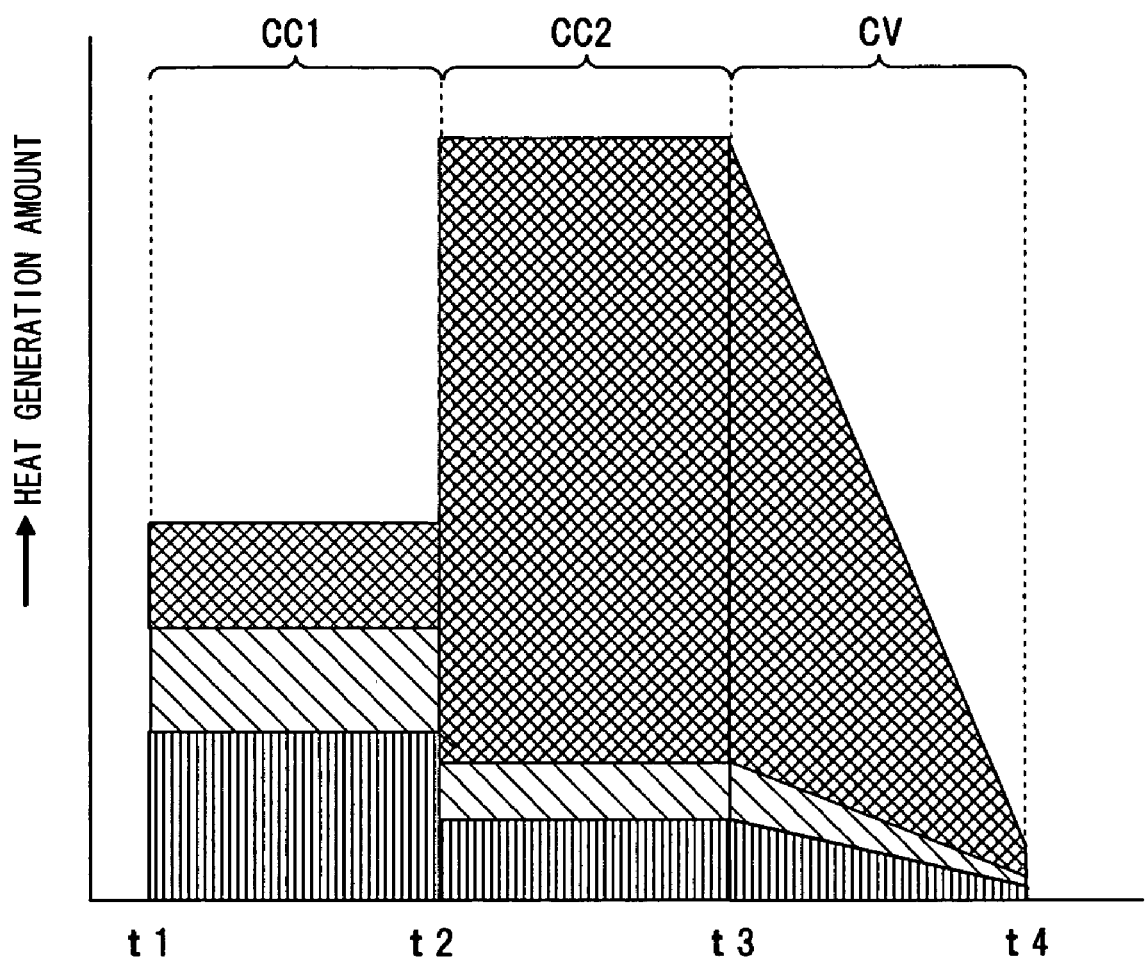
FIG. 6 is a diagram showing a relationship between charging and a heat generation amount.

Also, in CC2, since the switching power source 66 is used and the operation of the PMOSTr 54 is halted, the PMOSTr 54 does not generate heat. Although the heat generation of the switching power source 66 is dependent on the DC-DC conversion efficiency thereof, when the conversion efficiency η is assumed as, for example, η=92 [%], if the charging current Ic is increased to Ic=470 [mA], the heat generation amount Ph is Ph=177 [mw], and the heat generation can be reduced by half as compared to a conventional charging apparatus (FIG. 1).

For the constant-current charging CC1, CC2 and the constant-voltage charging CV, power loss of the sense resistor 58, PMOSTrs 54, 56 is calculated as follows.

(1) Power Loss Pr of the Sense Resistor 58

Pr is calculated from the value of resistance r=0.27 [Ω] of the sense resistor 58 and the charging current Ic flowing through the sense resistor 58 as follows.

$$Pr=0.27 \times Ic \times Ic \qquad (3)$$

(2) Power Loss Ptr56 of the PMOSTr 56

Assuming that the internal resistance of the PMOSTr 56 is 0.1 [Ω], Ptr56 is as follows.

$$Ptr56=0.1 \times Ic \times Ic \qquad (4)$$

(3) Power Loss Ptr54 of the PMOSTr 54

The power loss Ptr54 of the PMOSTr 54 is different between the CC1 and the CC2.

In the CC1 region, the power loss Ptr54 is as follows.

$$Ptr54=0.1 \times Ic \times Ic \qquad (5)$$

In the CC2 region, assuming that the output voltage of the AC adaptor 40 is Voa and the battery voltage is Vb, the power loss Ptr54 is as follows.

$$Ptr54=(Voa-\text{voltage drop in PMOSTr 56}-\text{voltage drop in sense resistor 58}-Vb) \times Ic \qquad (6)$$

(4) Power Loss Ps of the Switching Power Source 66

From the DC-DC conversion efficiency q and the output voltage Vos, the power loss Ps of the switching power source 66 is as follows.

$$Ps=Vos \times Ic(1-\eta)/\eta \qquad (7)$$

However, the output voltage Vos is obtained from the output voltage Vos=Vb+(sense resistance+resistance of PMOSTr 56)×Ic.

Figure 21:
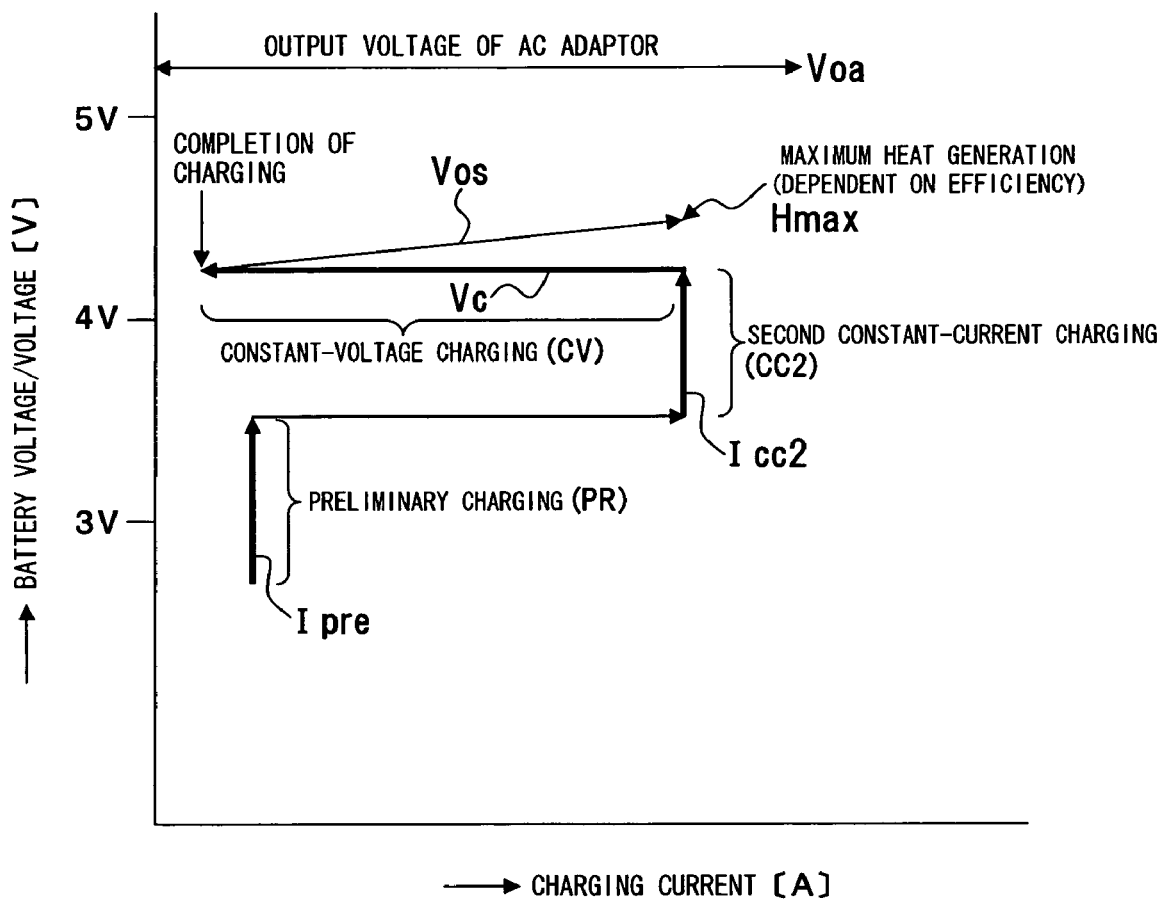
FIG. 21 is a diagram showing a charging operation in the case of using a USB host.

Then, the charging operation using the USB host 42 is described with reference to FIG. 21. FIG. 21 is a diagram showing the preliminary charging PR, the constant-current charging CC2 and the constant-voltage charging CV and the output voltage of the charging source by defining the horizontal axis as the charging currents and the vertical axis as the battery voltages and the voltages on the charging source side.

As described above, this example is the case of using a lithium-ion battery with a rated voltage of 4.2 [V] as the rechargeable battery 34. This charging operation corresponds to the operation state C of FIG. 12 (steps S19 to S22).

This is the case that the USB host 42 is used as the charging source, and in this case, if the charging voltage of the rechargeable battery 34 is less than a predetermined voltage, for example, 3.5 [V], after the preliminary charging PR with the constant current Ipre, the power-feeding information from the USB host 42 indicates that the USB host 42 has the power-feeding capability. In this case, when the charging voltage of the rechargeable battery 34 is raised to the predetermined voltage, the preliminary charging PR is terminated and the constant-current charging CC2 is performed with the second constant current Icc2. As described above, the constant current Icc2 is obtained by the constant-current control of the switching power source 66 with the control unit 64, based on the output of the USB host 42 (FIG. 18).

When the rechargeable battery 34 reaches to the charging voltage V2, the charging is switched to the constant-voltage charging CV, and the constant voltage Vc is obtained by the constant-voltage control of the switching power source 66 and is applied to the rechargeable battery 34 to perform the constant-voltage charging CV. As the constant-voltage charging CV is continued, the charging current is reduced, and when the charging current drops below a predetermined value or less, the charging is completed. In this case, the charging completion voltage is 4.2 [V] of the rated voltage described above.

Also in the constant-current charging CC2 and the constant-voltage charging CV using the USB host 42 as the charging source, the maximum heat generation Hmax is dependent on the DC-DC conversion efficiency, as described above.

Figure 22:
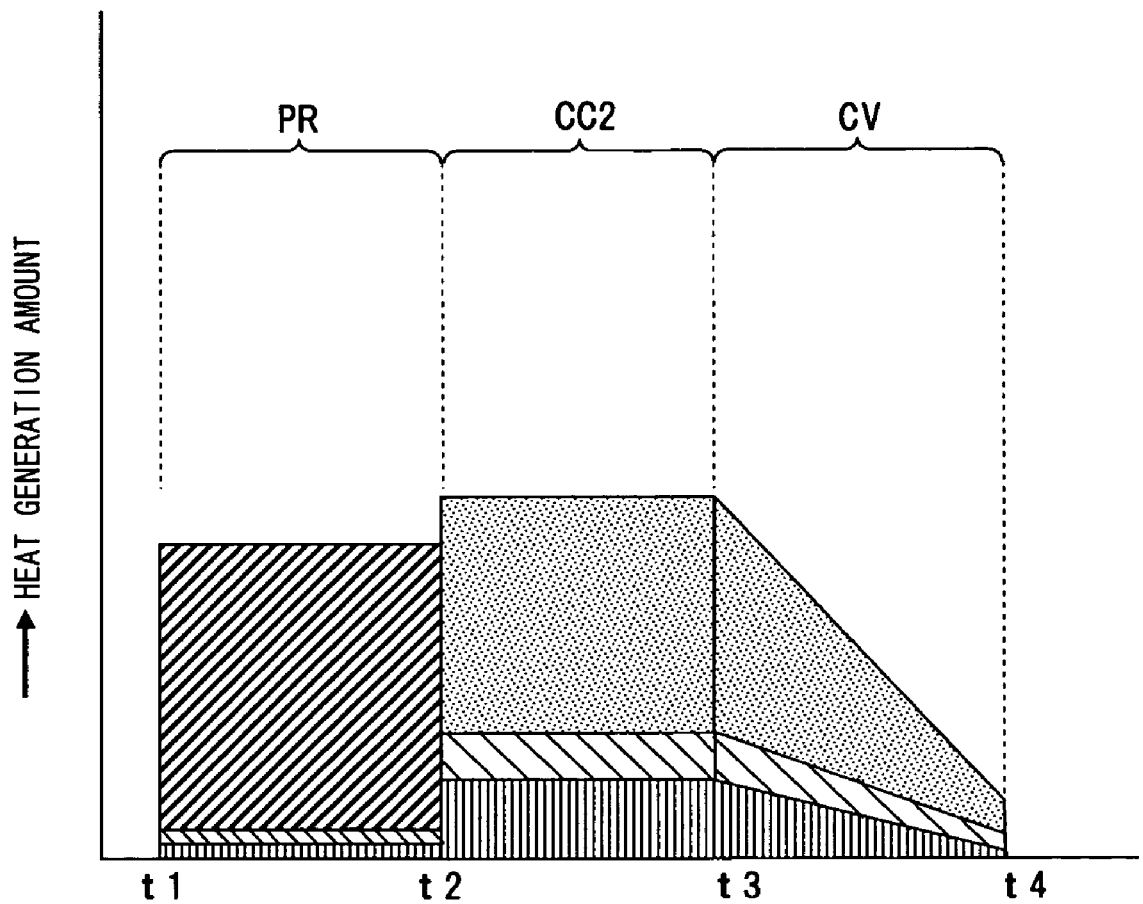
FIG. 22 is a diagram showing a heat generation amount in the case of using a USB host.

Then, the heat generation amount is described for the charging operation using the USB host 42 as the charging source with reference to FIG. 22. FIG. 22 is a diagram showing the heat generation amounts of the preliminary charging PR, the second constant-current charging CC2 and the constant-voltage charging CV by defining the horizontal axis as the operation regions and the vertical axis as the heat generation amounts.

In the charging operation using the USB host 42 as the charging source (FIG. 21), the heat generation amount of the linear voltage regulator 68 is predominant in the preliminary charging PR (region t1 to t2), and in the constant-current charging CC2 (region t2 to t3), heat is generated by the switching power source 66, the PMOSTr 56 and the sense resistor 58 and the heat generation amount of the switching power source 66 is predominant. Also in the constant-voltage charging CV (region t3 to t4), heat is generated by the switching power source 66, the PMOSTr 56 and the sense resistor 58 and the heat generation amount of the switching power source 66 is predominant. In the constant-voltage charging CV region, the heat generation amount is reduced due to the reduction of the charging current associated with the progress of the charging of the rechargeable battery 34. Each heat generation amount is calculated by the equations (3) to (7) described above.

Figure 23:
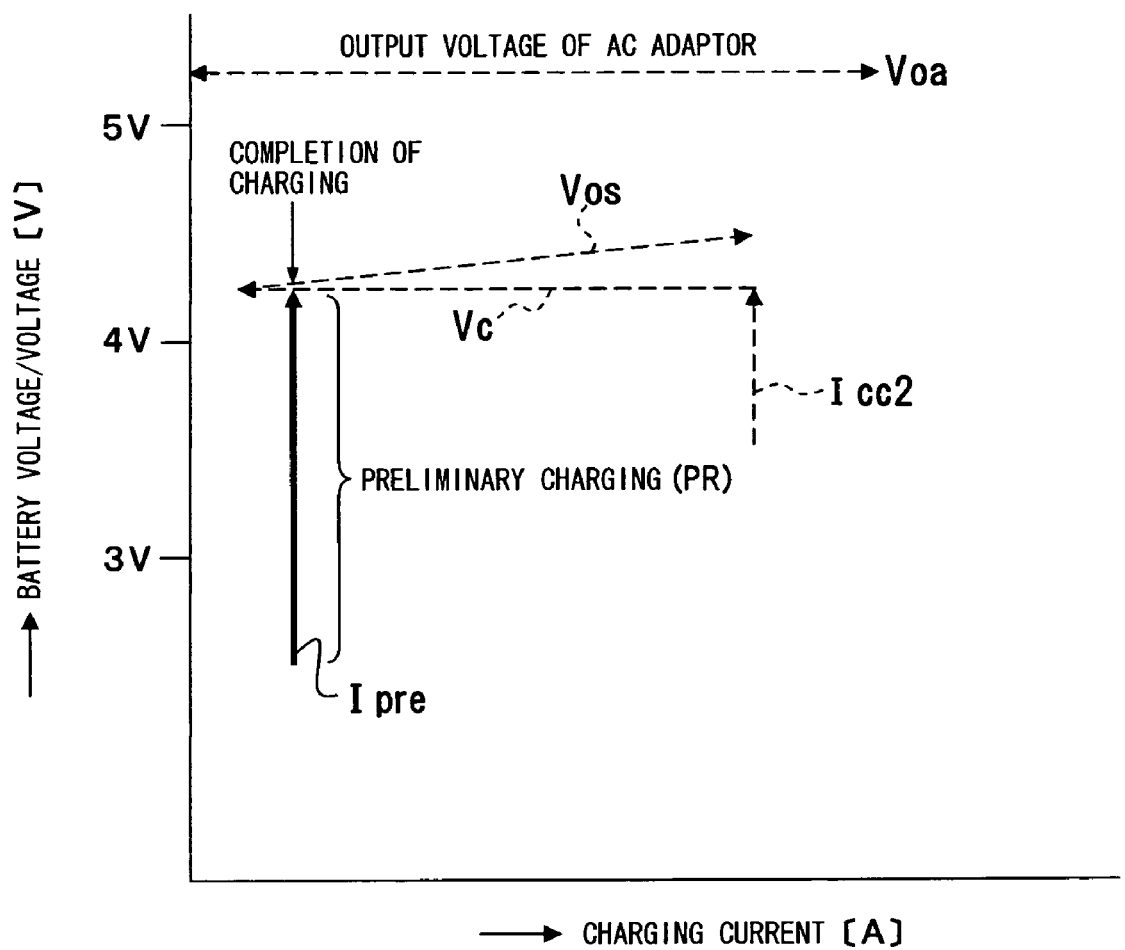
FIG. 23 is a diagram showing a charging operation in the case of using a USB host.

Then, a description is made for the charging operation using the USB host 42 as the charging source in the case that the charging is completed only with the preliminary current, with reference to FIG. 23. FIG. 23 is a diagram showing the preliminary charging PR, the constant-current charging CC2 and the constant-voltage charging CV and the output voltage of the charging source by defining the horizontal axis as the charging currents and the vertical axis as the battery voltages and the voltages on the charging source side. By way of comparison, dotted lines are used for showing the output voltage Voa of the AC adaptor 40, the constant-voltage charging CV, the constant-current charging CC2 and the output voltage Vos of the switching power source 66.

As described above, this example is the case of using a lithium-ion battery with a rated voltage of 4.2 [V] as the rechargeable battery 34. This charging operation corresponds to the operation state D of FIG. 12 (step S23)

As described above, in the case of using the USB host 42 as the charging source, the preliminary charging PR is started with the constant current Ipre, and if the power-feeding information received from the USB host 42 indicates that the power-feeding capability of the USB host 42 is not sufficient, the preliminary charging PR is continued until the charging completion voltage is achieved.

Figure 24:
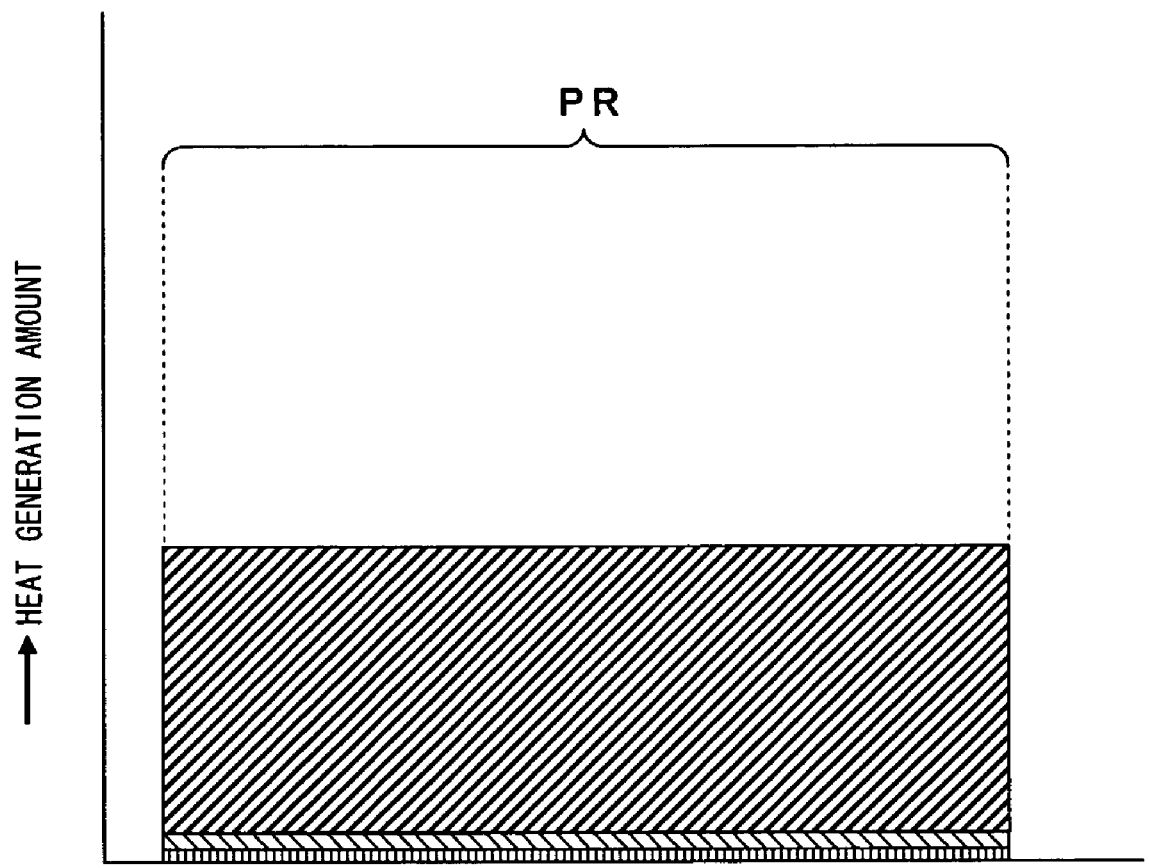
FIG. 24 is a diagram showing a heat generation amount in the case of using a USB host.

The heat generation amount of the charging operation in this case is described with reference to FIG. 24. FIG. 24 is a diagram showing the heat generation amount of the preliminary charging PR by defining the horizontal axis as the operation regions and the vertical axis as the heat generation amounts. In FIG. 24, the same symbols are added to the same portions as FIG. 22.

If the charging is performed only with the preliminary charging PR, heat is generated by the linear voltage regulator 68, the PMOSTr 56 and the sense resistor 58, however, since a small current flows from the linear voltage regulator 68 to the PMOSTr 56 and the sense resistor 58, the heat generation amount of the linear voltage regulator 68 is predominant and accounts for a large portion of the total heat generation amount.

Second Embodiment

Figure 25:
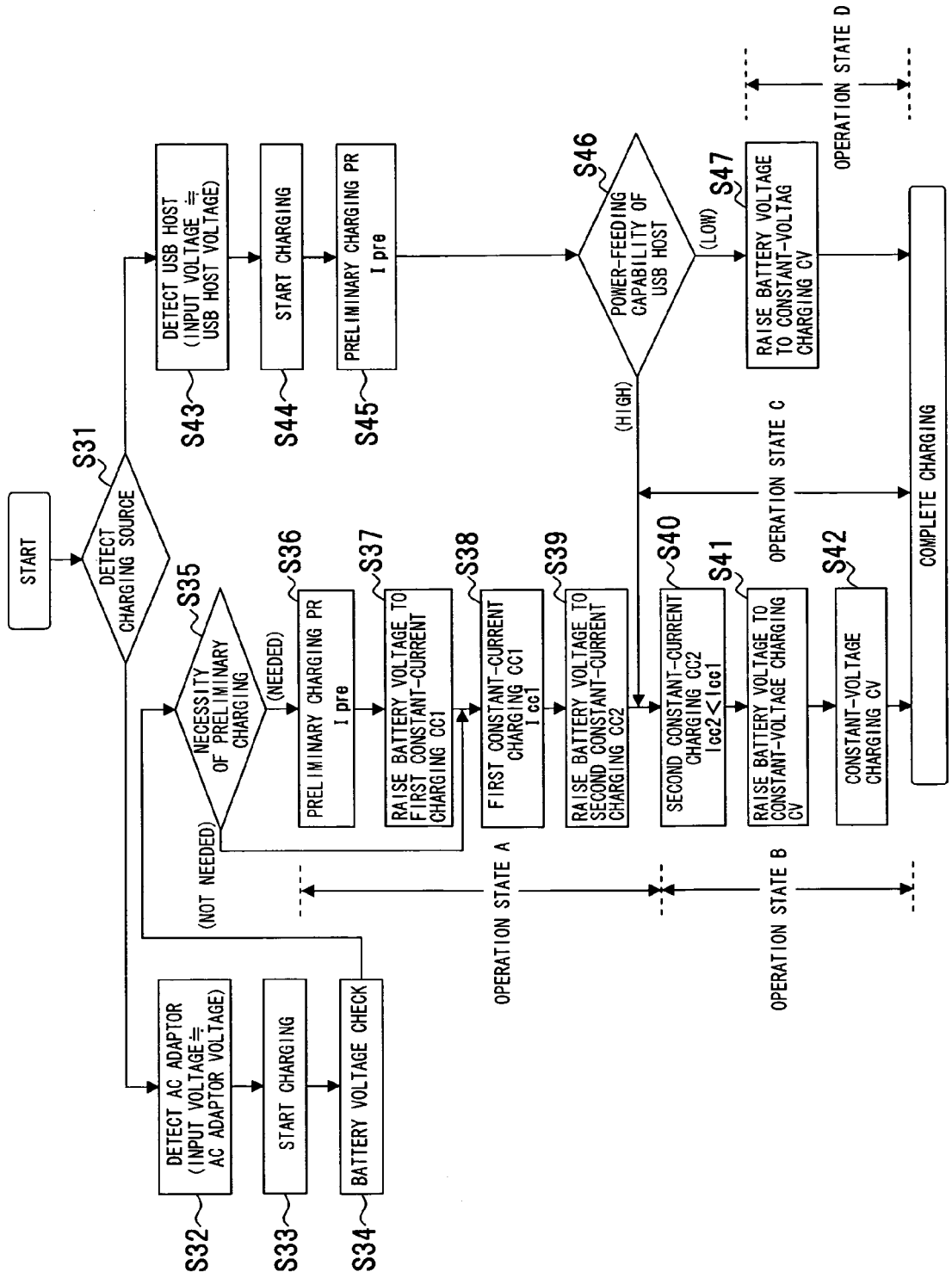
FIG. 25 is a flowchart showing a charging control method according to a second embodiment.

A second embodiment of the present invention will be described with reference to FIG. 25. FIG. 25 is a flowchart showing an outline of the charging operation according to the second embodiment.

The charging operation according to this embodiment (FIG. 25) may be executed instead of the charging operation of the charging apparatus 36 shown in FIG. 10 (FIG. 12).

In this embodiment, the control unit 64 of the charging apparatus 36 (FIG. 10) detects a charging source connected to the charging apparatus 36 (step S31). In this case, although the output voltage of the AC adaptor 40 is detected by the voltage detection unit 80 and the output voltage of the USB host 42 is detected by the voltage detection unit 82, an input voltage passing through the switch 50 is detected by the voltage detection unit 83. The voltage information is applied to the control unit 64 to determine the charging source. In other words, in the case of the input voltage ≈(=) an output voltage Voa of the AC adaptor 40, the AC adaptor 40 is detected (step S32), and in the case of the input voltage ≈(=) an output voltage Vou of the USB host 42, the USB host 42 is detected (step S43). The relationship between the connected charging source and the input voltage is identified by such voltage detection and determination of the charging source.

If the AC adaptor 40 is detected as the charging source, the charging of the rechargeable battery 34 is started (step S33), and a voltage check is performed for the rechargeable battery 34 (step S34). As a result of the voltage check, the necessity of the preliminary charging is determined (step S35), and as the necessity of the preliminary charging, it is determined whether or not the rechargeable battery 34 is in the over discharge state and has a voltage at which high-speed charging, i.e., the constant-current charging CC1 with the constant current Icc1 should not be initiated. For example, if a rated voltage is 4.2 [V] and if the battery voltage is less than 3 [V], the preliminary charging is needed.

In the preliminary charging, the output of the AC adaptor 40 is supplied to the linear voltage regulator 68 to perform the charging with the constant current Ipre (step S36), and the preliminary charging raises the battery voltage to a voltage enabling the first constant-current charging CC1 (step S37). After this preliminary charging, the first constant-current charging CC1 is performed with the constant current Icc1 (step S38). In this constant-current charging CC1, the operation of the linear voltage regulator 68 is halted, and the charging current is conducted through the PMOSTrs 54, 56 to be set to a certain constant current Icc1 by performing the constant-current control of the PMOSTr 54. The constant-current charging CC1 raises the battery voltage to a voltage allowing the second constant-current charging CC2 to be initiated (step S39). Steps S36 to S39 are the operation state A.

When the battery voltage is raised by the constant-current charging CC1 with the constant current Icc1 to a voltage allowing the second constant-current charging CC2 to be initiated, the second constant-current charging CC2 is performed with the constant current Icc2 (step S40). In this constant-current charging CC2, the operation of the PMOSTr 54 is halted, and the switching power source 66 is operated to perform the constant-current control for setting the charging current to a certain constant current Icc2. As described above, the current values of the constant current Icc1 and Icc2 are in the relationship of Icc2<Icc1. The constant-current charging CC2 is performed until the battery voltage reaches to a start voltage of the constant-voltage charging CV (step S41). After the constant-current charging CC2, the constant-voltage charging CV is performed (step S42). In this constant-voltage charging CV, as described above, the constant-voltage control of the switching power source 66 is performed to maintain the constant battery voltage. When the rechargeable battery is fully charged, the charging is completed. Steps S40 to S42 are the operation state B. With the completion of the charging, the operation of the PMOSTr 56 is halted and the operation of the switching power source 66 is halted.

If the AC adaptor 40 is not connected and the USB host 42 is detected (Step S43), the charging of the rechargeable battery 34 is initiated with the USB host 42 (step S44). In the preliminary charging, the linear voltage regulator 68 is operated by the output voltage of the USB host 42, and the rechargeable battery 34 is charged with the constant current Ipre (step S45).

In this preliminary charging, if it is determined from the power-feeding information of the processor 78 that the power-feeding capacity of the USB host 42 is high (step S46), the preliminary charging PR is shifted to steps S40 to S42 to perform the constant-current charging CC2 and the constant-voltage charging CV which are the operation state C. In this case, the operation of the linear voltage regulator 68 is halted to activate the switching power source 66 with the output of the USB host 42, and after the second constant-current charging CC2 with the constant current Icc2, the constant-voltage charging CV is performed with the constant voltage Vc to complete the charging when the rechargeable battery 34 is fully charged. In a similar way, the operations of the PMOSTr 56 and the switching power source 66 are halted.

If it is determined from the power-feeding information of the processor 78 that the power-feeding capacity of the USB host 42 is low, the preliminary charging is shifted to step S47 to perform the operation state D. In this case, the operation of the linear voltage regulator 68 is continued with the output of the USB host 42, and the operation of the linear voltage regulator 68 is halted when the rechargeable battery 34 is fully charged.

With such processing, the rechargeable battery 34 can be charged by using the AC adaptor 40 or the USB host 42 as the charging source, and the low heat generation is planned for the charging IC 38, the charging apparatus 36 and the electronic device 30.

Third Embodiment

Figure 26:
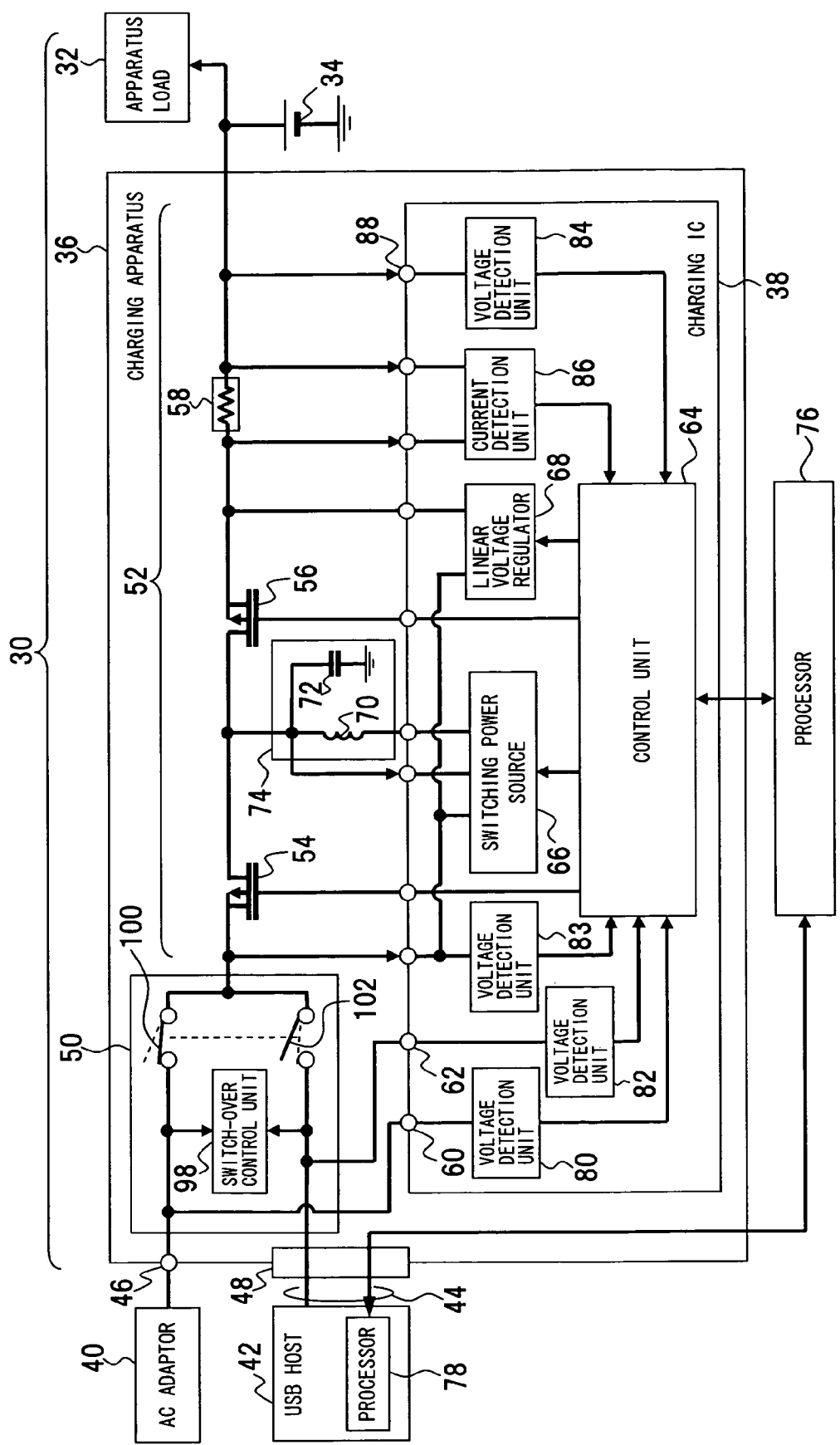
FIG. 26 is a diagram showing a charging apparatus according to a third embodiment.

A third embodiment of the present invention will be described with reference to FIG. 26. FIG. 26 is a diagram showing an outline of a charging apparatus according to the third embodiment. In FIG. 26, the same symbols are added to the same portions as FIG. 10.

In this embodiment, the switch 50 is constituted by a switch-over control unit 98 as well as switching elements 100, 102. The switch-over control unit 98 is connected to the adaptor connector 46 and the USB connector 48 to receive each output voltage of the AC adaptor 40 and the USB host 42, determines from the voltage value whether either or both of the AC adaptor 40 and the USB host 42 is connected and outputs a switch-over control output based on the determination. The switching elements 100 and 102 are constituted by circuit elements such as the PMOSTr and are made conductive selectively depending on the switch-over control output of the switch-over control unit 98.

In such a configuration, if the AC adaptor 40 is connected, the output of the AC adaptor 40 is conducted through the switching element 100 to be applied to the switching power source 66 and the linear voltage regulator 68, and the switching power source 66 or the linear voltage regulator 68 is selected under the control of the control unit 64 to apply the constant current or the constant voltage described above to the rechargeable battery 34 through the charging path 52.

If the USB host 42 is connected, the output of the USB host 42 is conducted through the switching element 102 to be applied to the switching power source 66 and the linear voltage regulator 68. Because of the circuit configuration, the output of the USB host 42 is applied through the charging path 52 to the rechargeable battery 34, and in this case, a conduction condition of the PMOSTr 54 must be satisfied. In the case of selecting the USB host 42 as the charging source, the output of the USB host 42 can be supplied to the rechargeable battery 34 by allowing the output to be conducted through the PMOSTr 54.

Although the AC adaptor 40 is preferentially selected in the case that both the AC adaptor 40 and the USB host 42 are connected, if the power-feeding capability is high on the side of the external device such as the USB host 42, the power-feeding input on the USB connector 48 side may be configured to be prioritized over the AC adaptor 40.

If the switch-over control unit 98 is configured to have the input determination and input switch-over functions of the switch 50, the switching elements 100 and 102 can be switched by the switch-over control unit 98 on the switch 50 side independently and thus the burden of the switch-over control of the switch 50 can be reduced for the control unit 64.

Fourth Embodiment

Figure 27:
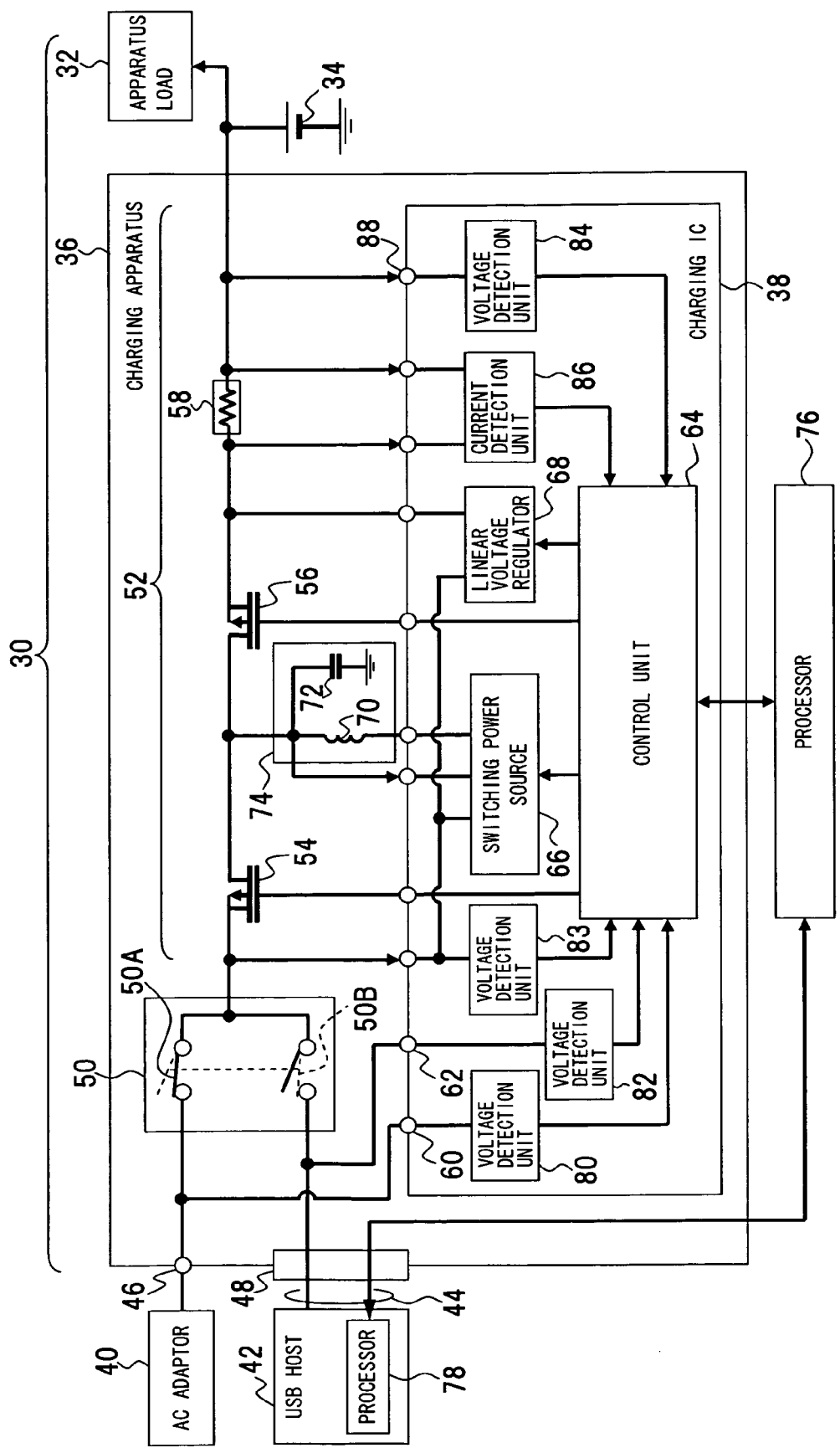
FIG. 27 is a diagram showing a charging apparatus according to a fourth embodiment.

A fourth embodiment of the present invention will be described with reference to FIG. 27. FIG. 27 is a diagram showing an outline of a charging apparatus according to the fourth embodiment. In FIG. 27, the same symbols are added to the same portions as FIG. 10.

In this embodiment, the switch 50 is constituted by a first switch unit 50A and second switch unit 50B which can be switched by manual operation in an interlocked manner. In other words, the switch 50 is configured such that conduction through the switch unit 50B is lost when the switch unit 50A is made conductive and that conduction through the switch unit 50A is lost when the switch unit 50B is made conductive.

In such a configuration, if the switch unit 50A is made conductive when the AC adaptor 40 is connected or when the AC adaptor 40 and the USB host 42 are connected, the output of the AC adaptor 40 is applied to the rechargeable battery 34 through the switching power source 66, the linear voltage regulator 68 and the charging path 52, and if the switch unit 50B is made conductive, the output of the USB host 42 is applied to the switching power source 66, the linear voltage regulator 68 and the like.

In such a configuration that the switch 50 is switched by the manual operation of the user, a desired charging source can be selected by the manual operation in accordance with the user's intention or after the user refers to the power-feeding information, and the burden of the switch-over control of the switch 50 can be reduced for the configuration of the switch 50 and the control unit 64.

Fifth Embodiment

Figure 28:
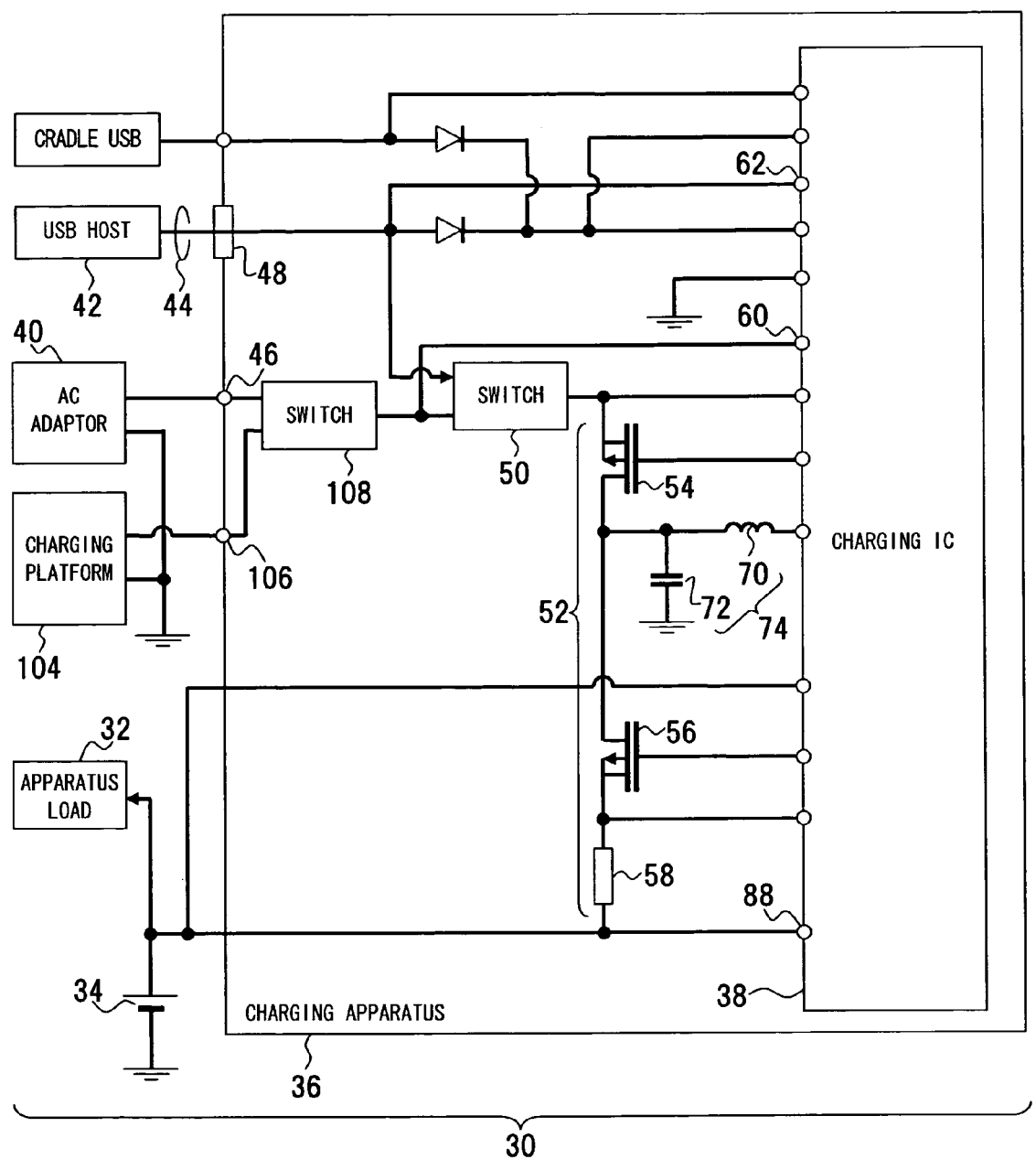
FIG. 28 is a diagram showing a charging apparatus and an electronic device according to a fifth embodiment.

A fifth embodiment of the present invention will be described with reference to FIG. 28. FIG. 28 is a diagram showing an outline of a charging apparatus and an electronic device according to the fifth embodiment. In FIG. 28, the same symbols are added to the same portions as FIG. 10.

Contrary to the first to fourth embodiments which are configured to connect the charging apparatus 36 directly to the AC adaptor 40 and the USB host 42 as the charging source, in this embodiment, a charging platform 104 is disposed. The charging platform 104 is a device on which the electronic device 30 described above is placed for charging rechargeable battery 34 using the charging apparatus 36 built into the electronic device 30. In this case, the charging platform 104 is typically connected to the AC adaptor 40.

The charging apparatus 36 is provided with a power-feeding terminal 106 for connecting the charging platform 104, and a switch 108 for selecting the charging source is disposed between the power-feeding terminal 106 as well as the adaptor connector 46 and the switch 50. Assuming that the switch 50 is a first switch and that the switch 108 is a second switch, the switch 108 is built into the charging apparatus 36 and is used for selecting the AC adaptor 40 or the charging platform 104. The switch 50 is used for selecting the device selected by the switch 108 or the USB host 42.

As is the case with the switch 50, the switch 108 may be constituted by either a circuit element switched by the control output of the control unit 64 built into the charging IC 38 or a mechanical switch manually operated by a user.

Such a configuration accommodates diversification of the charging sources, and the rechargeable battery 34 can be charged by manually or automatically performing arbitrary selection of the charging source connected arbitrarily.

Sixth Embodiment

Figure 29:
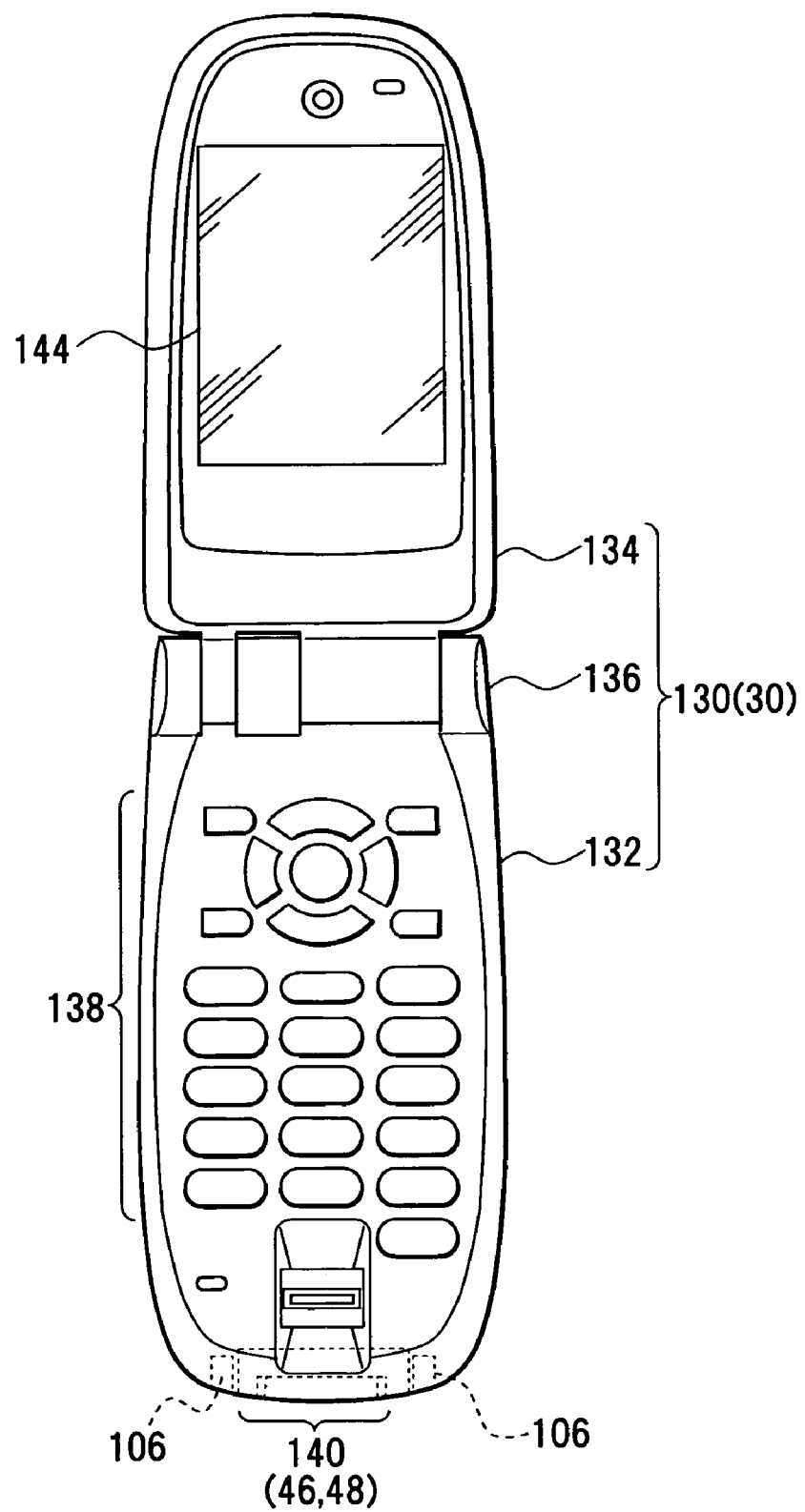
FIG. 29 is a diagram showing a cellular phone according to a sixth embodiment.
Figure 30:
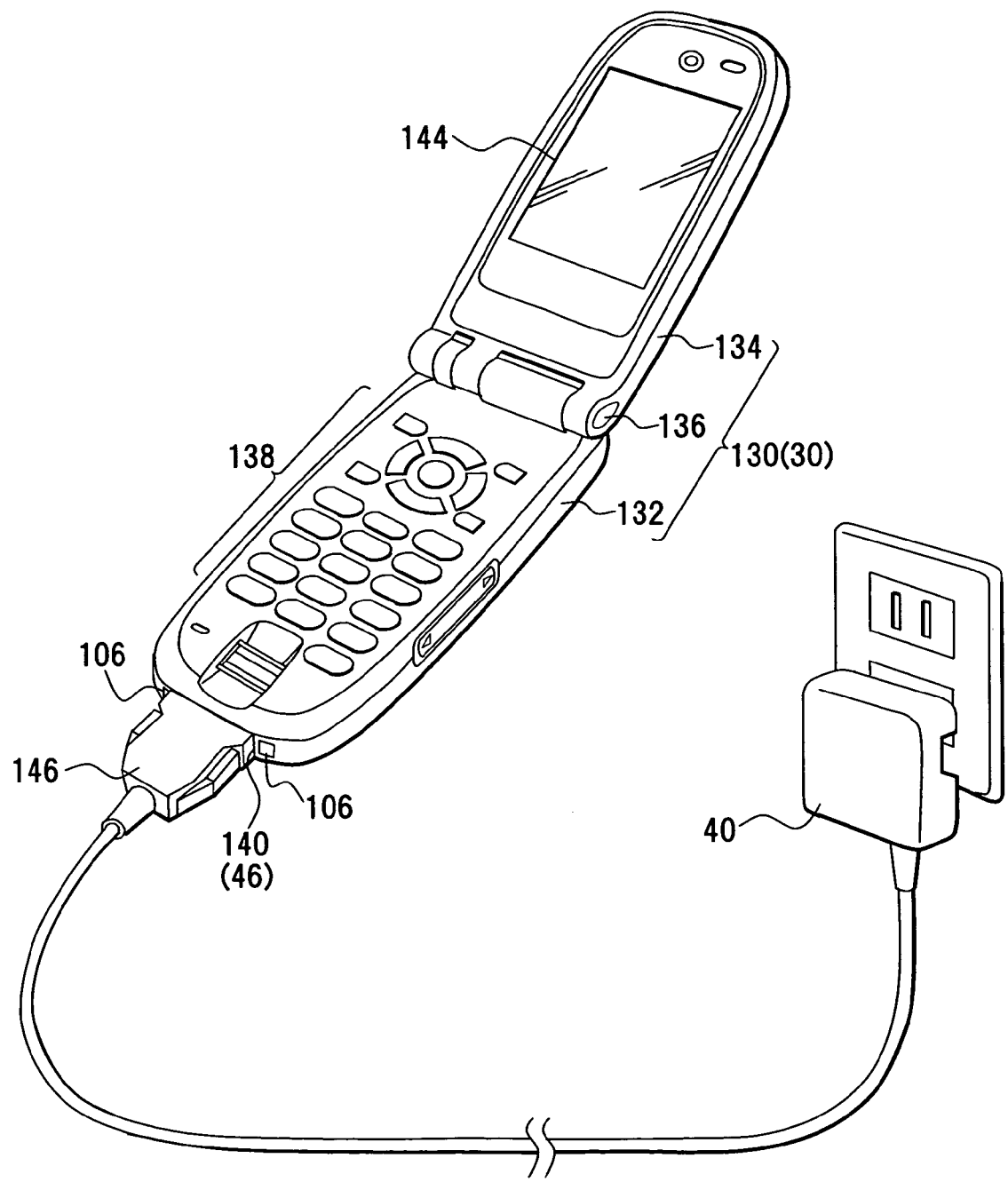
FIG. 30 is a diagram showing a cellular phone connected to an AC adaptor.
Figure 31:
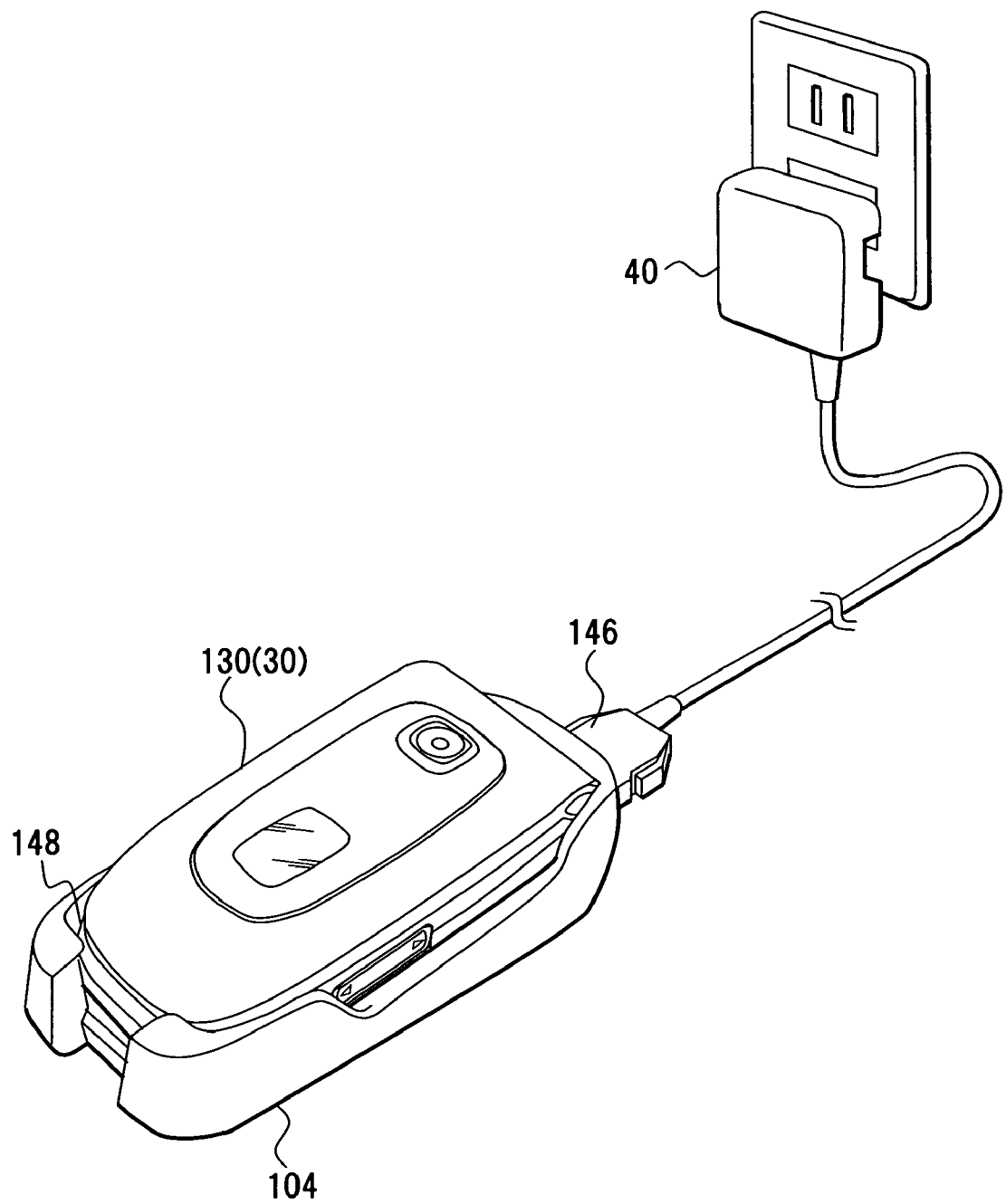
FIG. 31 is a diagram showing a cellular phone placed on a charging platform.
Figure 32:
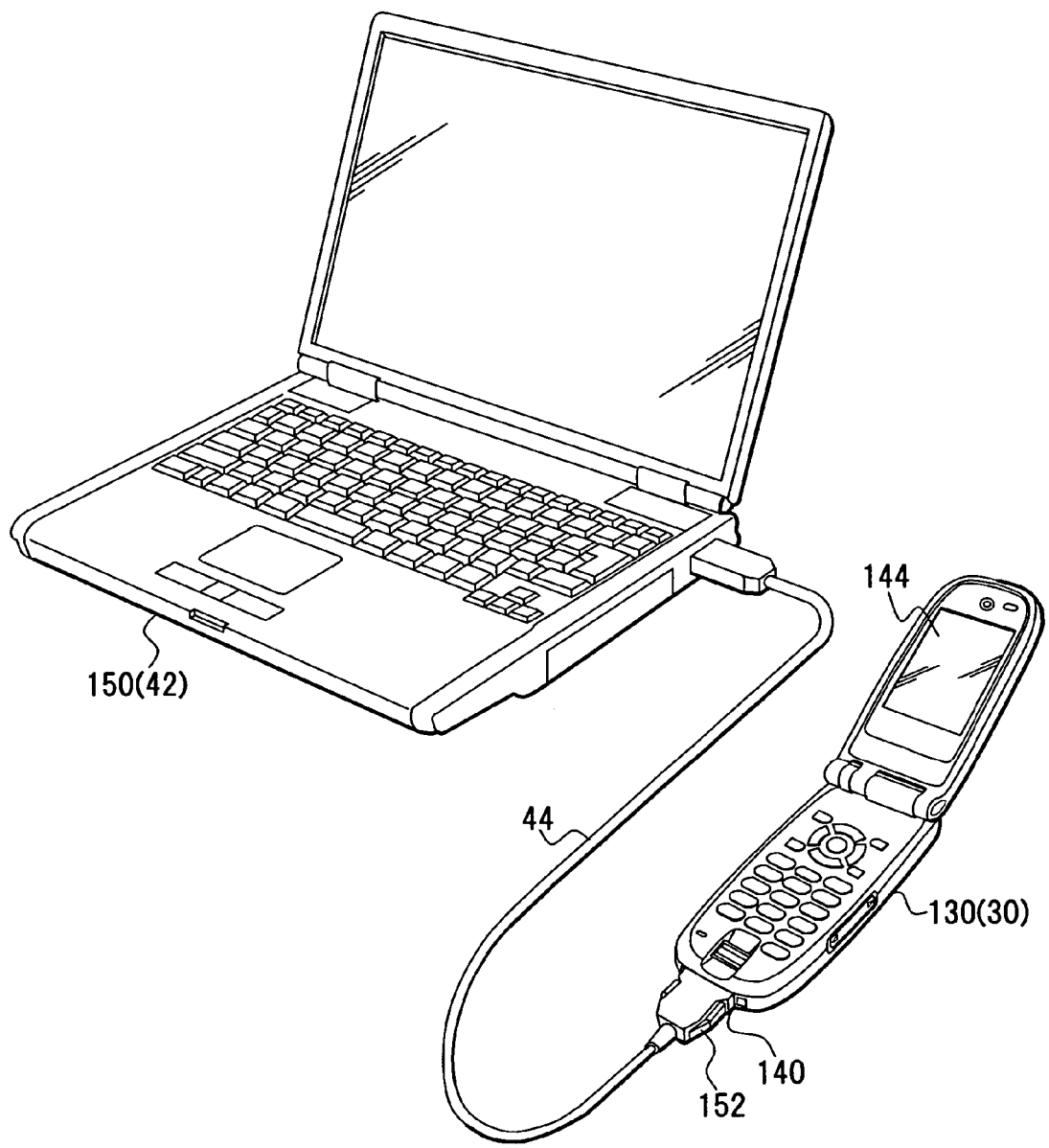
FIG. 32 is a diagram showing a cellular phone connected to a PC.
Figure 33:
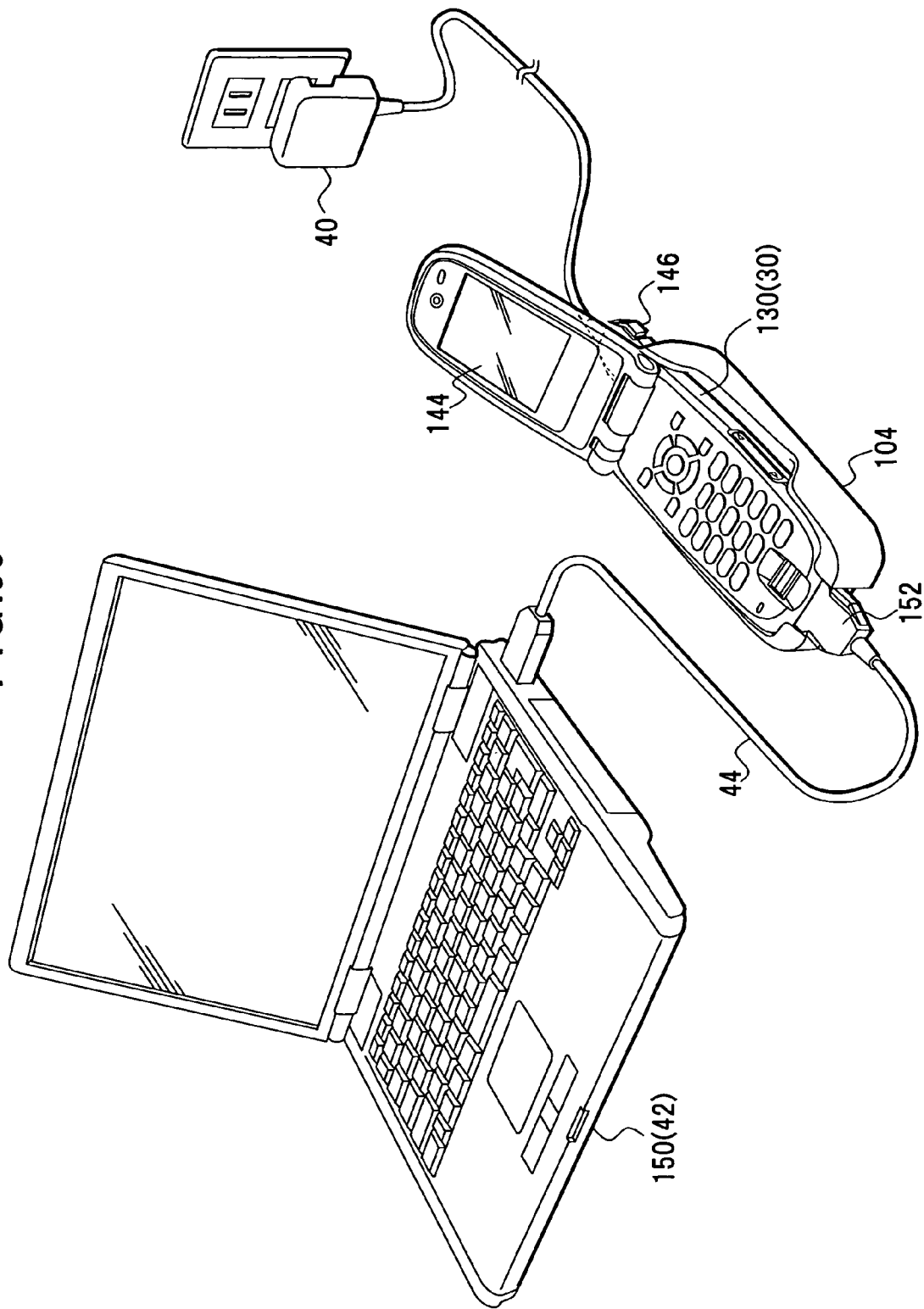
FIG. 33 is a diagram showing a cellular phone connected to a PC and placed on a charging platform.

A sixth embodiment of the present invention will be described with reference to FIG. 29, FIG. 30, FIG. 31, FIG. 32 and FIG. 33. FIG. 29 is a diagram showing a cellular phone according to the sixth embodiment; FIG. 30 is a diagram showing a cellular phone charged by using an AC adaptor as a charging source; FIG. 31 is a diagram showing a cellular phone charged by using an AC adaptor and a charging platform as a charging source; FIG. 32 is a diagram showing a cellular phone charged by using a personal computer (PC) as a charging source; and FIG. 33 is a diagram showing a cellular phone charged by using an AC adaptor and a PC as a charging source. In FIG. 29 to FIG. 33, the same symbols are added to the same portions as the charging apparatus or the electronic device shown in FIG. 10 and FIG. 28.

As an example of the electronic device 30 (FIG. 10) for example, a cellular phone 130 can be opened and closed around a hinge unit 136 which links two (2) chassis units 132 and 134, as shown in FIG. 29. The chassis unit 132 is provided with an operation unit 138 consisting of a plurality of keys, a power-feeding connector 140 used as both the adaptor connector 46 and the USB connector 48, and power-feeding terminals 160 consisting of a plus terminal and ground terminal connected to the charging platform 104, sandwiching the power-feeding connector 140. The rechargeable battery 34 is detachably attached to the backside of the chassis unit 132. The chassis unit 134 is provided with a display unit 144 and others.

If the AC adaptor 40 is used as the charging source for the rechargeable battery 34 of the cellular phone 130, as shown in FIG. 30, a power-feeding plug 146 of the AC adaptor 40 is connected to the power feeding connector 140. In this case, the rechargeable battery 34 is charged by using the AC adaptor 40 as the charging source.

If the charging platform 104 is used on the charging source side, as shown in FIG. 31, the power-feeding plug 146 of the AC adaptor 40 is connected to the charging platform 104 to feeding power to the charging platform 104. In the charging platform 104, a mount portion 148 is formed for detachably mounting the cellular phone 130, and a power-feeding unit provided in the mount portion 148 electrically contacts with the power-feeding terminal 106 (FIG. 30). As a result of this, the AC adaptor 40 is connected to the power-feeding terminal 106 of the cellular phone 130 via the charging platform 104.

If the PC 150 is used as the USB host 42 which is the charging source, as shown in FIG. 32, the cellular phone 130 is connected via a USB cable 44. In this case, a USB connector 152 of the USB cable 44 is attached and connected to the power-feeding connector 140 of the cellular phone 130. In this case, a battery built into the PC 150 is used as the charging source to charge the rechargeable battery 34 on the cellular phone side 130.

If both the AC adaptor 40 and the PC 150 as the USB host 42 are used as the charging sources, as shown in FIG. 33, for example, the cellular phone 130 is placed on the charging platform 104 to connect the AC adaptor 40 to the cellular phone 130 via the charging platform 104, and the cellular phone placed on the charging platform 104 is also connected to the PC 150 via the USB cable 44. In this case, although both the AC adaptor 40 and the PC 150 are connected, the rechargeable battery 34 is charged by selecting a charging source with the switch 50 described above, for example, by preferentially selecting the AC adaptor 40.

Seventh Embodiment

Figure 34:
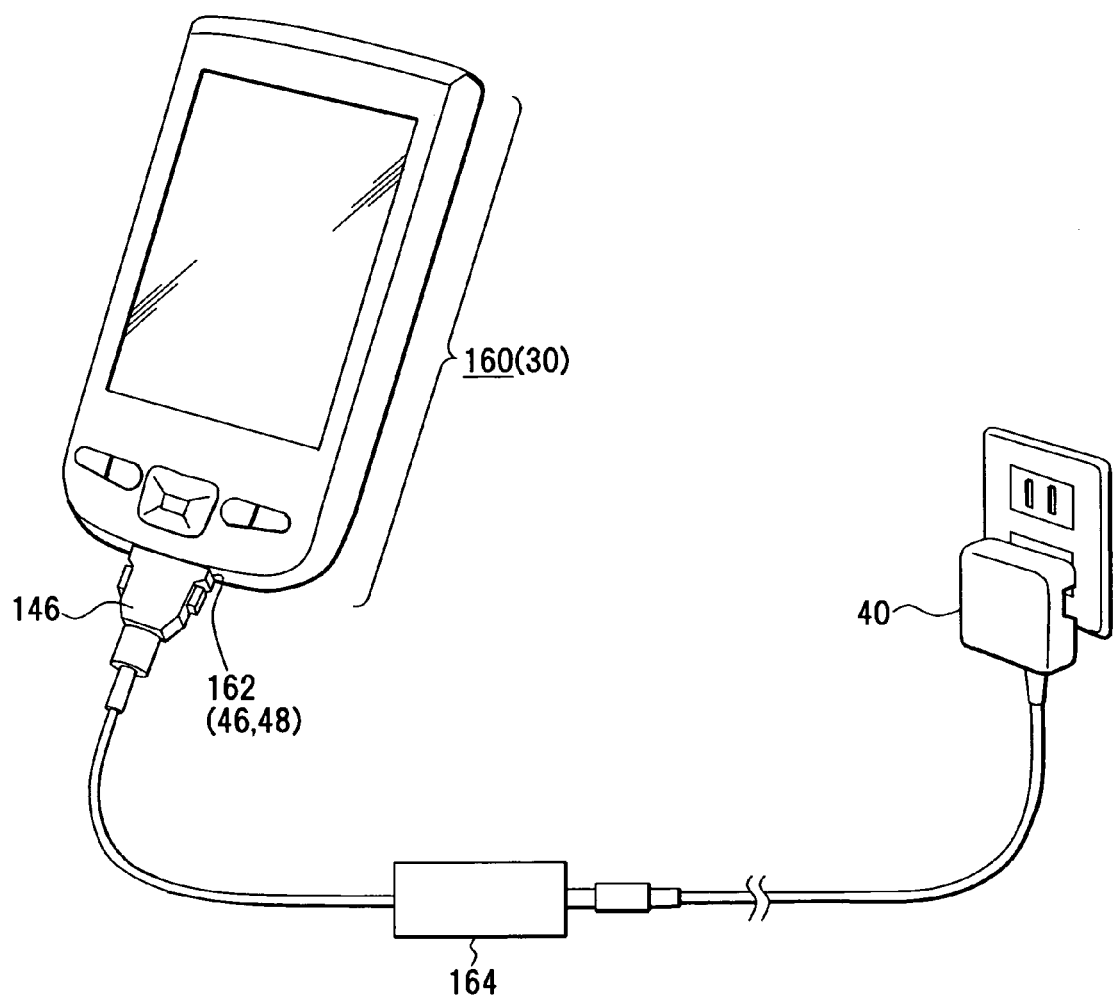
FIG. 34 is a diagram showing charging of a PDA according to a seventh embodiment.

A seventh embodiment of the present invention will be described with reference to FIG. 34. FIG. 34 is a diagram showing a personal digital assistant (PDA) according to a seventh embodiment. In FIG. 34, the same symbols are added to the same portions as FIG. 10 and FIG. 29 to FIG. 33.

In a PDA 160 as an example of the electronic device 30, as shown in FIG. 34, the rechargeable battery 34 is built into a chassis unit 162 and the power-feeding connector 162 is provided. The power-feeding connector 162 is configured to be used as both the adaptor connector 46 and the USB connector described above. If the AC adaptor 40 is used as the charging source, the AC adaptor 40 is connected to the power-feeding connector 162 of the PDA 160 via a relay 164 with the power-feeding plug 146.

Although not shown, the PC 150 as the USB host 42 (FIG. 32) or both the AC adaptor 40 and the PC 150 (FIG. 33) can also be used as the charging source in the PDA 160, and the rechargeable battery 34 can be charged as is the case with the cellular phone 130.

EXAMPLES AND COMPARATIVE EXAMPLES

Figure 7:
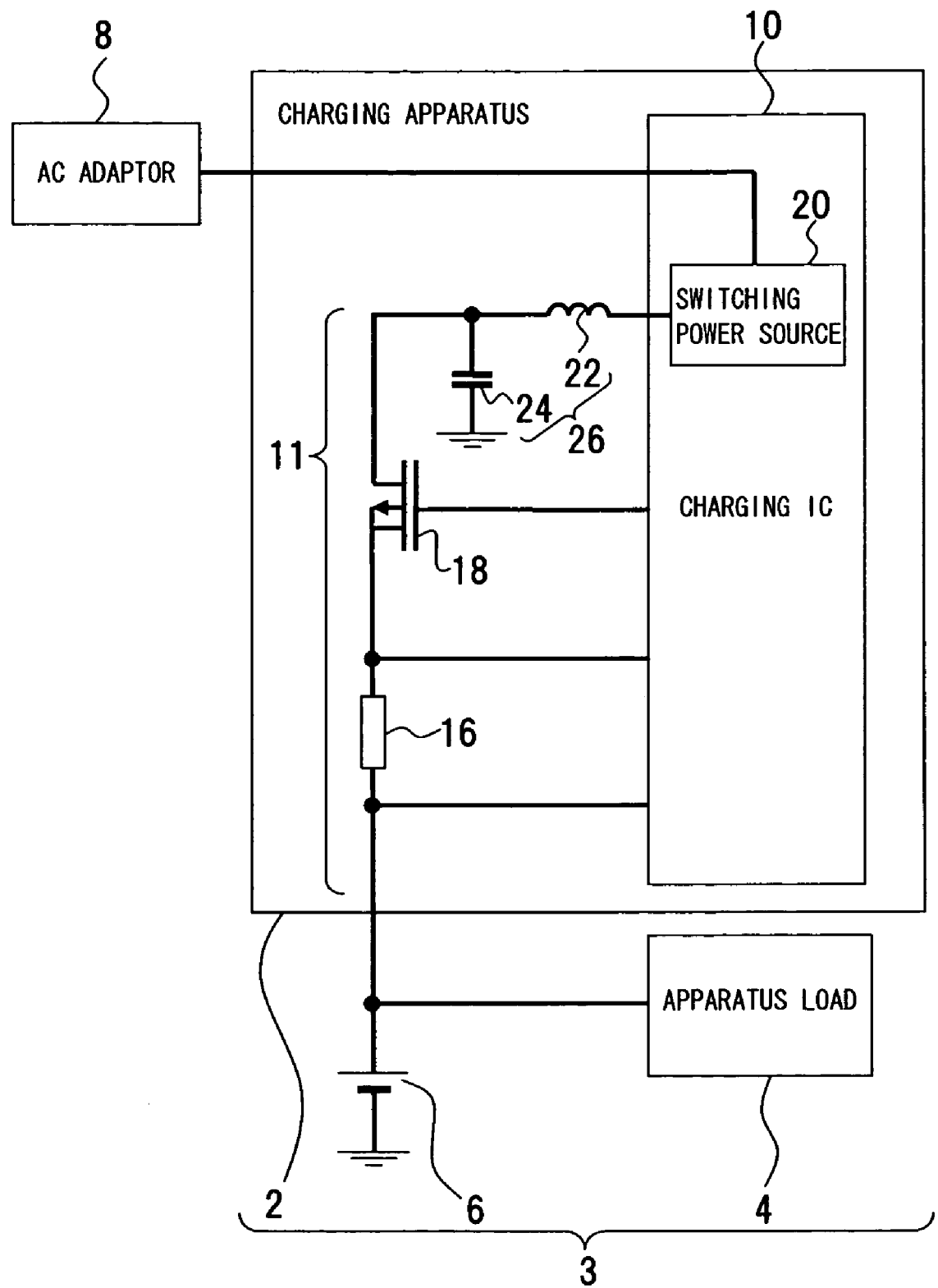
FIG. 7 is a diagram showing another charging apparatus.
Figure 8:
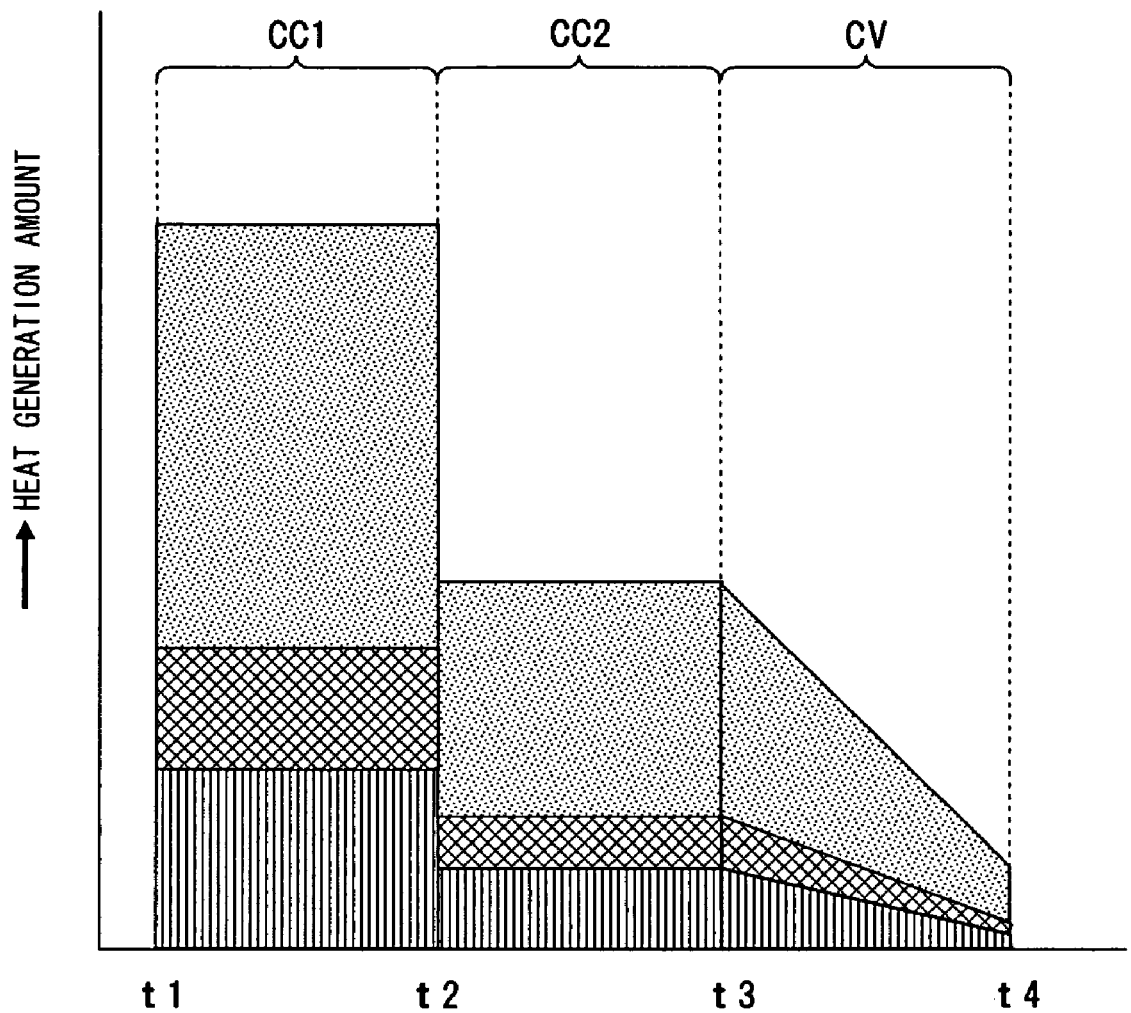
FIG. 8 is a diagram showing a relationship between charging and a heat generation amount.
Figure 35:
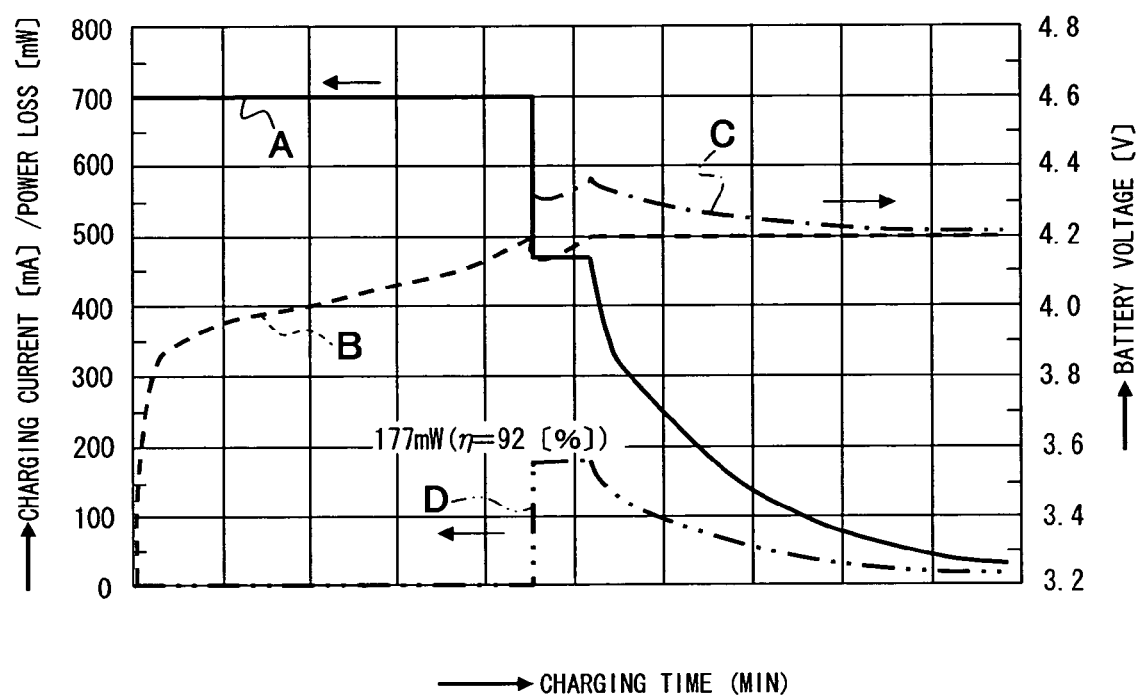
FIG. 35 is a diagram showing an operation property of an example of the present invention.
Figure 36:
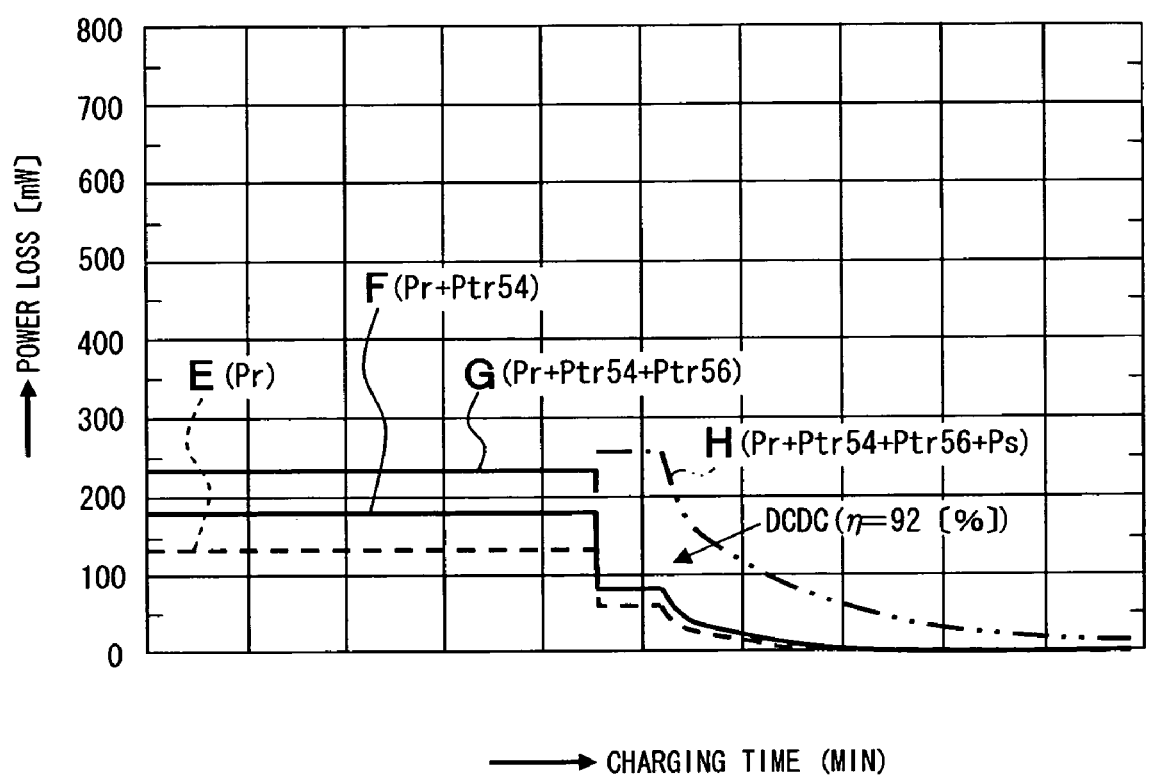
FIG. 36 is a diagram showing an operation property of an example of the present invention.
Figure 37:
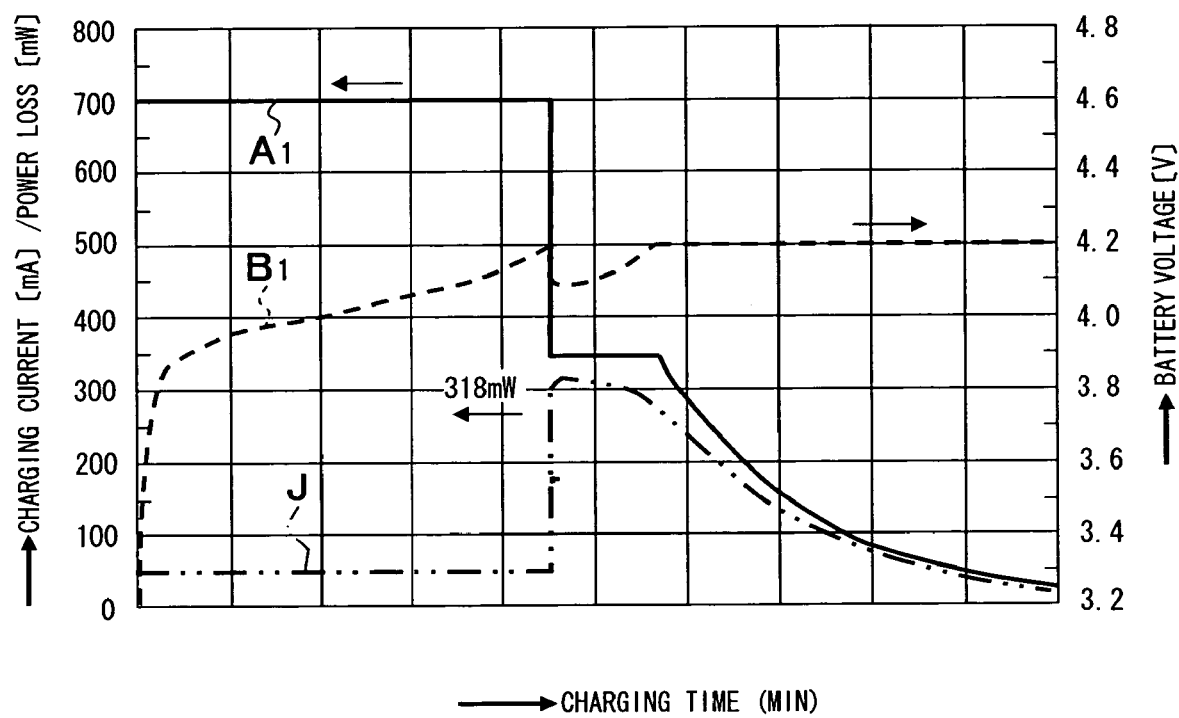
FIG. 37 is a diagram showing an operation property of a comparative example 1.
Figure 38:
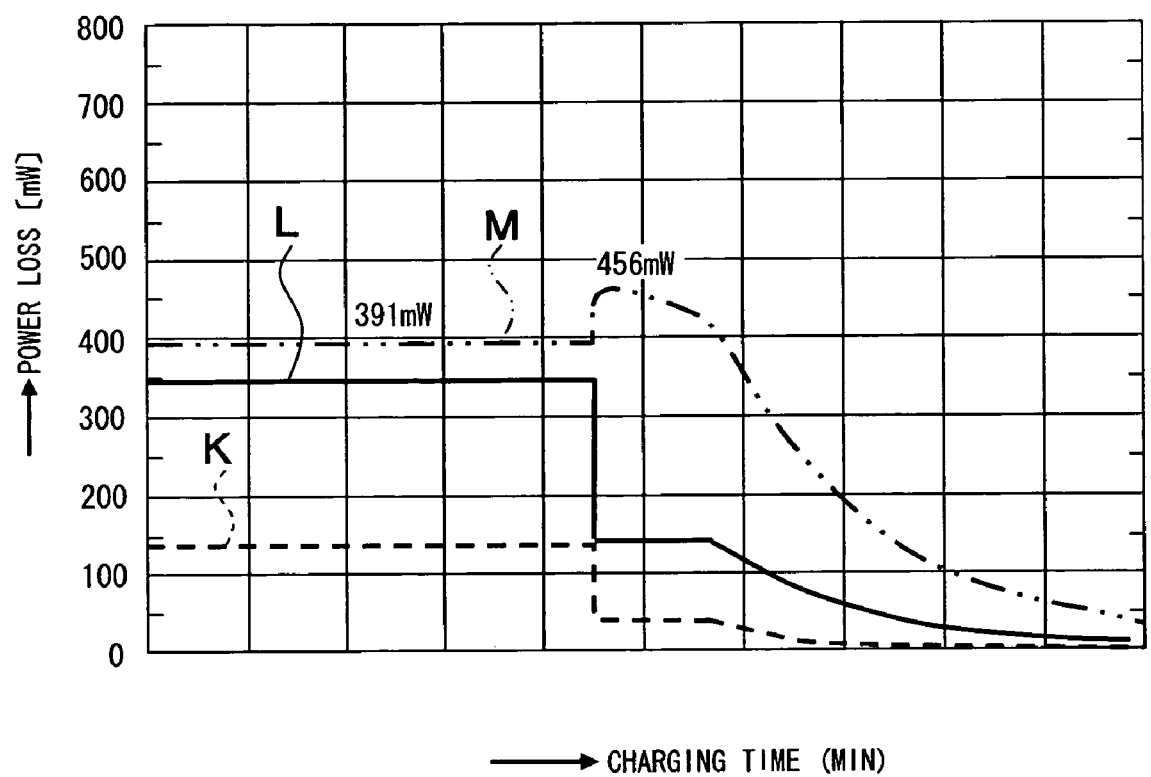
FIG. 38 is a diagram showing an operation property of a comparative example 1.
Figure 39:
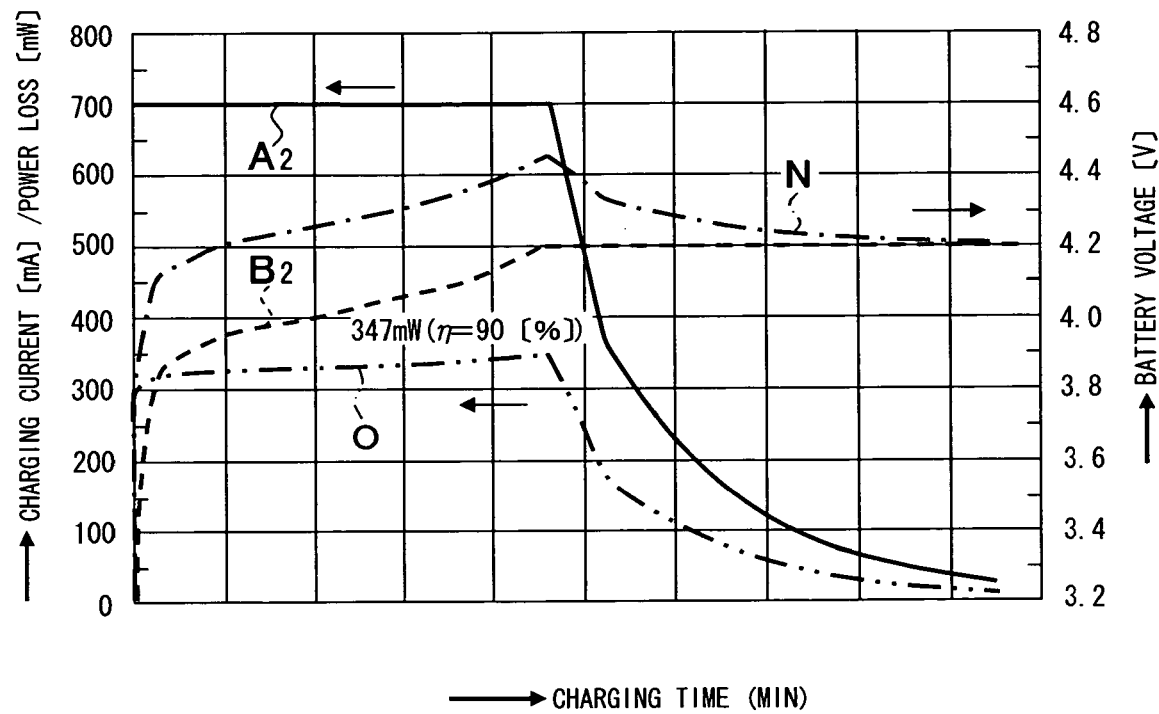
FIG. 39 is a diagram showing an operation property of a comparative example 2.
Figure 40:
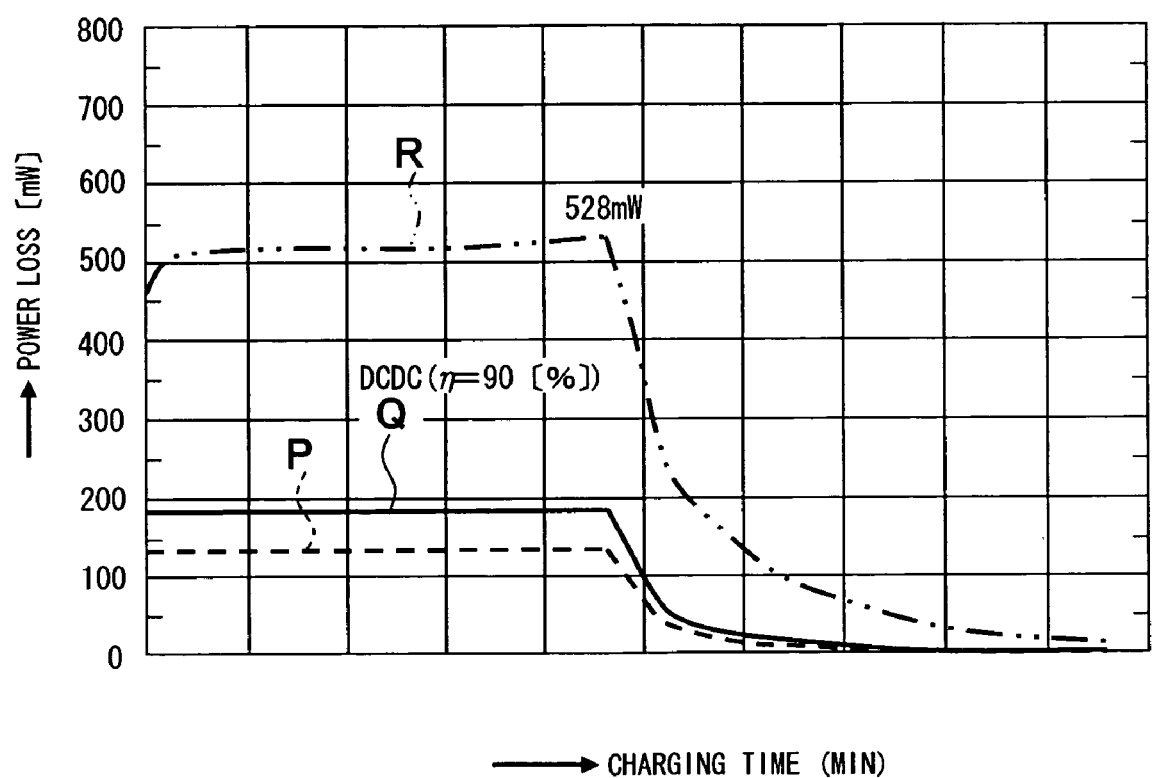
FIG. 40 is a diagram showing an operation property of a comparative example 2.

Operation properties of the charging apparatus 36 and the charging IC 38 are described with reference to FIG. 35, FIG. 36, FIG. 37, FIG. 38, FIG. 39 and FIG. 40. FIG. 35 show operation properties (charging current and power loss) of the examples (FIG. 9, FIG. 10) shown by defining the horizontal axis as a charging time and the vertical axis as the charging currents, power loss and the battery voltages. FIG. 36 shows operation properties (power loss) of the examples (FIG. 9, FIG. 10) shown by defining the horizontal axis as a charging time and the vertical axis as power loss. FIG. 37 and FIG. 38 show operation properties of a comparative example 1 (FIG. 1 to FIG. 4) and FIG. 39 and FIG. 40 show operation properties of a comparative example 2 (FIG. 7, FIG. 8).

In FIG. 35, A is a transition of the charging current Ic; B is a transition of the battery voltage Vb of the charging; C is a transition of the output voltage Vos of the switching power source (DC-DC) 66; and D is a transition of the power loss Ps of the switching power source 66.

In FIG. 36, E is a transition of the power loss Pr of the sense resistor 58; F is a transition of the power loss (Pr+Ptr54) of the sense resistor 58 and PMOSTr 54; G is a transition of the power loss (Pr+Ptr54+Ptr56) of the sense resistor 58 and PMOSTrs 54, 56; and H is a transition of the power loss (Pr+Ptr54+Ptr56+PS) of the sense resistor 58, PMOSTrs 54, 56 and the switching power source (DC-DC) 66. In this case, the DC-DC conversion efficiency η=92 [%].

In FIG. 37 (comparative example 1), A1 is a transition of the charging current Ic; B1 is a transition of the battery voltage Vb of the charging; and J is a transition of the power loss of the PMOSTr 12 (FIG. 1).

In FIG. 38 (comparative example 1), K is a transition of the power loss of the sense resistor 16; L is a transition of the summed power loss of the sense resistor 16 and diode 14; and M is a transition of the summed power loss of the sense resistor 16, diode 14 and PMOSTr 12.

In FIG. 39 (comparative example 2), A2 is a transition of the charging current Ic; B2 is a transition of the battery voltage Vb of the charging; and N is a transition of the output voltage of the switching power source (DC-DC) 20; and O is the power loss of the switching power source 20.

In FIG. 40 (comparative example 2), P is a transition of the power loss of the sense resistor 16; Q is a transition of the summed power loss of the sense resistor 16 and PMOSTr 18;

R is a transition of the power loss of the sense resistor 16, PMOSTrs 18 and the switching power source 20.

In this way, according to the charging apparatus of the present invention, as compared to the comparative examples 1 and 2, the power loss is reduced; the heat radiation measures can be lightened; and the heating can be prevented in the electronic device, which is equipped with the charging apparatus.

With such configurations and functions, as the charging apparatus of the rechargeable battery built into the electronic device such as the portable terminal, the external power source such as the AC adaptor and the USB host such as the personal computer connected with the USB cable can be used as the charging source of the rechargeable battery which is utilized for the charging of the rechargeable battery.

Although the preferred embodiments, etc., of the present invention have been described hereinabove, the present invention is not limited to the description and can naturally be modified or changed by one skilled in the art based on the gist of the present invention defined in claims or disclosed in the specification, and it is needless to say that such modifications and changes are within the scope of present invention.

What is claimed is:

1. A charging IC used for charging a rechargeable battery built into an electronic device, comprising:
   a power source unit that can be fed with power from an external power source with a drooping characteristic to pick up a constant current; and
   a control unit that controls a first operation and a first current of the power source unit and controls a second operation and a second current of an active element disposed on a charging path of the rechargeable battery, wherein
   the control unit applies a first constant current from the external power source to the rechargeable battery through the active element by halting the operation of the power source unit and constant-current controlling the active element, and
   the control unit applies a second constant current smaller than the first constant current from the power source unit to the rechargeable battery without passing through the active element by halting the operation of the active element and controlling the power source unit, after the rechargeable battery is charged with the first constant current to a predetermined voltage.

2. The charging IC of claim 1,
   wherein the power source unit is fed with power from an external device connected to the electronic device to output the constant current or a constant voltage, and
   wherein the control unit is configured to apply a constant voltage from the power source unit to the rechargeable battery to switch over to constant-voltage charging after the charging with the second constant current.

3. The charging IC of claim 1,
   wherein the external power source is an AC adaptor converting an alternate current received from an alternate-current power source into a direct current with a predetermined voltage to be picked up.

4. The charging IC of claim 1,
   wherein the power source unit is a switching power source converting direct-current input to direct-current output.

5. A charging IC used for charging a rechargeable battery built into an electronic device, comprising:
   a power source unit that is fed with power from an external device connected to the electronic device to output constant currents, the power source unit including a first power source circuit outputting a first constant current and a second power source circuit outputting a second constant current that is smaller than the first constant current; and
   a control unit that receives power-feeding information representative of a power feeding capacity of the external device by communicating with the external device and switches to an output of the first power source circuit or an output of the second power source circuit to switch a magnitude of the constant currents applied from the power source unit to the rechargeable battery in accordance with the power-feeding capability of the external device.

6. A charging IC used for charging a rechargeable battery built into an electronic device, comprising:
   a power source unit that is fed with power from an external device connected to the electronic device to output constant currents; and
   a control unit that receives power-feeding information representative of a power feeding capacity of the external device by communicating with the external device and switches a magnitude of the constant currents applied from the power source unit to the rechargeable battery in accordance with the power-feeding capability of the external device,
   wherein the power source unit is fed with power from the external device connected to the electronic device and comprises a first power source circuit outputting a constant current and a second power source circuit outputting a constant current smaller than the constant current from the first power source circuit; and
   wherein the control unit is configured to apply the constant current from the second power source circuit to the rechargeable battery and switch output from the second power source circuit to the first power source circuit based on the power-feeding information provided from the external device to apply the constant current from the first power source circuit to the rechargeable battery.

7. The charging IC of claim 5,
   wherein the external device is an electronic device connected by a USB cable.

8. A charging apparatus used for charging a rechargeable battery built into an electronic device, comprising:
   a first connector configured to connect to an external power source;
   a second connector configured to connect to an external device;
   a power source unit that is fed with power from an external power source having a drooping characteristic, the external power source being connected to the electronic device via the first connector, or an external device connected to the electronic device via the second connector;
   a switch that is disposed between the power source unit and the first and second connectors to switch connection of the external power source or the external device with the power source unit;
   a control unit; and
   an active element, disposed on a charging path of the rechargeable battery, the active element being constant-current controlled by the control unit, wherein
   the control unit, when the external power source is connected to the power source unit, applies a first constant current from the external power source to the rechargeable battery through the active element and applies a second constant current smaller than the first constant current from the power source unit to the rechargeable battery, without passing through the active element, after the rechargeable battery is charged with the first constant current to a predetermined voltage, and when the external device is connected to the power source unit, receives power-feeding information representative of a power feeding capacity of the external device from the external device and switches a magnitude of a constant current in accordance with the power-feeding capability of the external device to apply the constant current to the rechargeable battery.

9. The charging apparatus of claim 8, wherein the switch is configured to select either the external power source or the external device or select the external power source to connect to the power source unit, when both of the external power source and the external device are connected.

10. The charging apparatus of claim 8, wherein the control unit is configured to select either the external power source or the external device with the switch to connect to the power source unit, when both of the external power source and the external device are connected.

11. The charging apparatus of claim 8, wherein the power source unit is fed with power from the external device connected to the electronic device to output a current or voltage in accordance with the power-feeding capability of the external device; and wherein the control unit is configured to switch over to constant-voltage charging after the charging with the second constant current.

12. The charging IC of claim 1, wherein the power source unit outputs a constant voltage, and the control unit applies the constant voltage to the rechargeable battery and performs constant-voltage charging after charging with the first constant current and charging with the second constant current to the rechargeable battery.

\* \* \* \* \*